US012754401B2

(12) United States Patent
Chen et al.

(10) Patent No.: US 12,754,401 B2
(45) Date of Patent: Oct. 6, 2026

(54) WIDE-ANGLE LENS ASSEMBLY

(71) Applicants: Sintai Optical (Shenzhen) Co., Ltd., ShenZhen City (CN); Asia Optical Co., Inc., Taichung (TW)

(72) Inventors: Chien-Hung Chen, Taichung (TW); Hsi-Ling Chang, Taichung (TW); Shu-Hung Lin, Taichung (TW)

(73) Assignees: SINTAI OPTICAL (SHENZHEN) CO., LTD., Shenzhen City (TW); ASIA OPTICAL CO., INC., Taichung (TW)

( * ) Notice: Subject to any disclaimer, the term of this patent is extended or adjusted under 35 U.S.C. 154(b) by 234 days.

(21) Appl. No.: 18/663,336

(22) Filed: May 14, 2024

(65) Prior Publication Data

US 2024/0385418 A1 Nov. 21, 2024

(30) Foreign Application Priority Data

May 16, 2023 (TW) ................................ 112118112
Jun. 13, 2023 (TW) ................................ 112122026
(Continued)

(51) Int. Cl.
*G02B 13/06* (2006.01)
*G02B 9/64* (2006.01)
*G02B 13/18* (2006.01)

(52) U.S. Cl.
CPC ............... *G02B 13/06* (2013.01); *G02B 9/64* (2013.01); *G02B 13/18* (2013.01)

(58) Field of Classification Search
CPC .......... G02B 13/06; G02B 9/64; G02B 13/18; G02B 13/0045; G02B 13/006
(Continued)

(56) References Cited

U.S. PATENT DOCUMENTS

| | | | |
|---|---|---|---|
| 11,947,188 | B2 | 4/2024 | Sun et al. |
| 2008/0285150 | A1 | 11/2008 | Souma |

(Continued)

FOREIGN PATENT DOCUMENTS

| | | | |
|---|---|---|---|
| CN | 105629444 A | | 6/2016 |
| CN | 210199390 U | * | 3/2020 |

(Continued)

OTHER PUBLICATIONS

Machine Translation CN112698498 (Year: 2019).*
Machine Translation CN112698498 (Year: 2020).*

*Primary Examiner* — Travis S Fissel
(74) *Attorney, Agent, or Firm* — McClure, Qualey & Rodack, LLP

(57) ABSTRACT

A wide-angle lens assembly includes a first, a second, a third, a fourth, a fifth, a sixth, a seventh, and an eighth lenses, all of which are orderly arranged from an object side to an image side along an optical axis. The first, fourth, fifth, seventh, and eighth lenses are with refractive power. The second, third, and sixth lenses are with positive refractive power. The wide-angle lens assembly satisfies at least one of the following conditions: $0.8 \leq f/D22 \leq 3$; $0.025$ degrees$^{-1} \leq 1/\alpha \leq 0.3$ degrees$^{-1}$; $0.03$ degrees$^{-1} \leq 1/\beta \leq 0.35$ degrees$^{-1}$; $0.5 \leq \alpha/\beta \leq 30$; wherein f is an effective focal length of the wide-angle lens assembly, D22 is an effective optical diameter of an image side surface of the second lens, $\alpha$ is a maximum tangent angle of a first cemented surface, and $\beta$ is a maximum tangent angle of a second cemented surface.

20 Claims, 46 Drawing Sheets

(30) Foreign Application Priority Data

| | | | |
|---|---|---|---|
| Aug. 4, 2023 | (TW) | ................................ | 112129319 |
| Sep. 12, 2023 | (TW) | ................................ | 112134709 |

(58) Field of Classification Search
USPC ................................ 359/676, 681, 750, 725
See application file for complete search history.

(56) References Cited

U.S. PATENT DOCUMENTS

| | | | |
|---|---|---|---|
| 2009/0052050 | A1 | 2/2009 | Kweon et al. |
| 2021/0302698 | A1 | 9/2021 | Nitta et al. |
| 2022/0146789 | A1 | 5/2022 | Huang |
| 2022/0404585 | A1 | 12/2022 | Kuo |
| 2024/0094509 | A1 | 3/2024 | Sin |

FOREIGN PATENT DOCUMENTS

| | | | | |
|---|---|---|---|---|
| CN | 113484983 | A | | 10/2021 |
| CN | 112698498 | B | * | 4/2022 |
| JP | 7075474 | B2 | | 5/2022 |
| TW | 202219589 | A | | 5/2022 |
| TW | 202234116 | A | | 9/2022 |
| TW | 202300978 | A | | 1/2023 |

* cited by examiner

WIDE-ANGLE LENS ASSEMBLY

BACKGROUND OF THE INVENTION

Field of the Invention

The present invention relates to a wide-angle lens assembly.

Description of the Related Art

Today's wide-angle lens assembly often uses up to eight pieces of lens in order to improve the field of view and image quality. When the number of lenses increases, lens tilt and eccentricity are likely to occur during the assembly process of the wide-angle lens assembly, resulting in reduced production yield rate. The known wide-angle lens assembly can't satisfy such requirements. Therefore, the wide-angle lens assembly needs a new structure in order to meet the requirements of large field of view, high image quality, and high production yield rate at the same time.

BRIEF SUMMARY OF THE INVENTION

The invention provides a wide-angle lens assembly to solve the above problems. The wide-angle lens assembly of the invention is provided with characteristics of an increased field of view, an increased image quality, an increased production yield rate, and still has a good optical performance.

The wide-angle lens assembly in accordance with an exemplary embodiment of the invention includes a first lens, a second lens, a third lens, a fourth lens, a fifth lens, a sixth lens, a seventh lens, and an eighth lens. The first lens is with refractive power. The second lens is with positive refractive power. The third lens is with positive refractive power. The fourth lens is with refractive power. The fifth lens is with refractive power. The sixth lens is with positive refractive power. The seventh lens is with refractive power. The eighth lens is with refractive power. The first lens, the second lens, the third lens, the fourth lens, the fifth lens, the sixth lens, the seventh lens, and the eighth lens are arranged in order from an object side to an image side along an optical axis. The wide-angle lens assembly satisfies at least one of the following conditions: $0.8 \le f/D22 \le 3$; $0.025$ degrees$^{-1} \le 1/\alpha \le 0.3$ degrees$^{-1}$; $0.03$ degrees$^{-1} \le 1/\beta \le 0.35$ degrees$^{-1}$; $0.5 \le \alpha/\beta \le 30$; wherein f is an effective focal length of the wide-angle lens assembly, D22 is an effective optical diameter of an image side surface of the second lens, $\alpha$ is a maximum tangent angle of a first cemented surface, and $\beta$ is a maximum tangent angle of a second cemented surface. A wide-angle lens assembly of the present invention is a preferred embodiment of the present invention when the wide-angle lens assembly satisfies the above features and at least one of the above conditions.

In another exemplary embodiment, the first lens is with negative refractive power, the seventh lens is with positive refractive power, and the eighth lens is with negative refractive power.

In yet another exemplary embodiment, the first lens is a biconcave lens and includes a concave surface facing the object side and another concave surface facing the image side, the third lens is a biconvex lens and includes a convex surface facing the object side and another convex surface facing the image side, the sixth lens includes a convex surface facing the image side, and the seventh lens includes a convex surface facing the object side.

In another exemplary embodiment, the second lens is a meniscus lens and includes a convex surface facing the object side and a concave surface facing the image side, the fourth lens is a biconvex lens with positive refractive power and includes a convex surface facing the object side and another convex surface facing the image side, the fifth lens is a biconcave lens with negative refractive power and includes a concave surface facing the object side and another concave surface facing the image side, the sixth lens is a biconvex lens and further includes another convex surface facing the object side, the seventh lens is a biconvex lens and further includes another convex surface facing the image side, and the eighth lens is biconcave lens and includes a concave surface facing the object side and another concave surface facing the image side.

In yet another exemplary embodiment, the second lens is a meniscus lens and includes a convex surface facing the object side and a concave surface facing the image side, the fourth lens is a biconvex lens with positive refractive power and includes a convex surface facing the object side and another convex surface facing the image side, the fifth lens is a biconcave lens with negative refractive power and includes a concave surface facing the object side and another concave surface facing the image side, the sixth lens is a biconvex lens and further includes another convex surface facing the object side, the seventh lens is a meniscus lens and includes convex surface facing the image side, and the eighth lens is a meniscus lens and includes a convex surface facing the object side and a concave surface facing the image side.

In another exemplary embodiment, the second lens is a meniscus lens and includes a convex surface facing the object side and a concave surface facing the image side, the fourth lens is with positive refractive power and includes a plane surface facing the object side and a convex surface facing the image side, the fifth lens is a biconcave lens with negative refractive power and includes a concave surface facing the object side and another concave surface facing the image side, the sixth lens is a biconvex lens and further includes another convex surface facing the object side, the seventh lens is a biconvex lens and further includes another convex surface facing the image side, and the eighth lens is a biconcave lens and includes a concave surface facing the object side and another concave surface facing the image side.

In yet another exemplary embodiment, the second lens is a meniscus lens and includes a concave surface facing the object side and a convex surface facing the image side, the fourth lens is a biconcave lens with negative refractive power and includes a concave surface facing the object side and another concave surface facing the image side, the fifth lens is a meniscus lens with negative refractive power and includes a concave surface facing the object side and a convex surface facing the image side, the sixth lens is a biconvex lens and further includes another convex surface facing the object side, the seventh lens is a biconvex lens and further includes another convex surface facing the image side, and the eighth lens is a meniscus lens and includes a concave surface facing the object side and a convex surface facing the image side.

In another exemplary embodiment, the second lens is a meniscus lens and includes a concave surface facing the object side and a convex surface facing the image side, the fourth lens is a biconcave lens with negative refractive power and includes a concave surface facing the object side and another concave surface facing the image side, the fifth lens is a meniscus lens with negative refractive power and includes a concave surface facing the object side and a convex surface facing the image side, the sixth lens is a meniscus lens and further includes a concave surface facing the object side, the seventh lens is a biconvex lens and further includes another convex surface facing the image side, and the eighth lens is a biconcave lens and includes a concave surface facing the object side and another concave surface facing the image side.

In yet another exemplary embodiment, the second lens is a meniscus lens and includes a concave surface facing the object side and a convex surface facing the image side, the fourth lens is a meniscus lens with negative refractive power and includes a concave surface facing the object side and a convex surface facing the image side, the fifth lens is a meniscus lens with negative refractive power and includes a concave surface facing the object side and a convex surface facing the image side, the sixth lens is a biconvex lens and further includes another convex surface facing the object side, the seventh lens is a biconvex lens and further includes another convex surface facing the image side, and the eighth lens is a meniscus lens and includes a concave surface facing the object side and a convex surface facing the image side.

In another exemplary embodiment, the second lens is a meniscus lens and includes a convex surface facing the object side and a concave surface facing the image side, the fourth lens is a biconcave lens with negative refractive power and includes a concave surface facing the object side and another concave surface facing the image side, the fifth lens is a biconvex lens with positive refractive power and includes a convex surface facing the object side and another convex surface facing the image side, the sixth lens is a biconvex lens and further includes another convex surface facing the object side, the seventh lens is a biconvex lens and further includes another convex surface facing the image side, and the eighth lens is a biconcave lens and includes a concave surface facing the object side and another concave surface facing the image side.

In yet another exemplary embodiment, the image side surface of the fourth lens and the object side surface of the fifth lens are cemented on a first cemented surface and the image side surface of the seventh lens and the object side surface of the eighth lens are cemented on a second cemented surface.

In another exemplary embodiment, the wide-angle lens assembly further includes a stop disposed between the second lens and the third lens and satisfies at least one of the following conditions: $-3 \le R51/R72 \le 3$; $0 \le T1131/T3152 \le 3$; $0 \le T1131/T6182 \le 3$; $0 \le T3152/T6182 \le 3$; $0.17 \le T11ST/TTL \le 0.2$; $-1.25 \le f1/f \le -1.15$; $-1.6 \le f12/f \le -1.4$; $0 \le T4251/T1131 \le 0.5$; $0 \le T4251/T6182 \le 0.5$; $-10 \le R12/R72 \le 0.5$; $0.15 \le Vd2/Vd4 \le 3$; $0.3 \le Vd6/Vd5 \le 3$; wherein R51 is a radius of curvature of an object side surface of the fifth lens, R72 is a radius of curvature of an image side surface of the seventh lens, T1131 is an interval from an object side surface of the first lens to an object side surface of the third lens along the optical axis, T3152 is an interval from the object side surface of the third lens to an image side surface of the fifth lens along the optical axis, T6182 is an interval from an object side surface of the sixth lens to an image side surface of the eighth lens along the optical axis, T11ST is an interval from the object side surface of the first lens to the stop along the optical axis, TTL is an interval from the object side surface of the first lens to an image plane along the optical axis, f1 is an effective focal length of the first lens, f is an effective focal length of the wide-angle lens assembly, f12 is an effective focal length of a combination of the first lens and the second lens, T4251 is an interval from an image side surface of the fourth lens to the object side surface of the fifth lens along the optical axis, R12 is a radius of curvature of an image side surface of the second lens, Vd2 is an Abbe number of the second lens, Vd4 is an Abbe number of the fourth lens, Vd5 is an Abbe number of the fifth lens, and Vd6 is an Abbe number of the sixth lens.

The wide-angle lens assembly of the present invention has the following beneficial effects: simultaneously satisfying the requirements of large field of view, high quality image, and high production yield rate.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
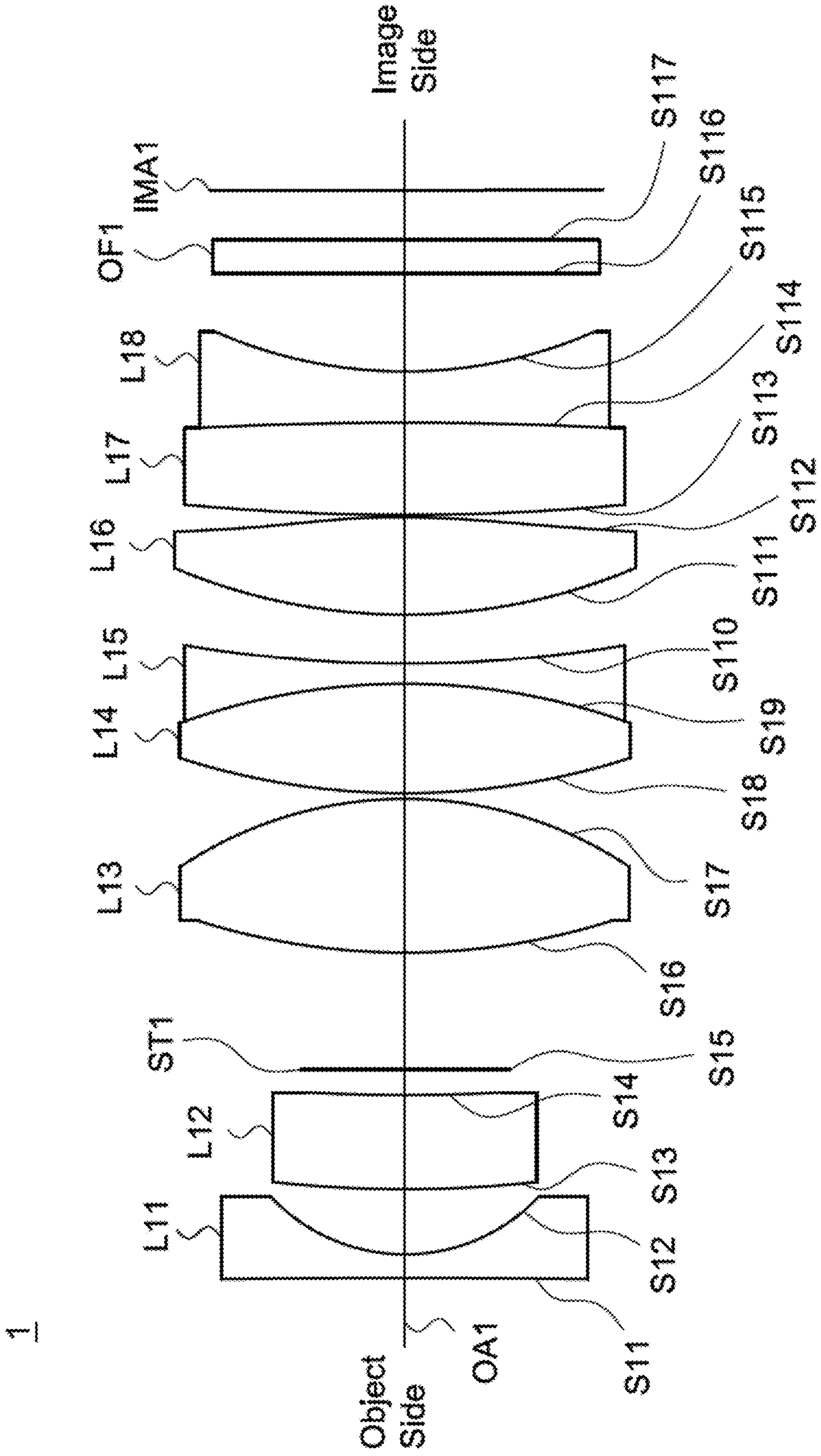
FIG. 1 is a lens layout diagram of a wide-angle lens assembly in accordance with a first embodiment of the invention.

The following description is made for the purpose of illustrating the general principles of the invention and should not be taken in a limiting sense. The scope of the invention is best determined by reference to the appended claims.

The present invention provides a wide-angle lens assembly including a first lens, a second lens, a third lens, a fourth lens, a fifth lens, a sixth lens, a seventh lens, and an eighth lens. The first lens is with refractive power. The second lens is with positive refractive power. The third lens is with positive refractive power. The fourth lens is with refractive power. The fifth lens is with refractive power. The sixth lens is with positive refractive power. The seventh lens is with refractive power. The eighth lens is with refractive power. The first lens, the second lens, the third lens, the fourth lens, the fifth lens, the sixth lens, the seventh lens, and the eighth lens are arranged in order from an object side to an image side along an optical axis. An image side surface of the fourth lens and an object side surface of the fifth lens are cemented on a first cemented surface. An image side surface of the seventh lens and an object side surface of the eighth lens are cemented on a second cemented surface. The wide-angle lens assembly satisfies at least one of the following conditions: $0.8 \le f/D22 \le 3$; $0.025\ \text{degrees}^{-1} \le 1/\alpha \le 0.3\ \text{degrees}^{-1}$; $0.03\ \text{degrees}^{-1} \le 1/\beta \le 0.35\ \text{degrees}^{-1}$; $0.5 \le \alpha/\beta \le 30$; wherein f is an effective focal length of the wide-angle lens assembly, D22 is an effective optical diameter of an image side surface of the second lens, a is a maximum tangent angle of the first cemented surface, and β is a maximum tangent angle of the second cemented surface. A wide-angle lens assembly of the present invention is a preferred embodiment of the present invention when the wide-angle lens assembly satisfies the above features and at least one of the above conditions.

Referring to Table 1, Table 2, Table 4, Table 5, Table 7, Table 8, Table 10, and Table 11, wherein Table 1, Table 4, Table 7, and Table 10 show optical specification in accordance with a first, a second, a third, and a fourth embodiments of the invention, respectively, and Table 2, Table 5, Table 8, and Table 11 show aspheric coefficients of each aspheric lens in Table 1, Table 4, Table 7, and Table 10, respectively. The aspheric surface sag z of each aspheric lens in the following embodiments can be calculated by the following formula: $z=ch^2/\{1+[1-(k+1)c^2h^2]^{1/2}\}+Ah^4+Bh^6+Ch^8+Dh^{10}+Eh^{12}+Fh^{14}+Gh^{16}+Hh^{18}+Ih^{20}$, where c is curvature, h is the vertical distance from the lens surface to the optical axis, k is conic constant, A, B, C, D, E, F, G, H, and I are aspheric coefficients, and the value of the aspheric coefficient A, B, C, D, E, F, G, H, and I are presented in scientific notation, such as 2E-03 for $2\times10^{-3}$.

FIGS. 1, 5, 9, and 13 are lens layout diagrams of the lens assemblies in accordance with the first, second, third, and fourth embodiments of the invention, respectively.

The first lenses L11, L21, L31, L41 are biconcave lenses with negative refractive power, wherein the object side surfaces S11, S21, S31, S41 are concave surfaces, the image side surfaces S12, S22, S32, S42 are concave surfaces, and both of the object side surfaces S11, S21, S31, S41 and image side surfaces S12, S22, S32, S42 are spherical surfaces.

The second lenses L12, L22, L32, L42 are meniscus lenses with positive refractive power, wherein the object side surfaces S13, S23, S33, S43 are convex surfaces, the image side surfaces S14, S24, S34, S44 are concave surfaces, and both of the object side surfaces S13, S23, S33, S43 and image side surfaces S14, S24, S34, S44 are spherical surfaces.

The third lenses L13, L23, L33, L43 are biconvex lenses with positive refractive power, wherein the object side surfaces S16, S26, S36, S46 are convex surfaces, the image side surfaces S17, S27, S37, S47 are convex surfaces, and both of the object side surfaces S16, S26, S36, S46 and image side surfaces S17, S27, S37, S47 are aspheric surfaces.

The fourth lenses L14, L24, L34, L44 are biconvex lenses with positive refractive power, wherein the object side surfaces S18, S28, S38, S48 are convex surfaces, the image side surfaces S19, S29, S39, S49 are convex surfaces, and both of the object side surfaces S18, S28, S38, S48 and image side surfaces S19, S29, S39, S49 are spherical surfaces.

The fifth lenses L15, L25, L35, L45 are biconcave lenses with negative refractive power, wherein the object side surfaces S19, S29, S39, S49 are concave surfaces, the image side surfaces S110, S210, S310, S410 are concave surfaces, and both of the object side surfaces S19, S29, S39, S49 and image side surfaces S110, S210, S310, S410 are spherical surfaces.

The image side surfaces S19, S29, S39, S49 of the fourth lenses L14, L24, L34, L44 and the object side surfaces S19, S29, S39, S49 of the fifth lenses L15, L25, L35, L45 are cemented on the first cemented surfaces. The first cemented surfaces are the image side surfaces S19, S29, S39, S49 of the fourth lenses L14, L24, L34, L44, or the object side surfaces S19, S29, S39, S49 of the fifth lenses L15, L25, L35, L45.

The sixth lenses L16, L26, L36, L46 are biconvex lenses with positive refractive power, wherein the object side surfaces S111, S211, S311, S411 are convex surfaces, the image side surfaces S112, S212, S312, S412 are convex surfaces, and both of the object side surfaces S111, S211, S311, S411 and image side surfaces S112, S212, S312, S412 are aspheric surfaces.

The seventh lenses L17, L27, L37, L47 are with positive refractive power, wherein the object side surfaces S113, S213, S313, S413 are convex surfaces and both of the object side surfaces S113, S213, S313, S413 and image side surfaces S114, S214, S314, S414 are spherical surfaces.

The eighth lenses L18, L28, L38, L48 are with negative refractive power, wherein the image side surfaces S115, S215, S315, S415 are concave surfaces and both of the object side surfaces S114, S214, S314, S414 and image side surfaces S115, S215, S315, S415 are spherical surfaces.

The image side surfaces S114, S214, S314, S414 of the seventh lenses L17, L27, L37, L47 and the object side surfaces S114, S214, S314, S414 of the eighth lenses L18, L28, L38, L48 are cemented on the second cemented surfaces. The second cemented surfaces are the image side surfaces S114, S214, S314, S414 of the seventh lenses L17, L27, L37, L47, or the object side surfaces S114, S214, S314, S414 of the eighth lenses L18, L28, L38, L48.

Figure 14:
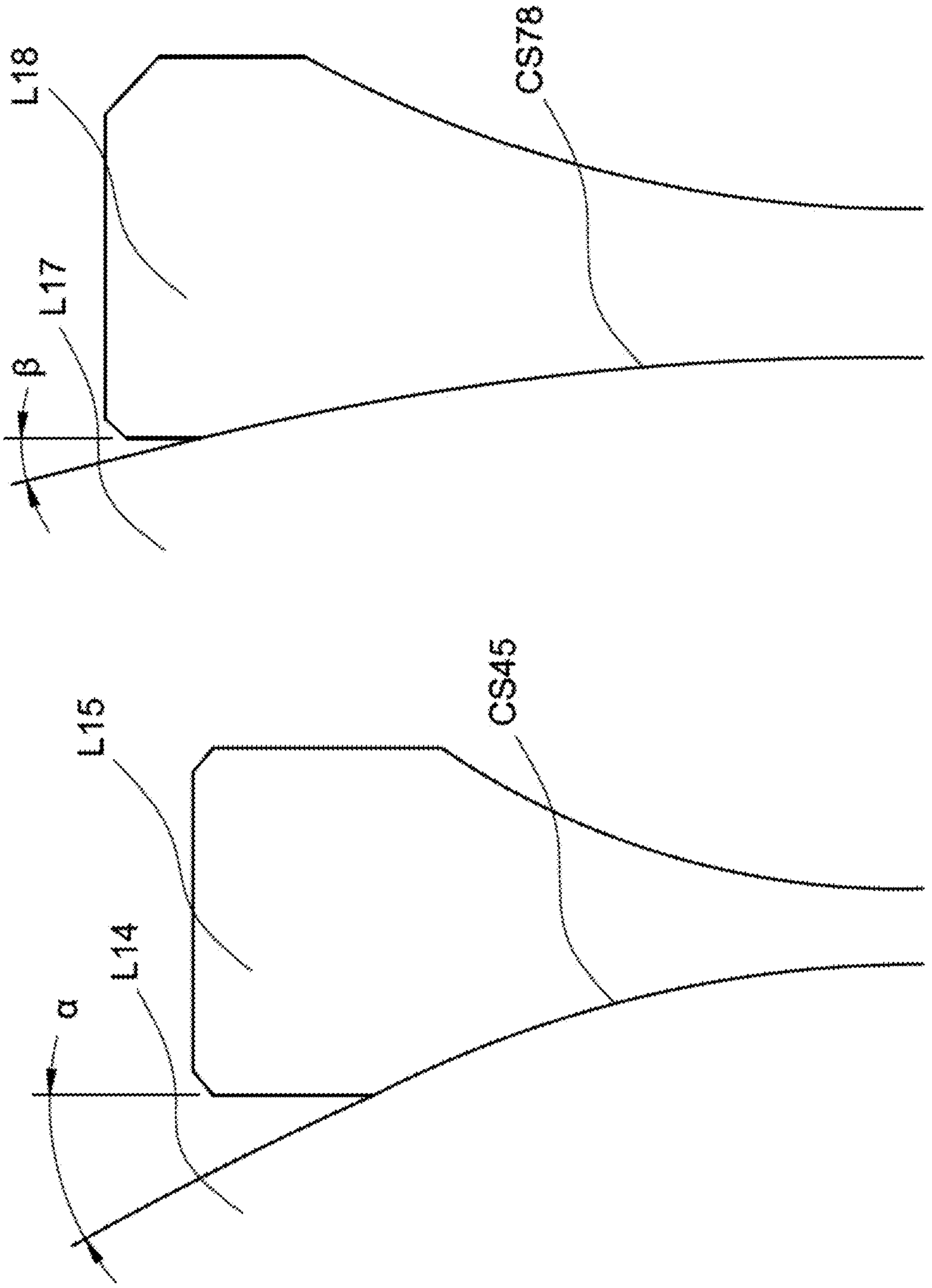
FIG. 14 depicts a maximum tangent angle of a first cemented surface and a maximum tangent angle of a second cemented surface diagram of the wide-angle lens assembly in accordance with the first embodiment of the invention.

In addition, the wide-angle lens assemblies 1, 2, 3, and 4 satisfy at least one of the following conditions (1)-(8):

$$0.8 \le f/D22 \le 3; \quad (1)$$

$$-3 \le R51/R72 \le 3; \quad (2)$$

$$0.025 \text{ degrees}^{-1} \le 1/\alpha \le 0.3 \text{ degrees}^{-1}; \quad (3)$$

$$0.03 \text{ degrees}^{-1} \le 1/\beta \le 0.35 \text{ degrees}^{-1}; \quad (4)$$

$$0.5 \le \alpha/\beta \le 30; \quad (5)$$

$$0 \le T1131/T3152 \le 3; \quad (6)$$

$$0 \le T1131/T6182 \le 3; \quad (7)$$

$$0 \le T3152/T6182 \le 3; \quad (8)$$

where f is an effective focal length of the wide-angle lens assemblies 1, 2, 3, 4 in the first embodiment through the fourth embodiment; D22 is an effective optical diameter of the image side surfaces S14, S24, S34, S44 of the second lenses L12, L22, L32, L42 in the first embodiment through the fourth embodiment; α is a maximum tangent angle of the first cemented surfaces of the fifth lenses L15, L25, L35, L45 and the fourth lenses L14, L24, L34, L44 in the first embodiment through the fourth embodiment; β is a maximum tangent angle of the second cemented surfaces of the eighth lenses L18, L28, L38, L48 and the seventh lenses L17, L27, L37, L47 in the first embodiment through the fourth embodiment; α and β are shown, for example, in FIG. 14 and the first embodiment, wherein the symbol L14 represents the fourth lens, the symbol L15 represents the fifth lens, the symbol CS45 represents the first cemented surface, and the symbol α is the maximum tangent angle of the first cemented surface CS45 (the tangent angle is the angle between a tangent line and the cemented surface CS45, wherein the tangent line is approximately perpendicular to the optical axis and formed by the object side surface CS45 of the fifth lens and the surface at the edge of the non-optical effective diameter); the symbol L17 represents the seventh lens, the symbol L18 represents the eighth lens, the symbol CS78 represents the second cemented surface, and the symbol β is the maximum tangent angle of the second cemented surface CS78 (the tangent angle is the angle between the tangent line and the cemented surface CS78, wherein the tangent line is approximately perpendicular to the optical axis and formed by the object side surface CS78 of the eighth lens and the surface at the edge of the non-optical effective diameter); R51 is a radius of curvature of the object side surfaces S19, S29, S39, S49 of the fifth lenses L15, L25, L35, L45 in the first embodiment through the fourth embodiment; R72 is a radius of curvature of the image side surfaces S114, S214, S314, S414 of the seventh lenses L17, L27, L37, L47 in the first embodiment through the fourth embodiment; T1131 is an interval from the object side surfaces S11, S21, S31, S41 of the first lenses L11, L21, L31, L41 to the object side surfaces S16, S26, S36, S46 of the third lenses L13, L23, L33, L43 along the optical axes OA1, OA2, OA3, OA4 in the first embodiment through the fourth embodiment; T3152 is an interval from the object side surfaces S16, S26, S36, S46 of the third lenses L13, L23, L33, L43 to the image side surfaces S110, S210, S310, S410 of the fifth lenses L15, L25, L35, L45 along the optical axes OA1, OA2, OA3, OA4 in the first embodiment through the fourth embodiment; and T6182 is an interval from the object side surfaces S111, S211, S311, S411 of the sixth lenses L16, L26, L36, L46 to the image side surfaces S115, S215, S315, S415 of the eighth lenses L18, L28, L38, L48 along the optical axes OA1, OA2, OA3, OA4 in the first embodiment through the fourth embodiment. With the wide-angle lens assemblies 1, 2, 3, 4 satisfying at least one of the above conditions (1)-(8), the F-number can be effectively decreased, the field of view can be effectively increased, the resolution can be effectively increased, and the aberration can be effectively corrected.

When the condition (3): $0.025 \text{ degrees}^{-1} \le 1/\alpha \le 0.3 \text{ degrees}^{-1}$, or condition (4): $0.03 \text{ degrees}^{-1} \le 1/\beta \le 0.35 \text{ degrees}^{-1}$, or condition (5): $0.5 \le \alpha/\beta \le 30$ is satisfied, the lens tilt and eccentric error can be effectively decreased.

A detailed description of a wide-angle lens assembly in accordance with a first embodiment of the invention is as follows. Referring to FIG. 1, the wide-angle lens assembly 1 includes a first lens L11, a second lens L12, a stop ST1, a third lens L13, a fourth lens L14, a fifth lens L15, a sixth lens L16, a seventh lens L17, an eighth lens L18, and an optical filter OF1, all of which are arranged in order from an object side to an image side along an optical axis OA1. In operation, the light from the object side is imaged on an image plane IMA1.

According to the foregoing, wherein: the seventh lens L17 is a biconvex lens, wherein the image side surface S114 is a convex surface; the eighth lens L18 is a biconcave lens, wherein the object side surface S114 is a concave surface; and both of the object side surface S116 and image side surface S117 of the optical filter OF1 are plane surfaces; with the above design of the lenses, stop ST1, and at least one of the conditions (1)-(8) satisfied, the wide-angle lens assembly 1 can have an effective decreased F-number, an effective increased field of view, an effective increased resolution, and an effective corrected aberration.

Table 1 shows the optical specification of the wide-angle lens assembly 1 in FIG. 1.

TABLE 1

Effective Focal Length = 4.99 mm F-number = 1.64
Total Lens Length = 24.23 mm Field of View = 101.47 degrees

| Surface Number | Radius of Curvature (mm) | Thick-ness (mm) | Nd | Vd | Effective Focal Length (mm) | Remark |
|---|---|---|---|---|---|---|
| S11 | −112.75 | 0.52 | 1.58913 | 61.2536 | −6.2191 | L11 |
| S12 | 3.81 | 1.40 | | | | |
| S13 | 21.53 | 2.11 | 1.98613 | 16.4839 | 41.7258 | L12 |
| S14 | 42.47 | 0.57 | | | | |
| S15 | ∞ | 2.63 | | | | ST1 |
| S16 | 12.35 | 3.44 | 1.61633 | 63.69 | 8.3761 | L13 |
| S17 | −7.97 | 0.09 | | | | |
| S18 | 14.98 | 2.47 | 1.497 | 81.6054 | 14.0743 | L14 |

TABLE 1-continued

Effective Focal Length = 4.99 mm F-number = 1.64
Total Lens Length = 24.23 mm Field of View = 101.47 degrees

| Surface Number | Radius of Curvature (mm) | Thick-ness (mm) | Nd | Vd | Effective Focal Length (mm) | Remark |
|---|---|---|---|---|---|---|
| S19 | −12.45 | 0.41 | 1.8081 | 22.6981 | −10.223 | L15 |
| S110 | 25.50 | 1.13 | | | | |
| S111 | 10.35 | 2.15 | 1.88386 | 37.2043 | 8.24534 | L16 |
| S112 | −22.59 | 0.04 | | | | |
| S113 | 47.17 | 2.05 | 1.691 | 54.8226 | 42.833 | L17 |
| S114 | −78.73 | 1.20 | 1.80518 | 25.4579 | −10.528 | L18 |
| S115 | 9.64 | 2.15 | | | | |
| S116 | ∞ | 0.72 | 1.5233 | 54.5172 | | OF1 |
| S117 | ∞ | 1.16 | | | | |

In the first embodiment, the conic constant k and the aspheric coefficients A, B, C, D, E, F, G, H, and I of each aspheric lens are shown in Table 2.

TABLE 2

| Surface Number | k<br>E | A<br>F | B<br>G | C<br>H | D<br>I |
|---|---|---|---|---|---|
| S16 | 0.1233 | −3.4071E−04 | 5.8114E−06 | 2.4351E−07 | −7.3924E−08 |
| | 7.3076E−09 | −3.2845E−10 | 4.8967E−12 | 0 | 0 |
| S17 | −0.1904 | −3.8919E−04 | 1.6983E−05 | −3.1573E−07 | −4.9653E−09 |
| | 1.5355E−09 | −4.2788E−11 | −4.0889E−13 | 0 | 0 |
| S111 | −5.1114 | 6.59E−05 | −3.4611E−06 | 4.1928E−07 | 4.3374E−10 |
| | −2.0833E−09 | 1.5996E−10 | −3.5423E−12 | 0 | 0 |
| S112 | −1.4315 | 3.765E−04 | −1.6363E−05 | 1.9303E−06 | −9.3394E−08 |
| | 8.6051E−10 | 1.518E−10 | −4.6095E−12 | 0 | 0 |

Table 3 shows the parameters and condition values for conditions (1)-(8) in accordance with the first embodiment of the invention. It can be seen from Table 3 that the wide-angle lens assembly 1 of the first embodiment satisfies the conditions (1)-(8).

TABLE 3

| | | | | | |
|---|---|---|---|---|---|
| D22 | 4.71 mm | α | 21.61 degrees | β | 3.11 degrees |
| T1131 | 7.24 mm | T3152 | 6.40 mm | T6182 | 5.44 mm |
| f/D22 | 1.06 | R51/R72 | 0.16 | 1/α | 0.05 degrees$^{-1}$ |
| 1/β | 0.32 degrees$^{-1}$ | α/β | 6.95 | T1131/T3152 | 1.13 |
| T1131/T6182 | 1.33 | T3152/T6182 | 1.18 | | |

Figure 2:
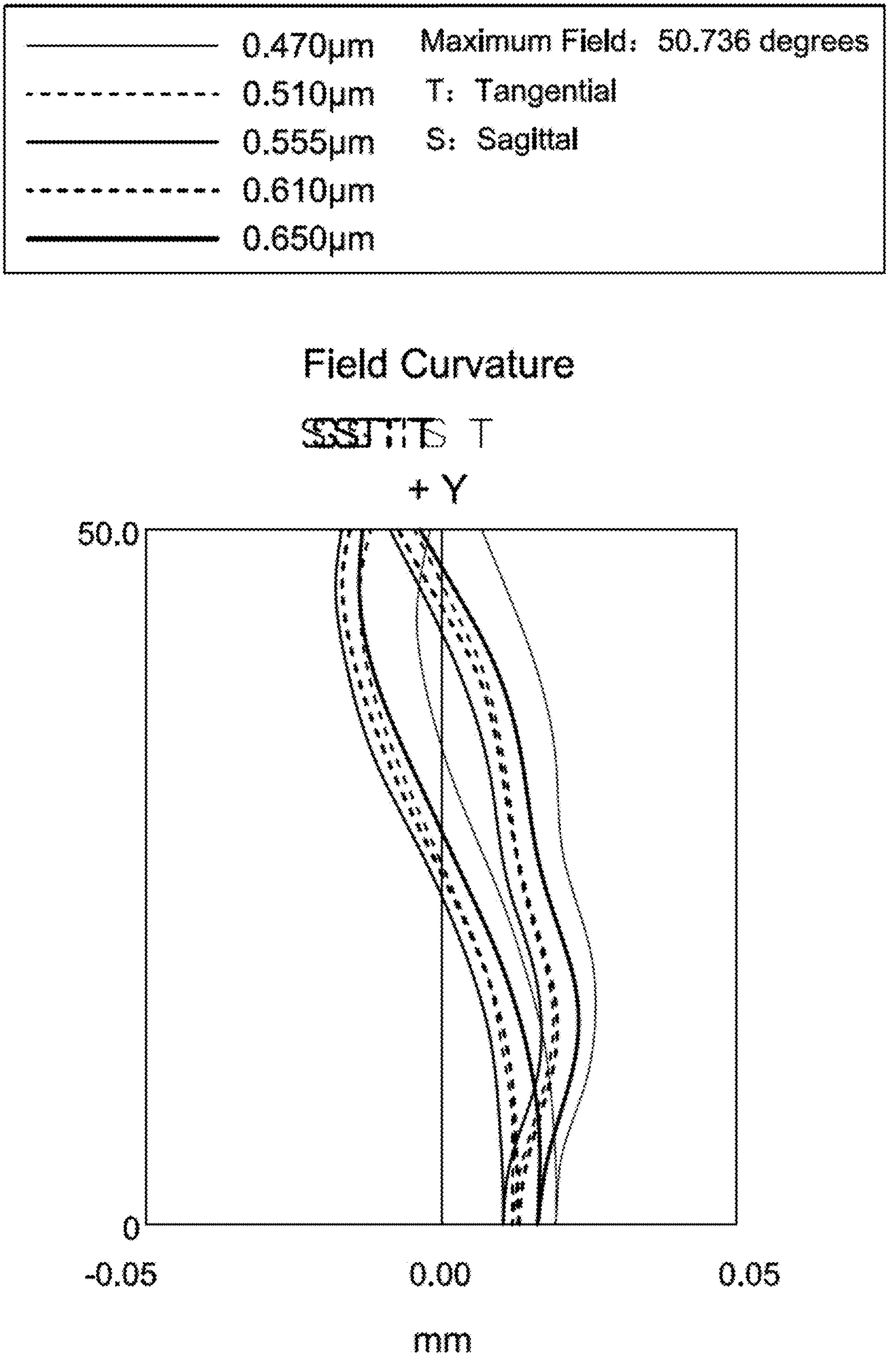
FIGS. 2, 3, 4 depict a field curvature diagram, a distortion diagram, and a modulation transfer function diagram of the wide-angle lens assembly in accordance with the first embodiment of the invention.
Figure 3:
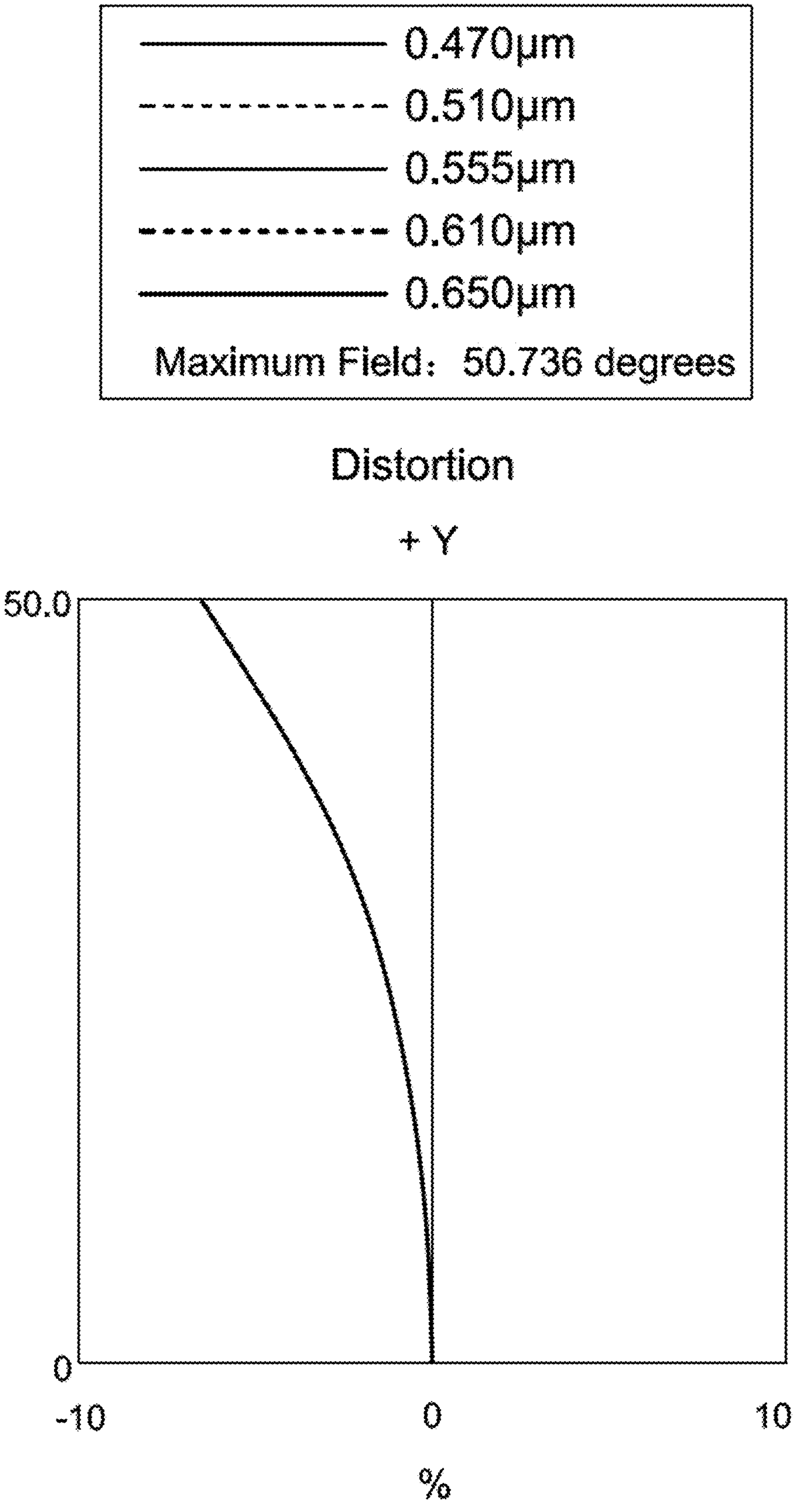
Figure 4:
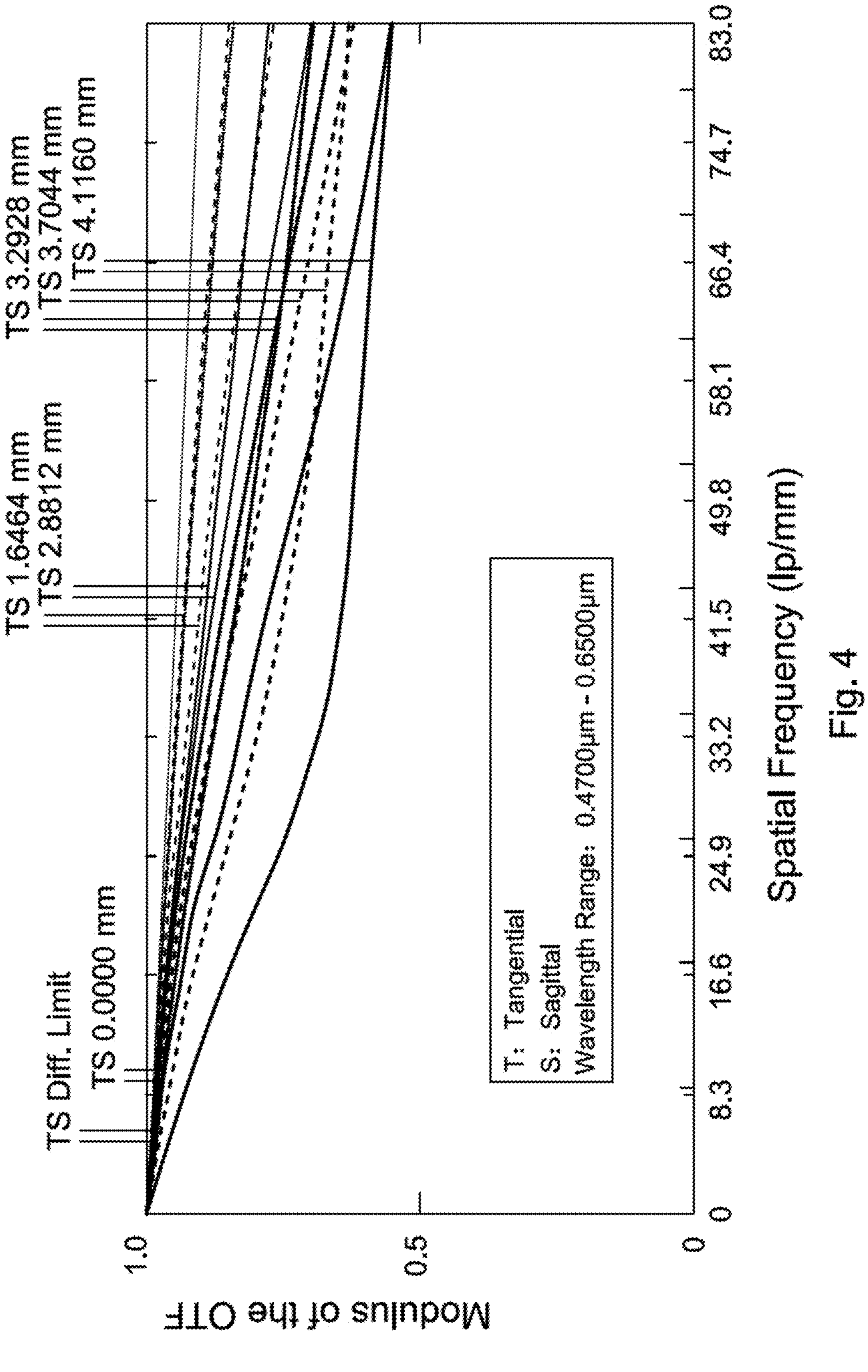

In addition, the wide-angle lens assembly 1 of the first embodiment can meet the requirements of optical performance as seen in FIGS. 2-4. It can be seen from FIG. 2 that the field curvature of tangential direction and sagittal direction in the wide-angle lens assembly 1 of the first embodiment ranges from −0.02 mm to 0.03 mm. It can be seen from FIG. 3 that the distortion in the wide-angle lens assembly 1 of the first embodiment ranges from −7% to 0%. It can be seen from FIG. 4 that the modulation transfer function of tangential direction and sagittal direction in the wide-angle lens assembly 1 of the first embodiment ranges from 0.56 to 1.0. It is obvious that the field curvature and the distortion of the wide-angle lens assembly 1 of the first embodiment can be corrected effectively, and the resolution of the wide-angle lens assembly 1 of the first embodiment can meet the requirement. Therefore, the wide-angle lens assembly 1 of the first embodiment is capable of good optical performance.

Figure 5:
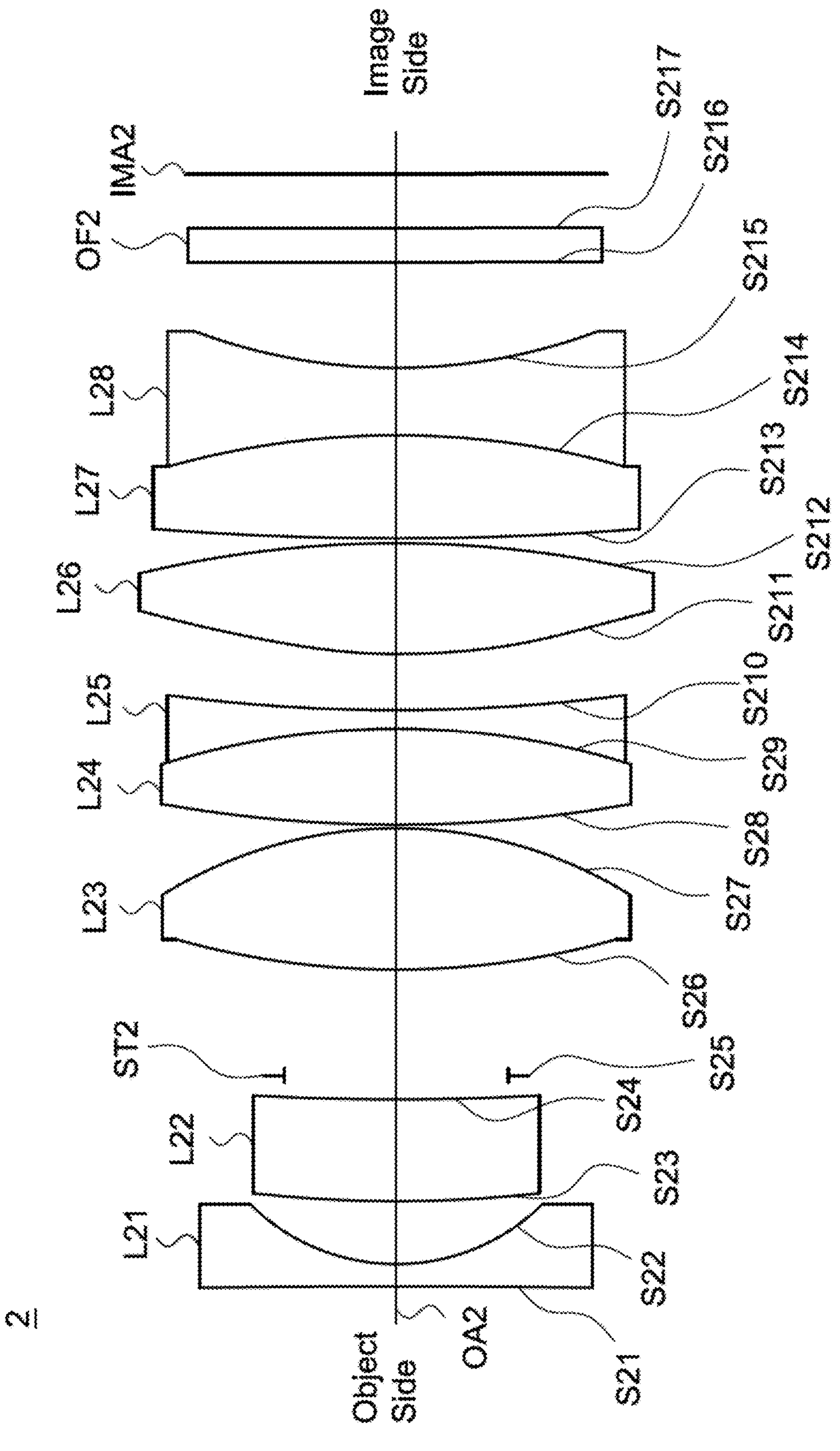
FIG. 5 is a lens layout diagram of a wide-angle lens assembly in accordance with a second embodiment of the invention.

A detailed description of a wide-angle lens assembly in accordance with a second embodiment of the invention is as follows. Referring to FIG. 5, the wide-angle lens assembly 2 includes a first lens L21, a second lens L22, a stop ST2, a third lens L23, a fourth lens L24, a fifth lens L25, a sixth lens L26, a seventh lens L27, an eighth lens L28, and an optical filter OF2, all of which are arranged in order from an object side to an image side along an optical axis OA2. In operation, the light from the object side is imaged on an image plane IMA2.

According to the foregoing, wherein: the seventh lens L27 is a biconvex lens, wherein the image side surface S214 is a convex surface; the eighth lens L28 is a biconcave lens, wherein the object side surface S214 is a concave surface; and both of the object side surface S216 and image side surface S217 of the optical filter OF2 are plane surfaces; with the above design of the lenses, stop ST2, and at least one of the conditions (1)-(8) satisfied, the wide-angle lens assembly 2 can have an effective decreased F-number, an effective increased field of view, an effective increased resolution, and an effective corrected aberration.

Table 4 shows the optical specification of the wide-angle lens assembly 2 in FIG. 5.

TABLE 4

Effective Focal Length = 6.24 mm F-number = 1.64
Total Lens Length = 30.00 mm Field of View = 101.51 degrees

| Surface Number | Radius of Curvature (mm) | Thickness (mm) | Nd | Vd | Effective Focal Length (mm) | Remark |
|---|---|---|---|---|---|---|
| S21 | −178.53 | 0.65 | 1.58913 | 61.2536 | −7.7044 | L21 |
| S22 | 4.68 | 1.66 | | | | |
| S23 | 21.14 | 2.72 | 1.98613 | 16.4839 | 54.4788 | L22 |
| S24 | 32.40 | 0.65 | | | | |
| S25 | ∞ | 2.93 | | | | ST2 |
| S26 | 15.62 | 3.76 | 1.61638 | 61.8021 | 10.8887 | L23 |
| S27 | −10.74 | 0.05 | | | | |
| S28 | 27.00 | 2.64 | 1.497 | 81.6054 | 21.7511 | L24 |
| S29 | −17.51 | 0.50 | 1.8081 | 22.6981 | −14.63 | L25 |
| S210 | 37.78 | 1.51 | | | | |
| S211 | 12.84 | 3.01 | 1.87897 | 37.0874 | 9.22569 | L26 |
| S212 | −19.85 | 0.05 | | | | |
| S213 | 50.00 | 2.85 | 1.691 | 54.8226 | 19.9917 | L27 |
| S214 | −18.73 | 1.77 | 1.80518 | 25.4579 | −8.9511 | L28 |
| S215 | 12.35 | 2.87 | | | | |
| S216 | ∞ | 0.90 | 1.5233 | 54.5172 | | OF2 |
| S217 | ∞ | 1.47 | | | | |

In the second embodiment, the conic constant k and the aspheric coefficients A, B, C, D, E, F, G, H, and I of each aspheric lens are shown in Table 5.

TABLE 5

| Surface Number | k<br>E | A<br>F | B<br>G | C<br>H | D<br>I |
|---|---|---|---|---|---|
| S26 | −1.0096 | −2.0952E−04 | 5.7129E−06 | −1.3499E−07 | −6.0197E−09 |
| | 9.7852E−10 | −4.0089E−11 | 4.8336E−13 | 0 | 0 |
| S27 | 0.3353 | −3.4411E−04 | 1.2109E−05 | −3.343E−07 | 4.8037E−09 |
| | 2.7831E−10 | −8.7197E−12 | 6.0437E−15 | 0 | 0 |
| S211 | −6.0422 | −1.3231E−05 | 7.6665E−07 | −2.852E−08 | −2.3216E−10 |
| | −1.3981E−11 | 2.8386E−12 | −6.2068E−14 | 0 | 0 |
| S212 | −2.2026 | 1.2032E−04 | −2.3338E−06 | 1.23E−07 | −4.2003E−09 |
| | 5.7837E−11 | 1.7933E−12 | −5.2563E−14 | 0 | 0 |

Table 6 shows the parameters and condition values for conditions (1)-(8) in accordance with the second embodiment of the invention. It can be seen from Table 6 that the wide-angle lens assembly 2 of the second embodiment satisfies the conditions (1)-(8).

TABLE 6

| | | | | | |
|---|---|---|---|---|---|
| D22 | 5.71 mm | α | 18.77 degrees | β | 17.16 degrees |
| T1131 | 8.62 mm | T3152 | 6.95 mm | T6182 | 7.68 mm |
| f/D22 | 1.09 | R51/R72 | 0.93 | 1/α | 0.05 degrees$^{-1}$ |
| 1/β | 0.06 degrees$^{-1}$ | α/β | 1.09 | T1131/T3152 | 1.24 |
| T1131/T6182 | 1.12 | T3152/T6182 | 0.91 | | |

Figure 6:
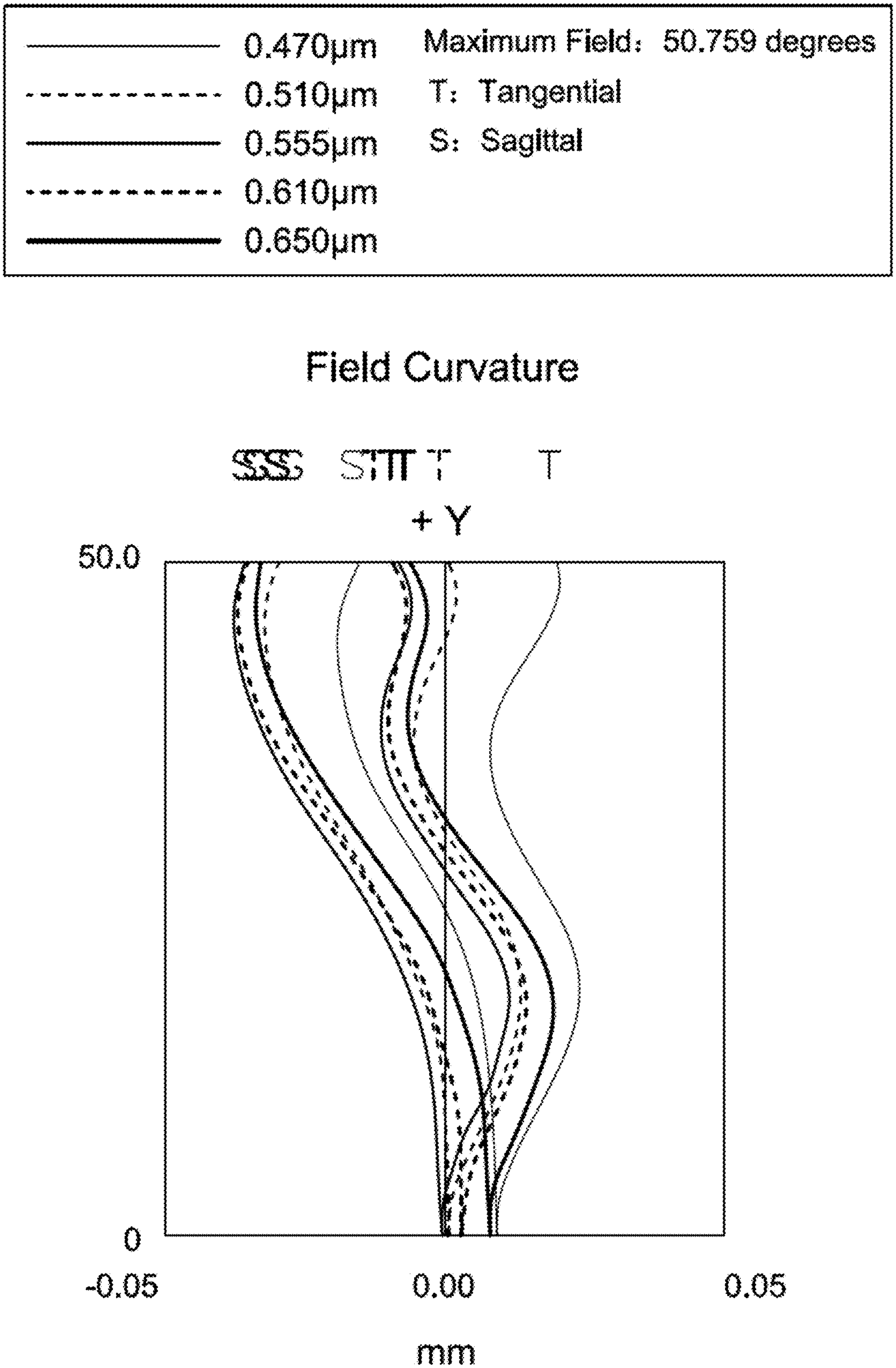
FIGS. 6, 7, 8 depict a field curvature diagram, a distortion diagram, and a modulation transfer function diagram of the wide-angle lens assembly in accordance with the second embodiment of the invention.
Figure 7:
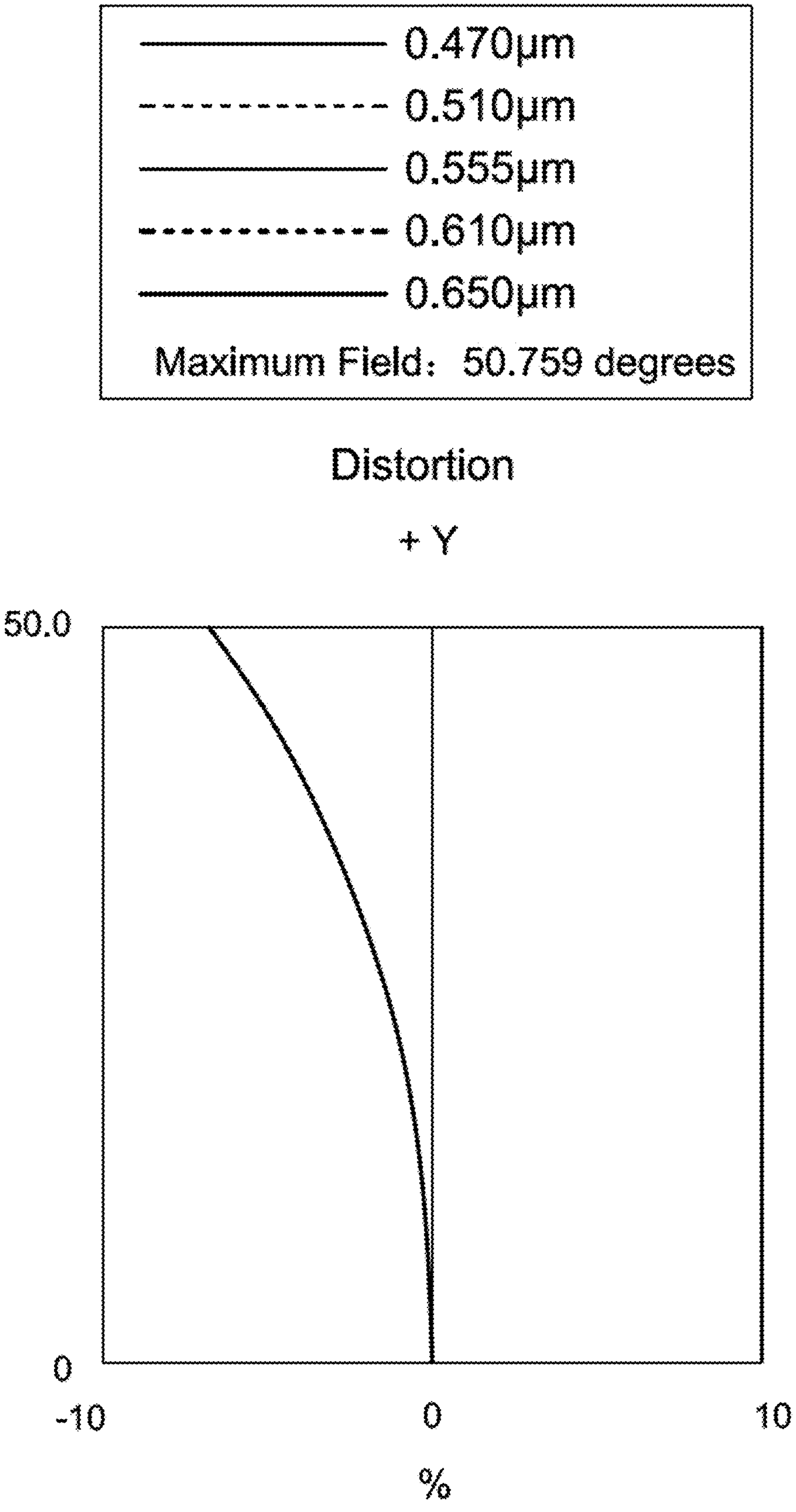
Figure 8:
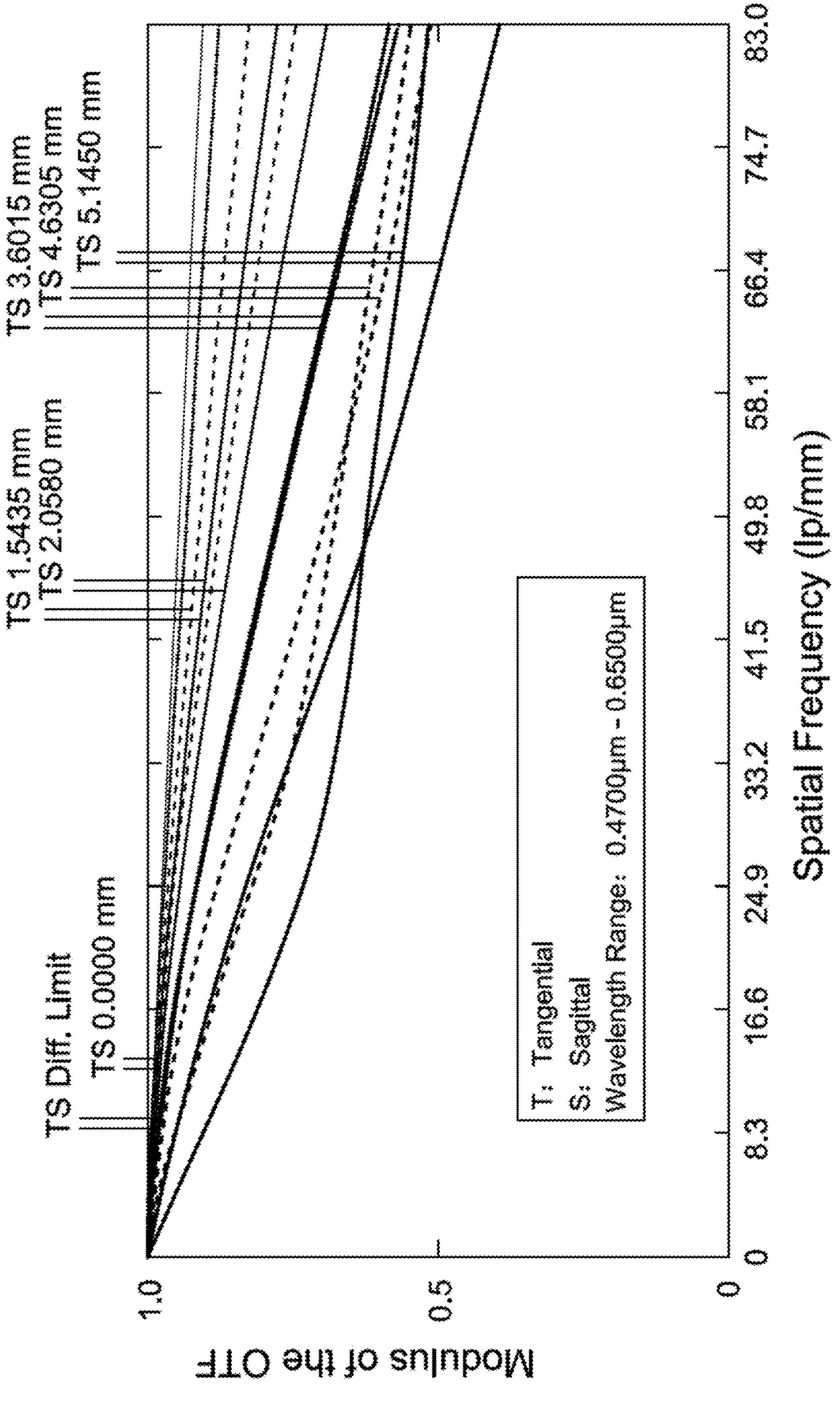

In addition, the wide-angle lens assembly 2 of the second embodiment can meet the requirements of optical performance as seen in FIGS. 6-8. It can be seen from FIG. 6 that the field curvature of tangential direction and sagittal direction in the wide-angle lens assembly 2 of the second embodiment ranges from −0.04 mm to 0.03 mm. It can be seen from FIG. 7 that the distortion in the wide-angle lens assembly 2 of the second embodiment ranges from −7% to 0%. It can be seen from FIG. 8 that the modulation transfer function of tangential direction and sagittal direction in the wide-angle lens assembly 2 of the second embodiment ranges from 0.39 to 1.0. It is obvious that the field curvature and the distortion of the wide-angle lens assembly 2 of the second embodiment can be corrected effectively, and the resolution of the wide-angle lens assembly 2 of the second embodiment can meet the requirement. Therefore, the wide-angle lens assembly 2 of the second embodiment is capable of good optical performance.

Figure 9:
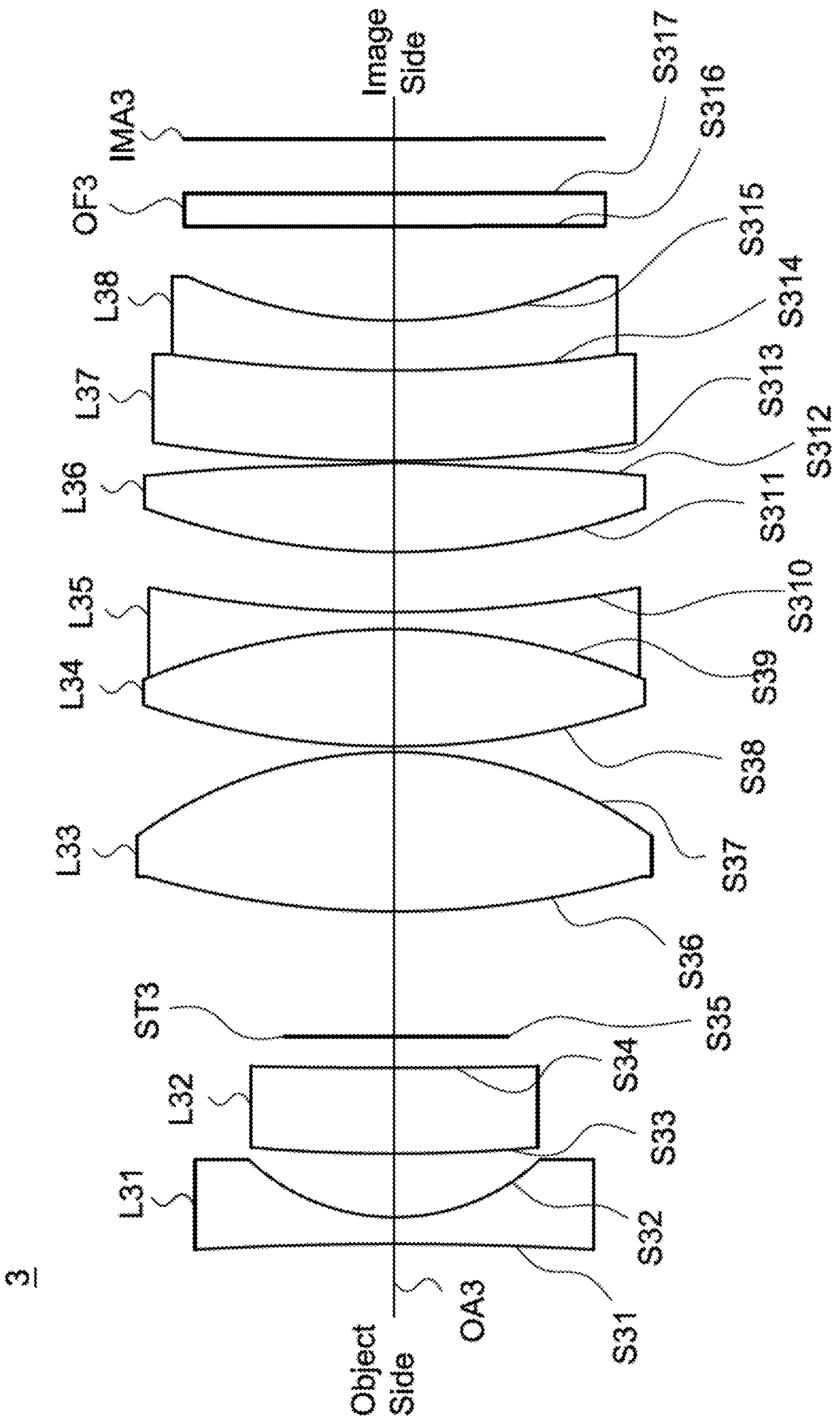
FIG. 9 is a lens layout diagram of a wide-angle lens assembly in accordance with a third embodiment of the invention.

A detailed description of a wide-angle lens assembly in accordance with a third embodiment of the invention is as follows. Referring to FIG. 9, the wide-angle lens assembly 3 includes a first lens L31, a second lens L32, a stop ST3, a third lens L33, a fourth lens L34, a fifth lens L35, a sixth lens L36, a seventh lens L37, an eighth lens L38, and an optical filter OF3, all of which are arranged in order from an object side to an image side along an optical axis OA3. In operation, the light from the object side is imaged on an image plane IMA3.

According to the foregoing, wherein: the seventh lens L37 is a meniscus lens, wherein the image side surface S314 is a concave surface; the eighth lens L38 is a meniscus lens, wherein the object side surface S314 is a convex surface; and both of the object side surface S316 and image side surface S317 of the optical filter OF3 are plane surfaces; with the above design of the lenses, stop ST3, and at least one of the conditions (1)-(8) satisfied, the wide-angle lens assembly 3 can have an effective decreased F-number, an effective increased field of view, an effective increased resolution, and an effective corrected aberration.

Table 7 shows the optical specification of the wide-angle lens assembly 3 in FIG. 9.

TABLE 7

Effective Focal Length = 6.23 mm F-number = 1.64
Total Lens Length = 29.99 mm Field of View = 101.56 degrees

| Surface Number | Radius of Curvature (mm) | Thickness (mm) | Nd | Vd | Effective Focal Length (mm) | Remark |
|---|---|---|---|---|---|---|
| S31 | −113.90 | 0.68 | 1.58913 | 61.2536 | −7.6994 | L31 |
| S32 | 4.75 | 1.77 | | | | |
| S33 | 32.27 | 2.30 | 1.98612 | 16.4839 | 46.3304 | L32 |
| S34 | 103.27 | 0.89 | | | | |
| S35 | ∞ | 3.34 | | | | ST3 |
| S36 | 15.32 | 4.44 | 1.61633 | 63.69 | 10.0705 | L33 |
| S37 | −9.32 | 0.05 | | | | |
| S38 | 17.28 | 3.28 | 1.497 | 81.6054 | 15.5981 | L34 |
| S39 | −13.23 | 0.50 | 1.8081 | 22.6981 | −11.219 | L35 |
| S310 | 30.07 | 1.58 | | | | |
| S311 | 14.05 | 2.36 | 1.88385 | 37.2043 | 11.5825 | L36 |
| S312 | −35.40 | 0.05 | | | | |
| S313 | 35.25 | 2.55 | 1.691 | 54.8226 | 250.847 | L37 |
| S314 | 42.89 | 1.30 | 1.80518 | 25.4579 | −19.655 | L38 |
| S315 | 11.46 | 2.53 | | | | |
| S316 | ∞ | 0.90 | 1.5233 | 54.5172 | | OF3 |
| S317 | ∞ | 1.47 | | | | |

In the third embodiment, the conic constant k and the aspheric coefficients A, B, C, D, E, F, G, H, and I of each aspheric lens are shown in Table 8.

TABLE 8

| Surface Number | k<br>E | A<br>F | B<br>G | C<br>H | D<br>I |
|---|---|---|---|---|---|
| S36 | 0.3415 | −1.4509E−04 | −3.2967E−07 | 8.7784E−08 | −4.8479E−09 |
| | 1.7824E−10 | −4.4295E−12 | 2.7928E−14 | 4.0427E−16 | −8.8577E−18 |
| S37 | 0.0687 | −4.5205E−05 | 3.441E−06 | 1.4419E−08 | −1.6744E−09 |
| | 1.1641E−10 | −2.9417E−12 | 2.1722E−14 | 1.0871E−16 | −8.6183E−18 |
| S311 | −3.3519 | −4.6371E−05 | 2.2279E−09 | −8.4083E−09 | 3.5426E−09 |
| | −2.0744E−10 | 5.9454E−12 | −8.1203E−14 | 1.0773E−15 | −2.2549E−17 |
| S312 | −55.9298 | 3.1395E−05 | −2.2541E−06 | 3.0448E−07 | −1.0888E−08 |
| | 8.1116E−11 | 5.9843E−12 | −1.0491E−13 | −9.2485E−16 | 1.181E−17 |

Table 9 shows the parameters and condition values for conditions (1)-(8) in accordance with the third embodiment of the invention. It can be seen from Table 9 that the wide-angle lens assembly 3 of the third embodiment satisfies the conditions (1)-(8).

TABLE 9

| | | | | | |
|---|---|---|---|---|---|
| D22 | 6.16 mm | α | 26.91 degrees | β | 7.25 degrees |
| T1131 | 8.98 mm | T3152 | 8.27 mm | T6182 | 6.26 mm |
| f/D22 | 1.01 | R51/R72 | −0.31 | 1/α | 0.04 degrees$^{-1}$ |
| 1/β | 0.14 degrees$^{-1}$ | α/β | 3.71 | T1131/T3152 | 1.09 |
| T1131/T6182 | 1.43 | T3152/T6182 | 1.32 | | |

Figure 10:
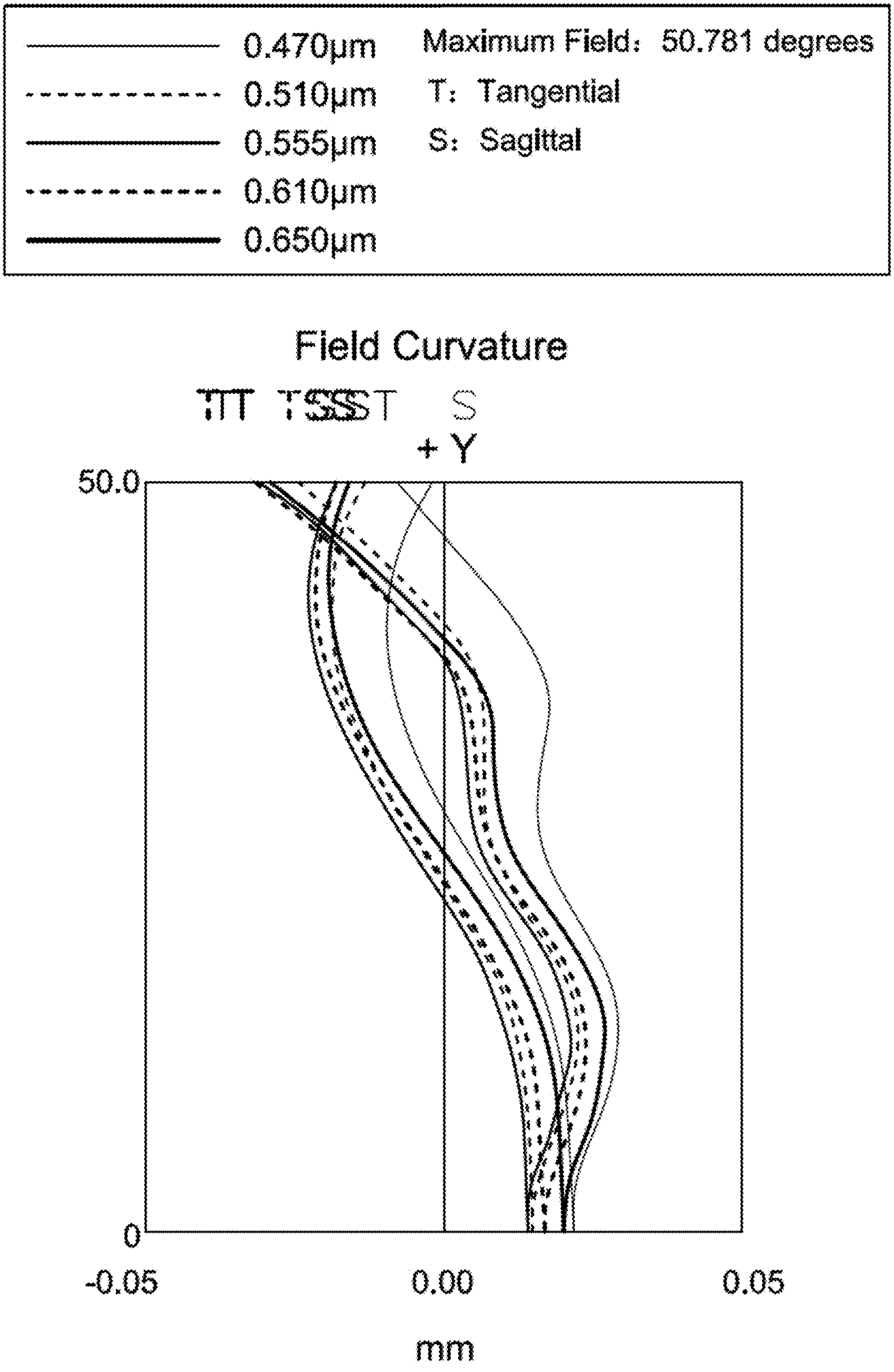
FIGS. 10, 11, 12 depict a field curvature diagram, a distortion diagram, and a modulation transfer function diagram of the wide-angle lens assembly in accordance with the third embodiment of the invention.
Figure 11:
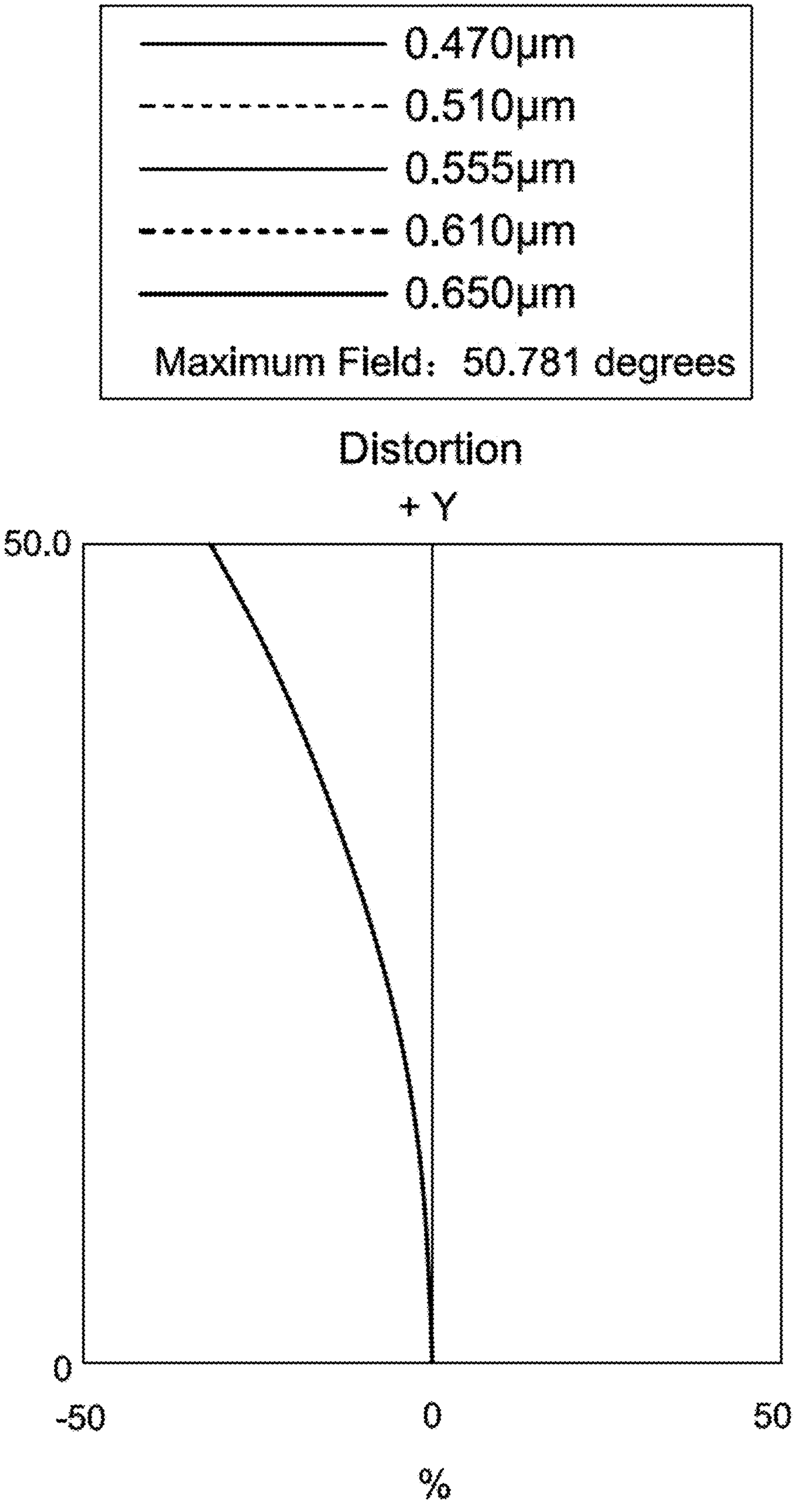
Figure 12:
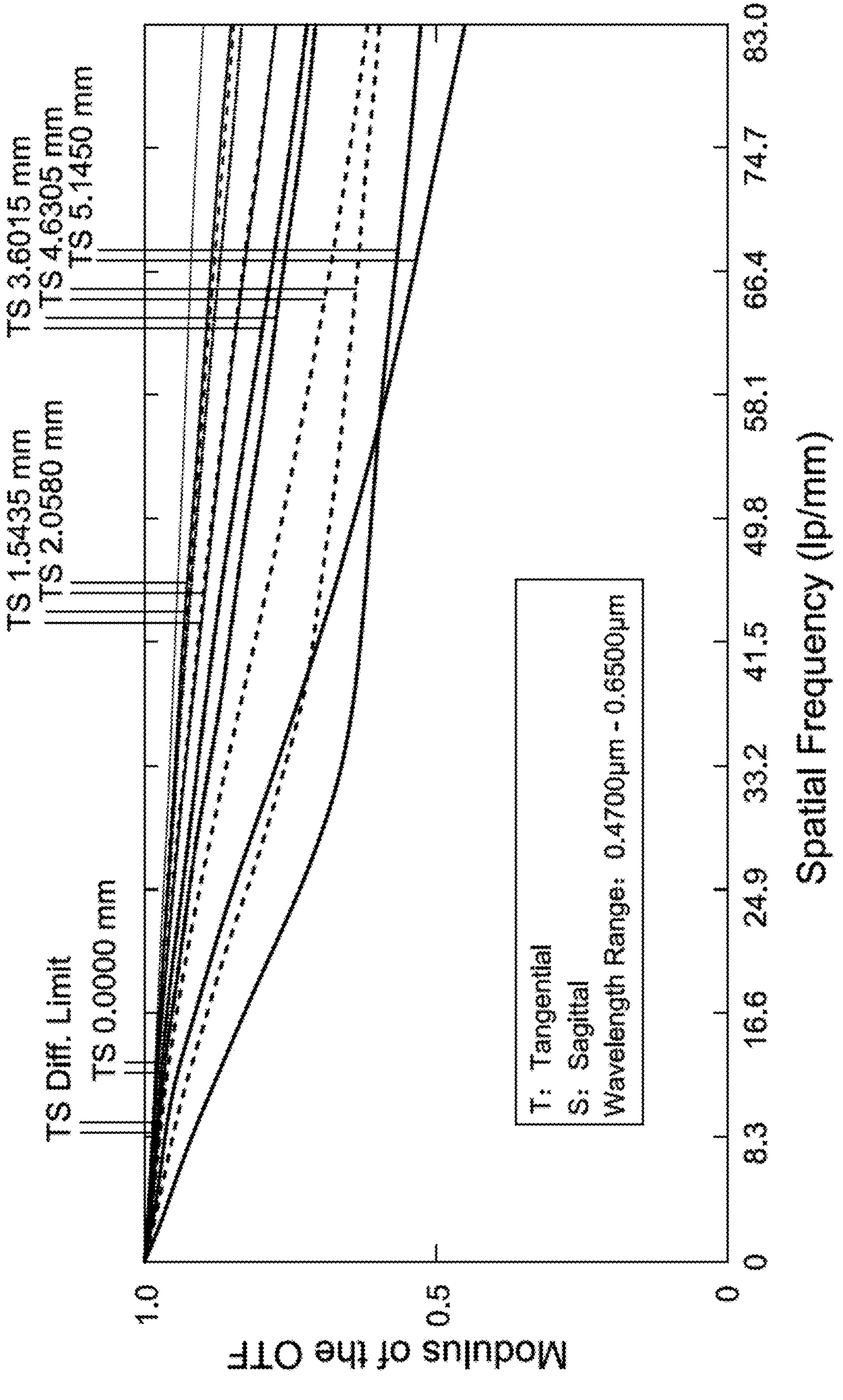

In addition, the wide-angle lens assembly 3 of the third embodiment can meet the requirements of optical performance as seen in FIGS. 10-12. It can be seen from FIG. 10 that the field curvature of tangential direction and sagittal direction in the wide-angle lens assembly 3 of the third embodiment ranges from −0.04 mm to 0.03 mm. It can be seen from FIG. 11 that the distortion in the wide-angle lens assembly 3 of the third embodiment ranges from −35% to 0%. It can be seen from FIG. 12 that the modulation transfer function of tangential direction and sagittal direction in the wide-angle lens assembly 3 of the third embodiment ranges from 0.45 to 1.0. It is obvious that the field curvature and the distortion of the wide-angle lens assembly 3 of the third embodiment can be corrected effectively, and the resolution of the wide-angle lens assembly 3 of the third embodiment can meet the requirement. Therefore, the wide-angle lens assembly 3 of the third embodiment is capable of good optical performance.

Figure 13:
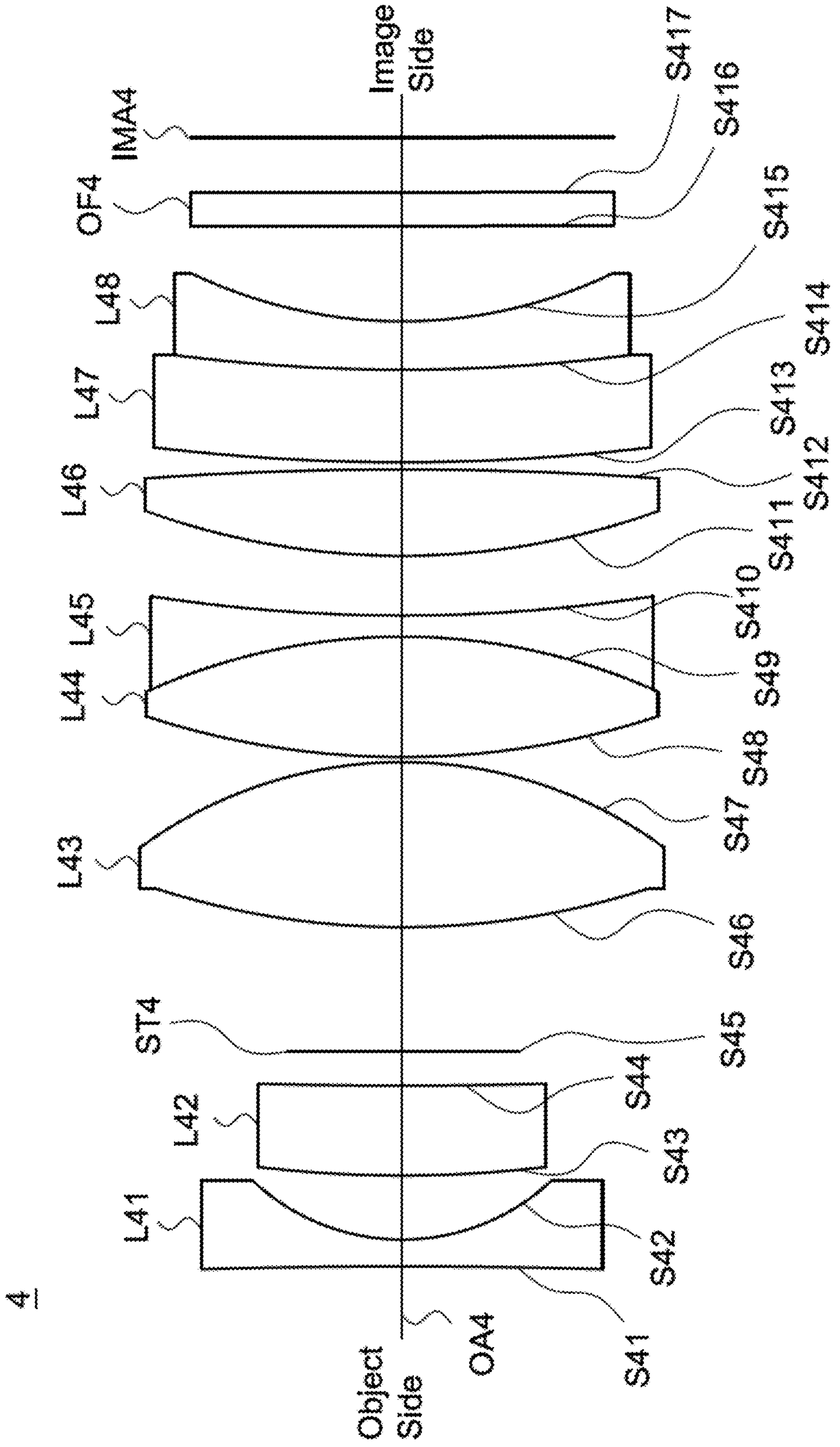
FIG. 13 is a lens layout diagram of a wide-angle lens assembly in accordance with a fourth embodiment of the invention.

A detailed description of a wide-angle lens assembly in accordance with a fourth embodiment of the invention is as follows. Referring to FIG. 13, the wide-angle lens assembly 4 includes a first lens L41, a second lens L42, a stop ST4, a third lens L43, a fourth lens L44, a fifth lens L45, a sixth lens L46, a seventh lens L47, an eighth lens L48, and an optical filter OF4, all of which are arranged in order from an object side to an image side along an optical axis OA4. In operation, the light from the object side is imaged on an image plane IMA4.

According to the foregoing, wherein: the seventh lens L47 is a meniscus lens, wherein the image side surface S414 is a concave surface; the eighth lens L48 is a meniscus lens, wherein the object side surface S414 is a convex surface; and both of the object side surface S416 and image side surface S417 of the optical filter OF4 are plane surfaces; with the above design of the lenses, stop ST4, and at least one of the conditions (1)-(8) satisfied, the wide-angle lens assembly 4 can have an effective decreased F-number, an effective increased field of view, an effective increased resolution, and an effective corrected aberration.

Table 10 shows the optical specification of the wide-angle lens assembly 4 in FIG. 13.

TABLE 10

Effective Focal Length = 6.24 mm F-number = 1.64
Total Lens Length = 30.01 mm Field of View = 101.45 degrees

| Surface Number | Radius of Curvature (mm) | Thickness (mm) | Nd | Vd | Effective Focal Length (mm) | Remark |
|---|---|---|---|---|---|---|
| S41 | −98.37 | 0.68 | 1.58913 | 61.2536 | −7.7192 | L41 |
| S42 | 4.80 | 1.74 | | | | |
| S43 | 31.69 | 2.37 | 1.98612 | 16.4839 | 45.635 | L42 |
| S44 | 100.59 | 0.89 | | | | |
| S45 | ∞ | 3.32 | | | | ST4 |
| S46 | 15.22 | 4.43 | 1.61633 | 63.69 | 10.0743 | L43 |
| S47 | −9.37 | 0.05 | | | | |
| S48 | 17.23 | 3.29 | 1.497 | 81.6054 | 15.5665 | L44 |
| S49 | −13.21 | 0.44 | 1.8081 | 22.6981 | −11.231 | L45 |
| S410 | 30.21 | 1.67 | | | | |
| S411 | 14.21 | 2.37 | 1.88385 | 37.2043 | 11.5522 | L46 |
| S412 | −33.99 | 0.05 | | | | |
| S413 | 34.50 | 2.56 | 1.691 | 54.8226 | 227.317 | L47 |
| S414 | 42.84 | 1.32 | 1.80518 | 25.4579 | −19.275 | L48 |
| S415 | 11.29 | 2.48 | | | | |
| S416 | ∞ | 0.90 | 1.5233 | 54.5172 | | OF4 |
| S417 | ∞ | 1.45 | | | | |

In the fourth embodiment, the conic constant k and the aspheric coefficients A, B, C, D, E, F, G, H, and I of each aspheric lens are shown in Table 11.

TABLE 11

| Surface Number | k<br>E | A<br>F | B<br>G | C<br>H | D<br>I |
|---|---|---|---|---|---|
| S46 | 0.4689 | −1.4286E−04 | −1.2608E−07 | 8.4961E−08 | −5.0366E−09 |
| | 1.8904E−10 | −4.256E−12 | 2.2815E−14 | 3.7345E−16 | −7.16E−18 |
| S47 | 0.0491 | −3.9144E−05 | 3.8876E−06 | −4.5438E−10 | −1.9441E−09 |
| | 1.3599E−10 | −2.8875E−12 | 1.7893E−14 | −6.6484E−17 | −4.0961E−18 |
| S411 | −3.3748 | −3.5516E−05 | 6.3392E−07 | −1.1311E−08 | 3.2508E−09 |
| | −2.0999E−10 | 6.085E−12 | −8.0128E−14 | 1.3723E−15 | −3.1585E−17 |
| S412 | −52.1117 | 3.5227E−05 | −1.5807E−06 | 3.1154E−07 | −1.1336E−08 |
| | 6.8808E−11 | 6.3492E−12 | −9.8907E−14 | −7.67E−16 | 2.4569E−18 |

Table 12 shows the parameters and condition values for conditions (1)-(8) in accordance with the fourth embodiment of the invention. It can be seen from Table 12 that the wide-angle lens assembly 4 of the fourth embodiment satisfies the conditions (1)-(8).

TABLE 12

| | | | | | |
|---|---|---|---|---|---|
| D22 | 6.16 mm | α | 26.98 degree | β | 5.27 degree |
| T1131 | 9.00 mm | T3152 | 8.22 mm | T6182 | 6.29 mm |
| f/D22 | 1.01 | R51/R72 | −0.31 | 1/α | 0.04 degree$^{-1}$ |
| 1/β | 0.19 degree$^{-1}$ | α/β | 5.12 | T1131/T3152 | 1.10 |
| T1131/T6182 | 1.43 | T3152/T6182 | 1.31 | | |

The present invention provides another wide-angle lens assembly including a first lens, a second lens, a third lens, a fourth lens, a fifth lens, a sixth lens, a seventh lens, and an eighth lens. The first lens is with negative refractive power and includes a concave surface facing an image side. The second lens is with refractive power. The third lens is with positive refractive power and includes a convex surface facing an object side. The fourth lens is with refractive power. The fifth lens is with refractive power. The sixth lens is with refractive power. The seventh lens is with refractive power. The eighth lens is with refractive power. The first lens, the second lens, the third lens, the fourth lens, the fifth lens, the sixth lens, the seventh lens, and the eighth lens are arranged in order from the object side to the image side along an optical axis. The wide-angle lens assembly satisfies at least one of the following conditions: $0.8 \leq f/D22 \leq 3$; 0.03 degrees$^{-1} \leq 1/\beta \leq 0.35$ degrees$^{-1}$; wherein f is an effective focal length of the wide-angle lens assembly, D22 is an effective optical diameter of an image side surface of the second lens, and $\beta$ is a maximum tangent angle of a cemented surface. A wide-angle lens assembly of the present invention is a preferred embodiment of the present invention when the wide-angle lens assembly satisfies the above features and at least one of the above conditions.

Referring to Table 13, Table 14, Table 16, Table 17, Table 19, and Table 20, wherein Table 13, Table 16, and Table 19 show optical specification in accordance with a fifth, a sixth, and a seventh embodiments of the invention, respectively, and Table 14, Table 17, and Table 20 show aspheric coefficients of each aspheric lens in Table 13, Table 16, and Table 19, respectively. The aspheric surface sag z of each aspheric lens in the following embodiments can be calculated by the following formula: $Z=ch^2/\{1+[1-(k+1)c^2h^2]^{1/2}\}+Ah^4+Bh^6+Ch^8+Dh^{10}+Eh^{12}+Fh^{14}+Gh^{16}+Hh^{18}+Ih^{20}$, where c is curvature, h is the vertical distance from the lens surface to the optical axis, k is conic constant, A, B, C, D, E, F, G, H, and I are aspheric coefficients, and the value of the aspheric coefficient A, B, C, D, E, F, G, H, and I are presented in scientific notation, such as 2E-03 for $2\times10^{-3}$.

Figure 15:
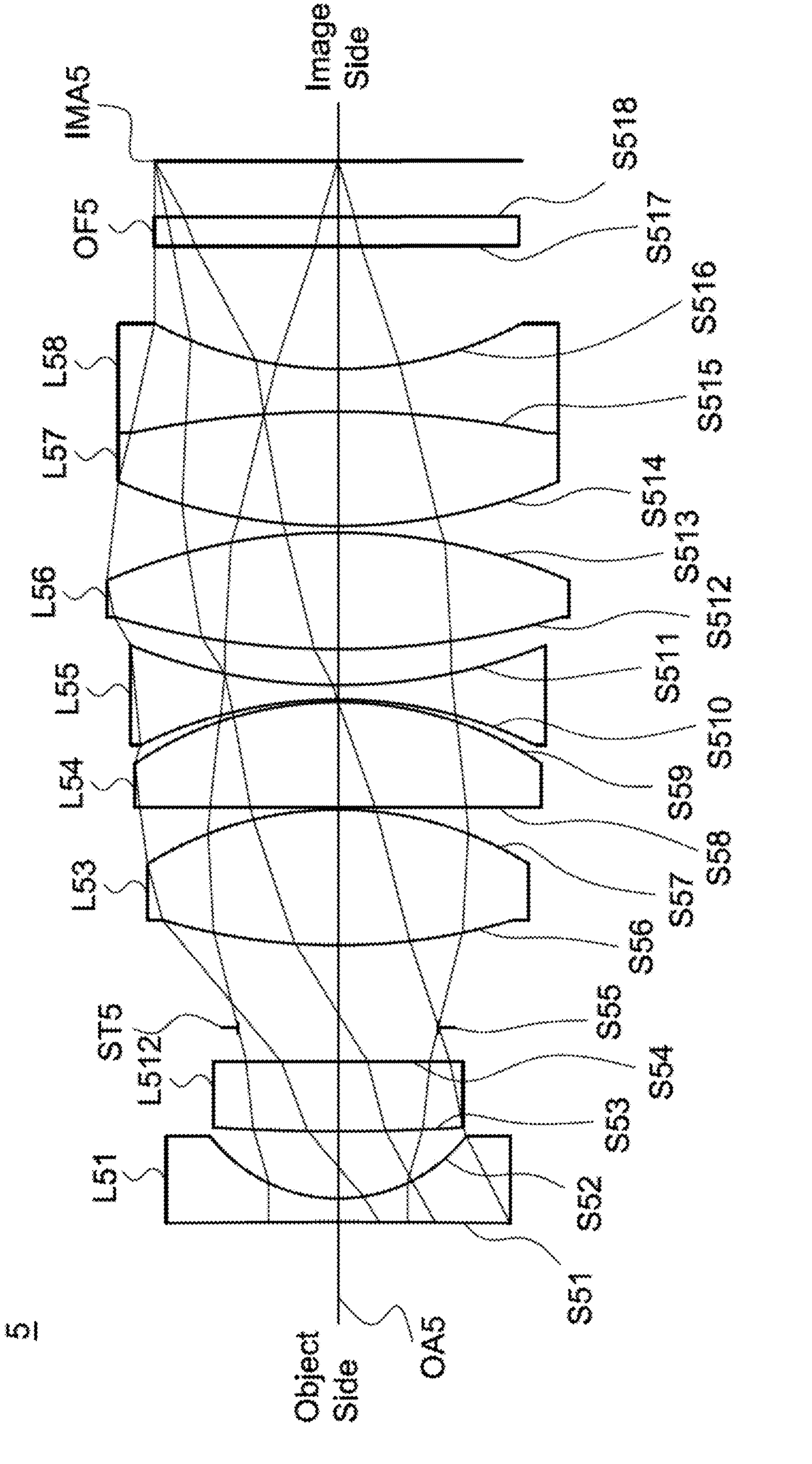
FIGS. 15, 19, 23 are lens layout and optical path diagrams of a wide-angle lens assembly in accordance with a fifth, sixth, and seventh embodiments of the invention, respectively.
Figure 19:
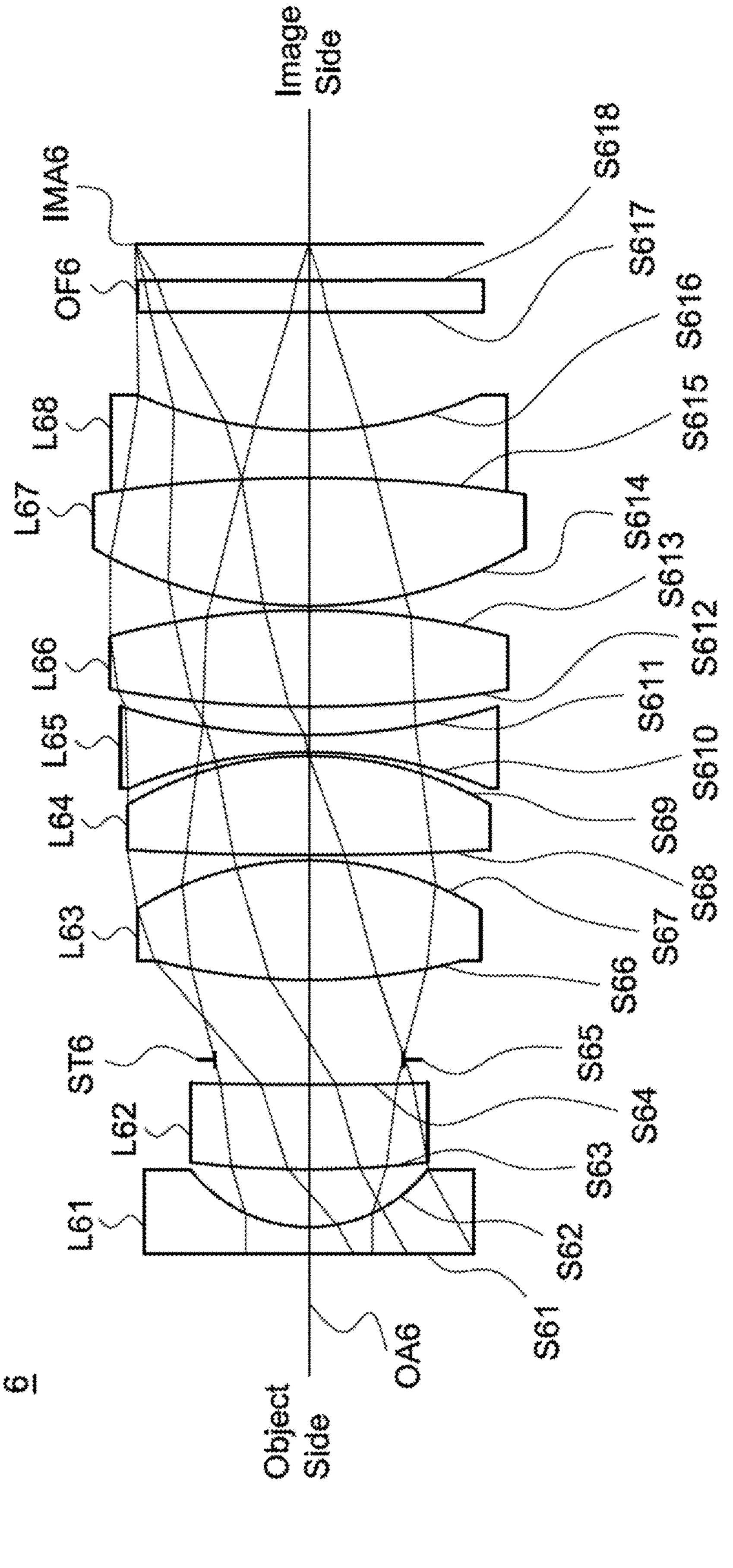
Figure 23:
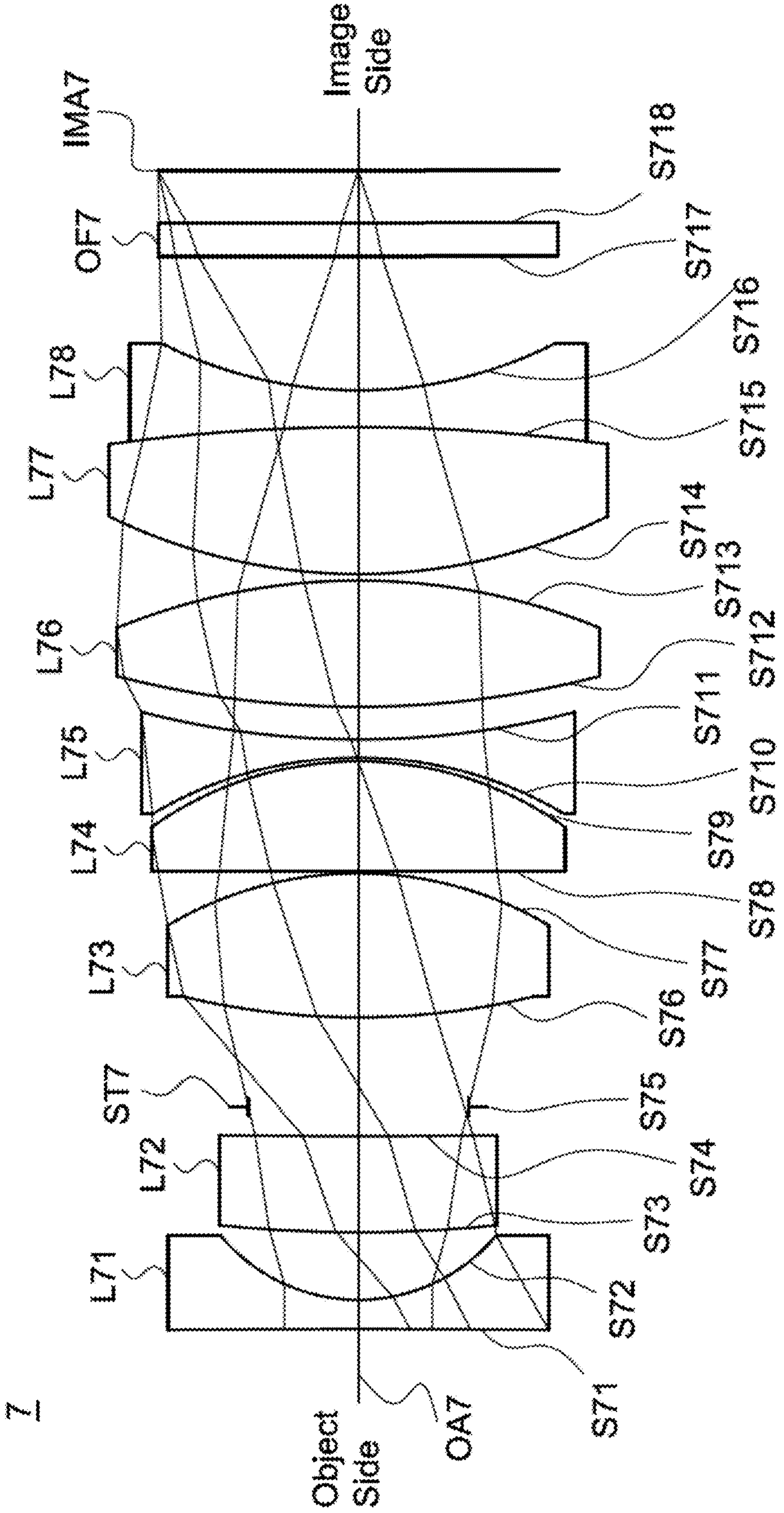

FIGS. 15, 19, and 23 are lens layout diagrams of the lens assemblies in accordance with the fifth, sixth, and seventh embodiments of the invention, respectively.

The first lenses L51, L61, L71 are biconcave lenses with negative refractive power and made of glass material, wherein the object side surfaces S51, S61, S71 are concave surfaces, the image side surfaces S52, S62, S72 are concave surfaces, and both of the object side surfaces S51, S61, S71 and image side surfaces S52, S62, S72 are spherical surfaces.

The second lenses L52, L62, L72 are meniscus lenses with positive refractive power and made of glass material, wherein the object side surfaces S53, S63, S73 are convex surfaces, the image side surfaces S54, S64, S74 are concave surfaces, and both of the object side surfaces S53, S63, S73 and image side surfaces S54, S64, S74 are spherical surfaces.

The third lenses L53, L63, L73 are biconvex lenses with positive refractive power and made of glass material, wherein the object side surfaces S56, S66, S76 are convex surfaces, the image side surfaces S57, S67, S77 are convex surfaces, and both of the object side surfaces S56, S66, S76 and image side surfaces S57, S67, S77 are aspheric surfaces.

The fourth lenses L54, L64, L74 are with positive refractive power and made of glass material, wherein the image side surfaces S59, S69, S79 are convex surfaces and the image side surfaces S59, S69, S79 are spherical surfaces.

The fifth lenses L55, L65, L75 are biconcave lenses with negative refractive power and made of glass material, wherein the object side surfaces S510, S610, S710 are concave surfaces, the image side surfaces S511, S611, S711 are concave surfaces, and both of the object side surfaces S510, S610, S710 and image side surfaces S511, S611, S711 are spherical surfaces.

The sixth lenses L56, L66, L76 are biconvex lenses with positive refractive power and made of glass material, wherein the object side surfaces S512, S612, S712 are convex surfaces, the image side surfaces S513, S613, S713 are convex surfaces, and both of the object side surfaces S512, S612, S712 and image side surfaces S513, S613, S713 are aspheric surfaces.

The seventh lenses L57, L67, L77 are biconvex lenses with positive refractive power and made of glass material, wherein the object side surfaces S514, S614, S714 are convex surfaces and both of the object side surfaces S514, S614, S714 and image side surfaces S515, S615, S715 are spherical surfaces.

The eighth lenses L58, L68, L78 are biconcave lenses with negative refractive power and made of glass material, wherein the object side surfaces S515, S615, S715 are concave surfaces, the image side surfaces S516, S616, S716 are concave surfaces, and both of the object side surfaces S515, S615, S715 and image side surfaces S516, S616, S716 are spherical surfaces.

The image side surfaces S515, S615, S715 of the seventh lenses L57, L67, L77 and the object side surfaces S515, S615, S715 of the eighth lenses L58, L68, L78 are cemented on the cemented surfaces. The cemented surfaces are the image side surfaces S515, S615, S715 of the seventh lenses L57, L67, L77, or the object side surfaces S515, S615, S715 of the eighth lenses L58, L68, L78.

Figure 27:
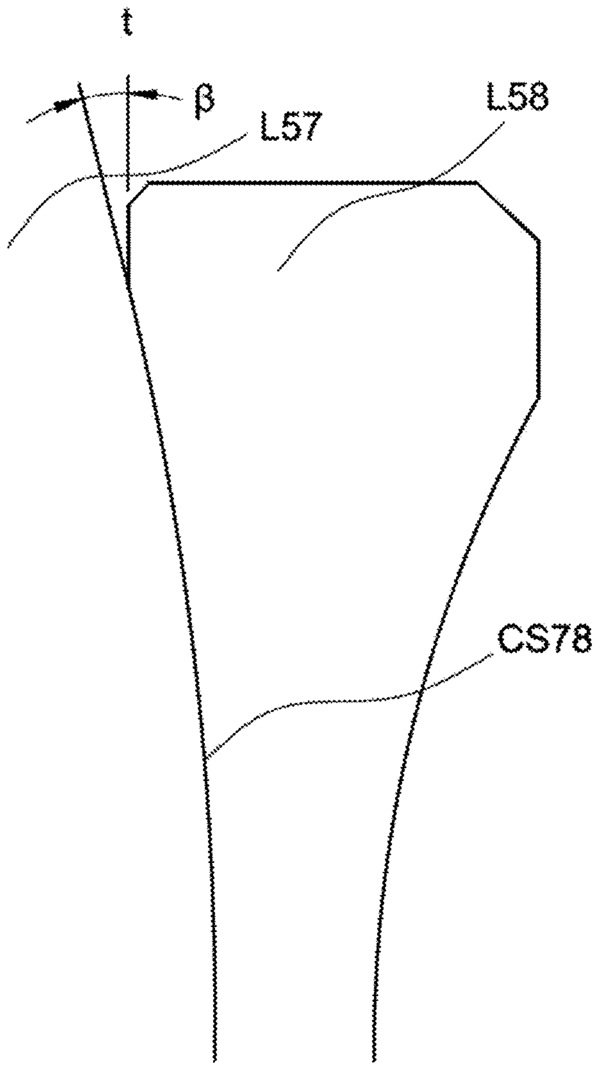
FIG. 27 depicts a maximum tangent angle of a cemented surface diagram of the wide-angle lens assembly in accordance with the fifth embodiment of the invention.

In addition, the wide-angle lens assemblies 5, 6, and 7 satisfy at least one of the following conditions (1)-(2), (4), (6)-(11):

$$0.8 \leq f/D22 \leq 3; \quad (1)$$

$$-3 \leq R51/R72 \leq 3; \quad (2)$$

$$0.03 \text{ degrees}^{-1} \leq 1/\beta \leq 0.35 \text{ degrees}^{-1}; \quad (4)$$

$$0 \leq T1131/T3152 \leq 3; \quad (6)$$

$$0 \leq T1131/T6182 \leq 3; \quad (7)$$

$$0 \leq T3152/T6182 \leq 3; \quad (8)$$

$$0.17 \leq T11ST/TTL \leq 0.2; \quad (9)$$

$$-1.25 \leq f1/f \leq -1.15; \quad (10)$$

$$-1.6 \leq f12/f \leq -1.4; \quad (11)$$

where f is an effective focal length of the wide-angle lens assemblies 5, 6, 7 in the fifth embodiment through the seventh embodiment; D22 is an effective optical diameter of the image side surfaces S54, S64, S74 of the second lenses L52, L62, L72 in the fifth embodiment through the seventh embodiment; R51 is a radius of curvature of the object side surfaces S510, S610, S710 of the fifth lenses L55, L65, L75 in the fifth embodiment through the seventh embodiment; R72 is a radius of curvature of the image side surfaces S515, S615, S715 of the seventh lenses L57, L67, L77 in the fifth embodiment through the seventh embodiment; $\beta$ is a maximum tangent angle of the cemented surfaces of the eighth lenses L58, L68, L78 and the seventh lenses L57, L67, L77 in the fifth embodiment through the seventh embodiment, B is shown, for example, in FIG. 27 and the fifth embodiment, wherein the symbol L57 represents the seventh lens, the symbol L58 represents the eighth lens, the symbol CS78 represents the cemented surface or the radius of curvature R of the cemented lens, the symbol t represents the virtual line between the lens and the optical axis or the surface radius of curvature R of the non-effective optical diameter area (the lens is approximately perpendicular to the optical axis, and the tangent angle is the angle between the tangent line t and cemented surface CS78); the symbol β is the maximum tangent angle of the cemented surface CS78; T1131 is an interval from the object side surfaces S51, S61, S71 of the first lenses L51, L61, L71 to the object side surfaces S56, S66, S76 of the third lenses L53, L63, L73 along the optical axes OA5, OA6, OA7 in the fifth embodiment through the seventh embodiment; T3152 is an interval from the object side surfaces S56, S66, S76 of the third lenses L53, L63, L73 to the image side surfaces S511, S611, S711 of the fifth lenses L55, L65, L75 along the optical axes OA5, OA6, OA7 in the fifth embodiment through the seventh embodiment; T6182 is an interval from the object side surfaces S512, S612, S712 of the sixth lenses L56, L66, L76 to the image side surfaces S516, S616, S716 of the eighth lenses L58, L68, L78 along the optical axes OA5, OA6, OA7 in the fifth embodiment through the seventh embodiment; T11ST is an interval from the object side surfaces S51, S61, S71 of the first lenses L51, L61, L71 to the stop surfaces S55, S65, S75 along the optical axes OA5, OA6, OA7 in the fifth embodiment through the seventh embodiment; TTL is an interval from the object side surfaces S51, S61, S71 of the first lenses L51, L61, L71 to the image planes IMA5, IMA6, IMA7 along the optical axes OA5, OA6, OA7 in the fifth embodiment through the seventh embodiment; f1 is an effective focal length of the first lenses L51, L61, L71 in the fifth embodiment through the seventh embodiment; and f12 is an effective focal length of the combination of the first lenses L51, L61, L71 and the second lenses L52, L62, L72 in the fifth embodiment through the seventh embodiment. With the wide-angle lens assemblies 5, 6, 7 satisfying at least one of the above conditions (1)-(2), (4), (6)-(11), the F-number can be effectively decreased, the field of view can be effectively increased, the resolution can be effectively increased, and the aberration can be effectively corrected.

When the condition (3): $0.03\ \text{degrees}^{-1} \leq 1/\beta \leq 0.35\ \text{degrees}^{-1}$ is satisfied, the lens tilt and eccentric error can be effectively decreased. When the condition (7): $0.17 \leq T11ST/TTL \leq 0.2$ is satisfied, the effective optical diameters of the first lens and second lens can be effectively controlled. When the condition (8): $-1.25 \leq f1/f \leq -1.15$ is satisfied, the effective focal length of the first lens can be effectively controlled to make it fall within a reasonable range, so as to reduce the sensitivity of the first lens. When the condition (9): $-1.6 \leq f12/f \leq -1.4$ is satisfied, the balance of the front and rear lens groups can be effectively ensured. The incident ray with large angle can be gathered together to adjust the light path preventing big bend when the first lens is with negative refractive power. The interval from the object side surface of the first lens to the stop can be decreased to reduce the front end effective diameter of the wide-angle lens assembly, so as to achieve compact size when the second lens is a high refractive index lens with positive refractive power. The spherical aberration, distortion, and field curvature caused by the first lens and second lens can be effectively decreased when the third lens is an aspheric lens with positive refractive power. The chromatic aberration can be effectively decreased when the fourth lens is a low-dispersion lens with positive refractive power. The optical path can be effectively adjusted when the fifth lens is a biconcave lens with negative refractive power. The coma, astigmatism, and field curvature can be effectively decreased when the sixth lens is an aspheric lens with positive refractive power. The chromatic aberration can be effectively decreased, the assembly stability can be effectively improved, and the production yield rate can be effectively increased when the seventh lens and the eighth lens are cemented.

A detailed description of a wide-angle lens assembly in accordance with a fifth embodiment of the invention is as follows. Referring to FIG. 15, the wide-angle lens assembly 5 includes a first lens L51, a second lens L52, a stop ST5, a third lens L53, a fourth lens L54, a fifth lens L55, a sixth lens L56, a seventh lens L57, an eighth lens L58, and an optical filter OF5, all of which are arranged in order from an object side to an image side along an optical axis OA5. In operation, the light from the object side is imaged on an image plane IMA5.

According to the foregoing, wherein: the fourth lens L54 is a plano-convex lens, wherein the object side surface S58 is a plane surface; both of the object side surface S517 and image side surface S518 of the optical filter OF5 are plane surfaces; and with the above design of the lenses, stop ST5, and at least one of the conditions (1)-(2), (4), and (6)-(11) satisfied, the wide-angle lens assembly 5 can have an effective decreased F-number, an effective increased field of view, an effective increased resolution, and an effective corrected aberration.

Table 13 shows the optical specification of the wide-angle lens assembly 5 in FIG. 15.

TABLE 13

Effective Focal Length = 6.24 mm F-number = 1.64
Total Lens Length = 29.99 mm Field of View = 101.60 degrees

| Surface Number | Radius of Curvature (mm) | Thickness (mm) | Nd | Vd | Effective Focal Length (mm) | Remark |
|---|---|---|---|---|---|---|
| S51 | −195.49 | 0.70 | 1.58913 | 61.2536 | −7.596 | L51 |
| S52 | 4.60 | 1.84 | | | | |
| S53 | 44.68 | 1.98 | 1.98613 | 16.4839 | 48.35 | L52 |
| S54 | 599.04 | 0.95 | | | | |
| S55 | ∞ | 2.34 | | | | ST5 |
| S56 | 16.07 | 3.87 | 1.61921 | 63.85 | 9.834 | L53 |
| S57 | −8.88 | 0.06 | | | | |
| S58 | ∞ | 2.97 | 1.497 | 81.6128 | 20.109 | L54 |
| S59 | −10.02 | 0.06 | | | | |
| S510 | −12.83 | 0.46 | 1.76183 | 26.6047 | −8.985 | L55 |
| S511 | 15.12 | 0.94 | | | | |
| S512 | 17.55 | 3.38 | 1.88386 | 37.2043 | 9.612 | L56 |
| S513 | −15.12 | 0.06 | | | | |
| S514 | 14.98 | 3.35 | 1.691 | 54.8153 | 14.495 | L57 |
| S515 | −27.74 | 1.26 | 1.80518 | 25.4579 | −10.178 | L58 |
| S516 | 11.99 | 3.41 | | | | |
| S517 | ∞ | 0.90 | 1.5233 | 54.5172 | | OF5 |
| S518 | ∞ | 1.47 | | | | |

In the fifth embodiment, the conic constant k and the aspheric coefficients A, B, C, D, E, F, G, H, and I of each aspheric lens are shown in Table 14.

TABLE 14

| Surface Number | k<br>E | A<br>F | B<br>G | C<br>H | D<br>I |
|---|---|---|---|---|---|
| S56 | −0.7298 | −0.0002 | 4.13E−06 | 6.95E−08 | 3.24E−09 |
| | −5.31E−10 | 7.93E−12 | 8.45E−13 | −2.72E−14 | 2.54E−16 |
| S57 | −0.3212 | −8.09E−06 | 2.38E−06 | 1.20E−07 | −2.06E−09 |
| | 3.28E−11 | 3.29E−12 | −7.81E−14 | −6.39E−15 | 2.74E−16 |
| S512 | −5.6254 | 3.31E−05 | −1.10E−06 | 2.52E−08 | 4.58E−10 |
| | −3.94E−11 | −1.80E−13 | −1.52E−14 | 7.92E−16 | −7.02E−18 |
| S513 | −0.8733 | 8.00E−05 | −1.95E−06 | 8.24E−08 | −1.63E−09 |
| | −1.27E−11 | 9.87E−13 | −3.62E−14 | 2.67E−16 | 2.39E−18 |

Table 15 shows the parameters and condition values for conditions (1)-(2), (4), (6)-(11) in accordance with the fifth embodiment of the invention. It can be seen from Table 15 that the wide-angle lens assembly 5 of the fifth embodiment satisfies the conditions (1)-(2), (4), (6)-(11).

TABLE 15

| | | | | | |
|---|---|---|---|---|---|
| D22 | 6.36 mm | β | 12.18 degrees | T1131 | 7.81 mm |
| T3152 | 7.41 mm | T6182 | 8.05 mm | T11ST | 5.47 mm |
| f12 | −9.42 mm | | | | |
| f/D22 | 0.98 | R51/R72 | 0.46 | 1/β | 0.08 $\text{degrees}^{-1}$ |
| T1131/T3152 | 1.05 | T1131/T6182 | 0.97 | T3152/T6182 | 0.92 |
| T11ST/TTL | 0.18 | f1/f | −1.22 | f12/f | −1.51 |

Figure 16:
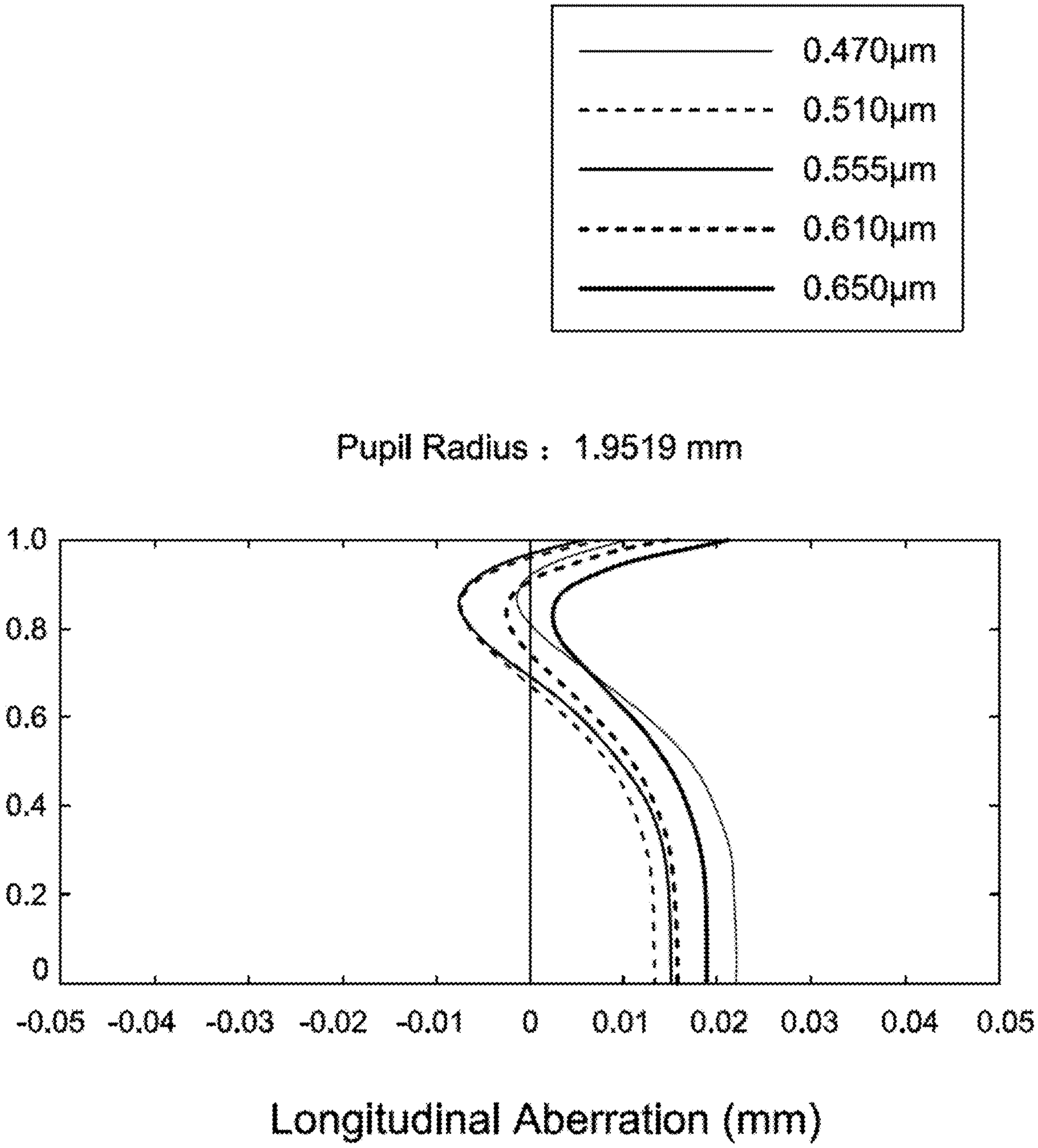
FIGS. 16, 17, 18 depict a longitudinal aberration diagram, a field curvature diagram, and a distortion diagram of the wide-angle lens assembly in accordance with the fifth embodiment of the invention, respectively.
Figure 17:
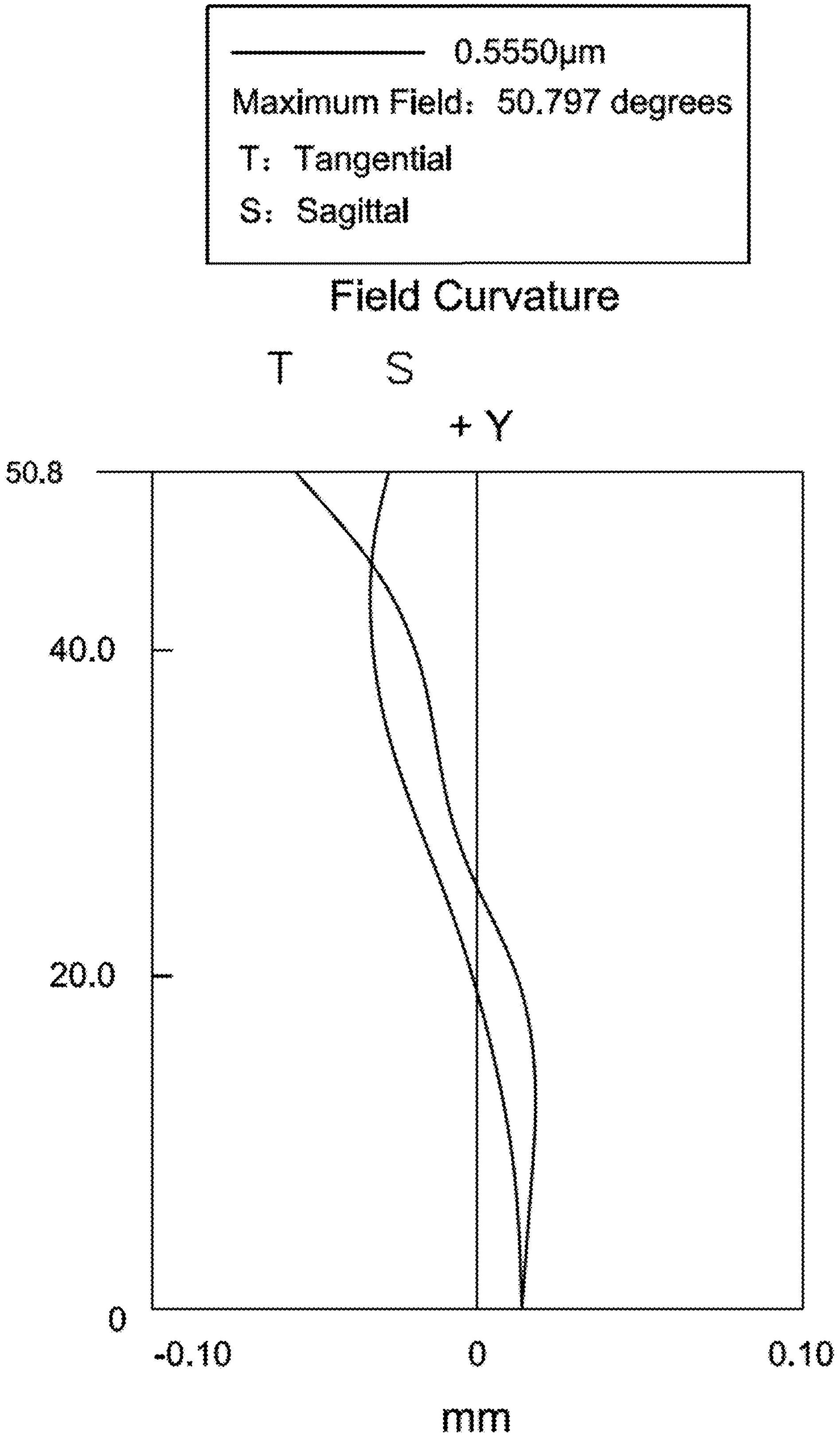
Figure 18:
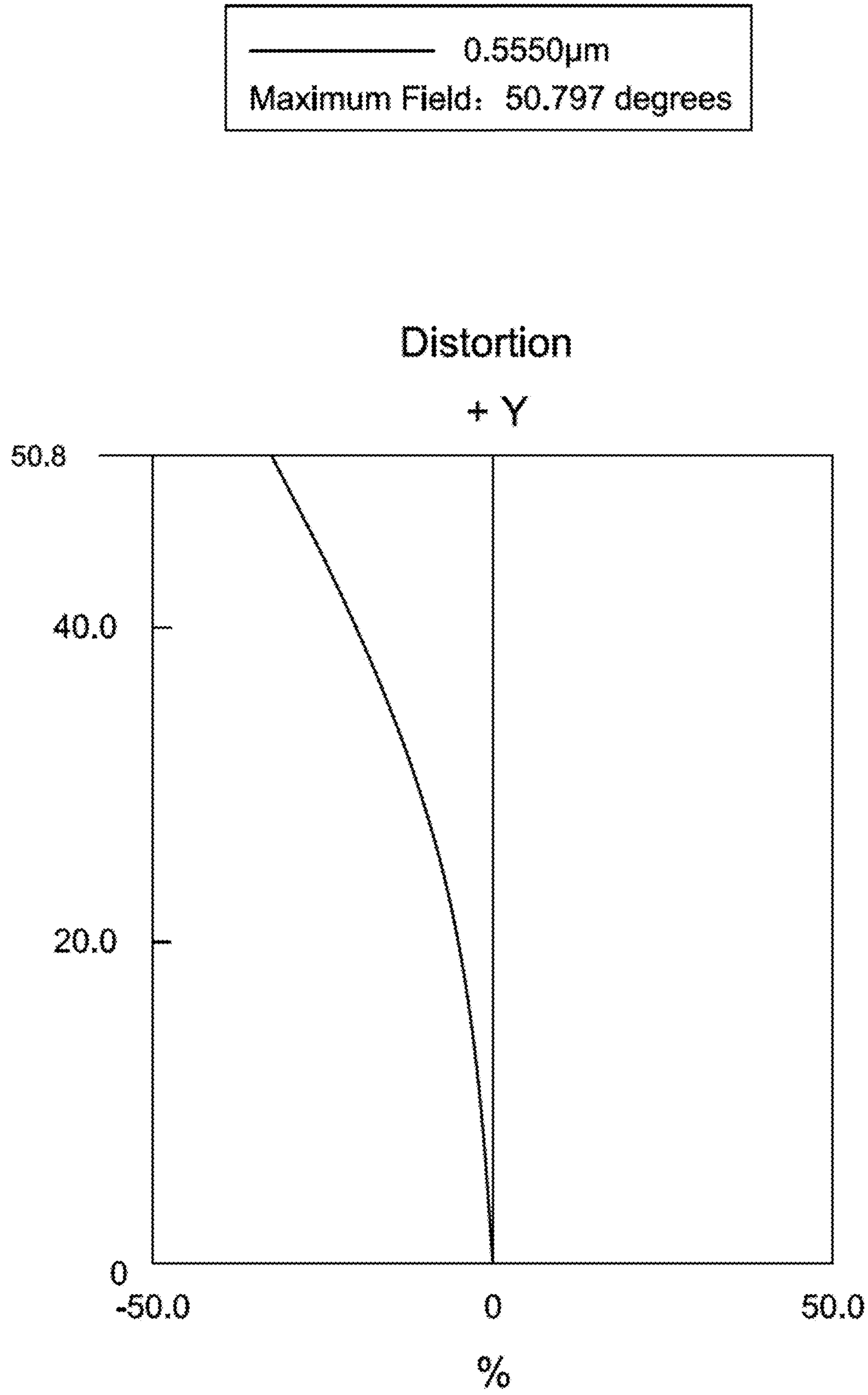

In addition, the wide-angle lens assembly 5 of the fifth embodiment can meet the requirements of optical performance as seen in FIGS. 16-18. It can be seen from FIG. 16 that the longitudinal aberration in the wide-angle lens assembly 5 of the fifth embodiment ranges from −0.010 mm to 0.025 mm. It can be seen from FIG. 17 that the field curvature of tangential direction and sagittal direction in the wide-angle lens assembly 5 of the fifth embodiment ranges from −0.06 mm to 0.02 mm. It can be seen from FIG. 18 that the distortion in the wide-angle lens assembly 5 of the fifth embodiment ranges from −35% to 0%. It is obvious that the longitudinal aberration, the field curvature and the distortion of the wide-angle lens assembly 5 of the fifth embodiment can be corrected effectively. Therefore, the wide-angle lens assembly 5 of the fifth embodiment is capable of good optical performance.

A detailed description of a wide-angle lens assembly in accordance with a sixth embodiment of the invention is as follows. Referring to FIG. 19, the wide-angle lens assembly 6 includes a first lens L61, a second lens L62, a stop ST6, a third lens L63, a fourth lens L64, a fifth lens L65, a sixth lens L66, a seventh lens L67, an eighth lens L68, and an optical filter OF6, all of which are arranged in order from an object side to an image side along an optical axis OA6. In operation, the light from the object side is imaged on an image plane IMA6.

According to the foregoing, wherein: the fourth lens L64 is a biconvex lens, wherein the object side surface S68 is a convex surface and the object side surface S68 is a spherical surface; both of the object side surface S617 and image side surface S618 of the optical filter OF6 are plane surfaces; with the above design of the lenses, stop ST6, and at least one of the conditions (1)-(2), (4), and (6)-(11) satisfied, the wide-angle lens assembly 6 can have an effective decreased F-number, an effective increased field of view, an effective increased resolution, and an effective corrected aberration.

Table 16 shows the optical specification of the wide-angle lens assembly 6 in FIG. 19.

TABLE 16

Effective Focal Length = 6.23 mm F-number = 1.64
Total Lens Length = 29.95 mm Field of View = 101.80 degrees

| Surface Number | Radius of Curvature (mm) | Thickness (mm) | Nd | Vd | Effective Focal Length (mm) | Remark |
|---|---|---|---|---|---|---|
| S61 | −1582.91 | 0.70 | 1.58913 | 61.2536 | −7.5 | L61 |
| S62 | 4.45 | 1.77 | | | | |
| S63 | 31.79 | 2.48 | 1.98613 | 16.4839 | 52.863 | L62 |
| S64 | 76.98 | 0.74 | | | | |
| S65 | ∞ | 2.40 | | | | ST6 |
| S66 | 16.20 | 3.62 | 1.61921 | 63.85 | 10.053 | L63 |
| S67 | −9.22 | 0.06 | | | | |
| S68 | 72.24 | 3.08 | 1.497 | 81.6128 | 18.51 | L64 |
| S69 | −10.42 | 0.06 | | | | |
| S610 | −13.57 | 0.46 | 1.76183 | 26.6047 | −10.078 | L65 |
| S611 | 18.22 | 0.85 | | | | |
| S612 | 25.20 | 2.97 | 1.88386 | 37.2043 | 12.347 | L66 |
| S613 | −18.34 | 0.06 | | | | |
| S614 | 12.78 | 3.83 | 1.691 | 54.8153 | 14.286 | L67 |
| S615 | −38.59 | 1.43 | 1.80518 | 25.4579 | −11.916 | L68 |
| S616 | 13.10 | 3.50 | | | | |
| S617 | ∞ | 0.90 | 1.5233 | 54.5172 | | OF6 |
| S618 | ∞ | 1.05 | | | | |

In the sixth embodiment, the conic constant k and the aspheric coefficients A, B, C, D, E, F, G, H, and I of each aspheric lens are shown in Table 17.

TABLE 17

| Surface Number | k<br>E | A<br>F | B<br>G | C<br>H | D<br>I |
|---|---|---|---|---|---|
| S66 | 1.1144<br>0 | −0.0003<br>0 | 4.49E−06<br>0 | −1.57E−08<br>0 | −2.79E−10<br>0 |
| S67 | −0.0308<br>0 | −0.0001<br>0 | 3.01E−06<br>0 | 8.53E−08<br>0 | 1.79E−10<br>0 |
| S612 | −15.8363<br>0 | 2.02E−05<br>0 | −1.68E−06<br>0 | 8.10E−08<br>0 | −1.26E−09<br>0 |
| S613 | −0.7562<br>0 | 9.93E−05<br>0 | −1.68E−06<br>0 | 8.84E−08<br>0 | −1.03E−09<br>0 |

Table 18 shows the parameters and condition values for conditions (1)-(2), (4), (6)-(11) in accordance with the sixth embodiment of the invention. It can be seen from Table 18 that the wide-angle lens assembly 6 of the sixth embodiment satisfies the conditions (1)-(2), (4), (6)-(11).

TABLE 18

| | | | | | |
|---|---|---|---|---|---|
| D22 | 6.09 mm | β | 9.48 degrees | T1131 | 8.09 mm |
| T3152 | 7.27 mm | T6182 | 8.29 mm | T11ST | 5.69 mm |
| f12 | −8.92 mm | | | | |
| f/D22 | 1.02 | R51/R72 | 0.35 | 1/β | 0.11 degrees$^{-1}$ |
| T1131/T3152 | 1.11 | T1131/T6182 | 0.98 | T3152/T6182 | 0.88 |
| T11ST/TTL | 0.19 | f1/f | −1.20 | f12/f | −1.43 |

Figure 20:
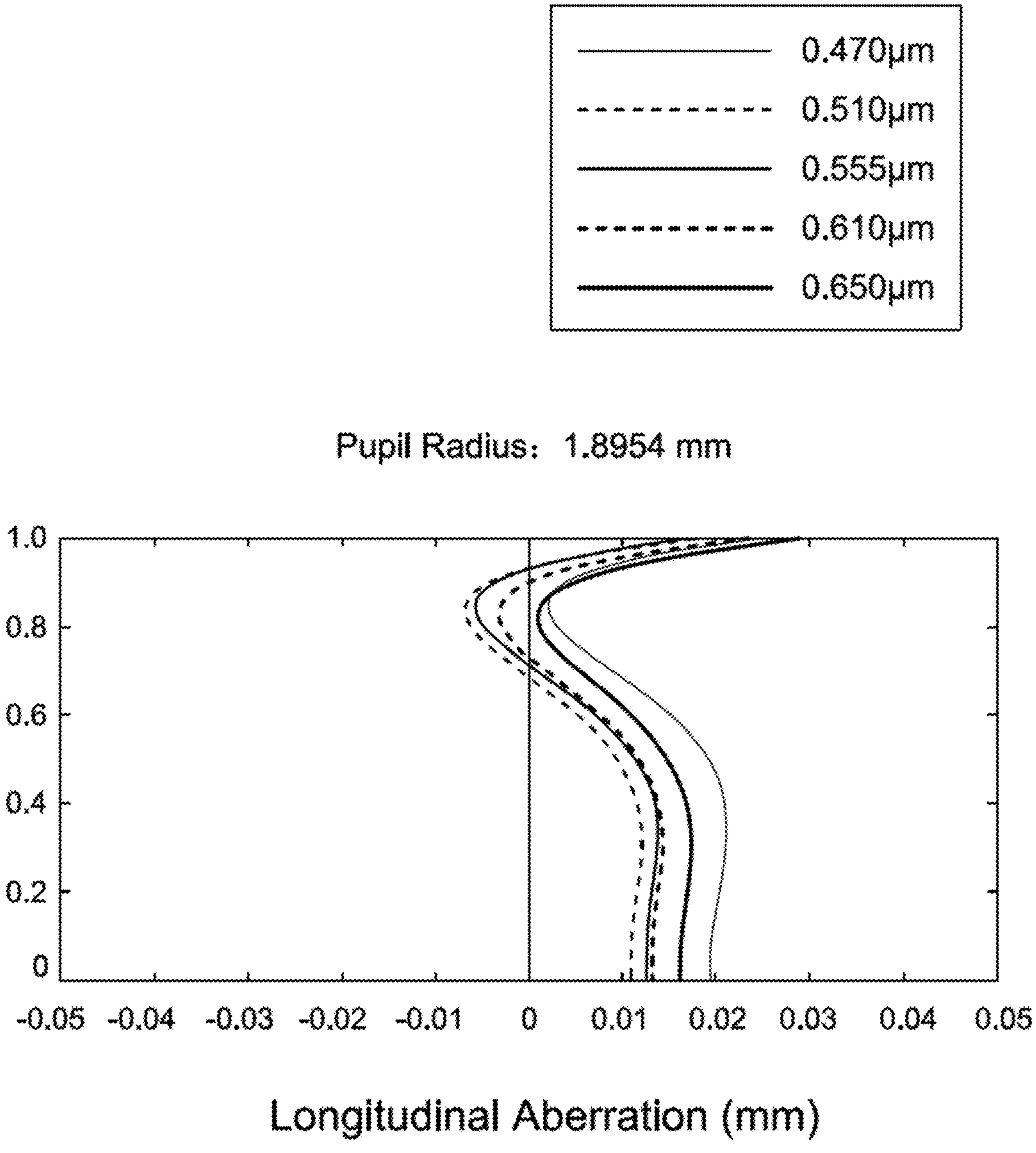
FIGS. 20, 21, 22 depict a longitudinal aberration diagram, a field curvature diagram, and a distortion diagram of the wide-angle lens assembly in accordance with the sixth embodiment of the invention, respectively.
Figure 21:
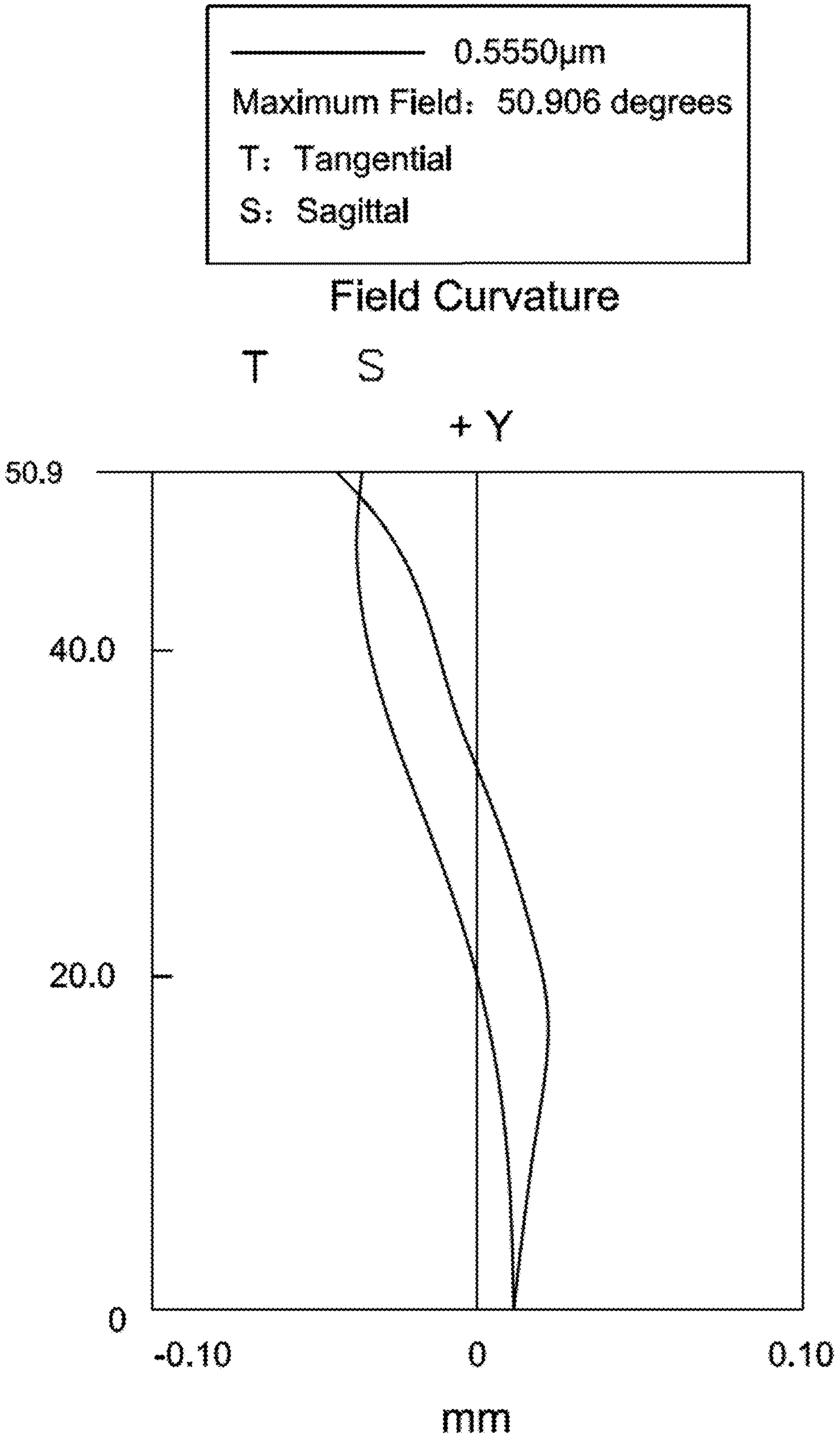
Figure 22:
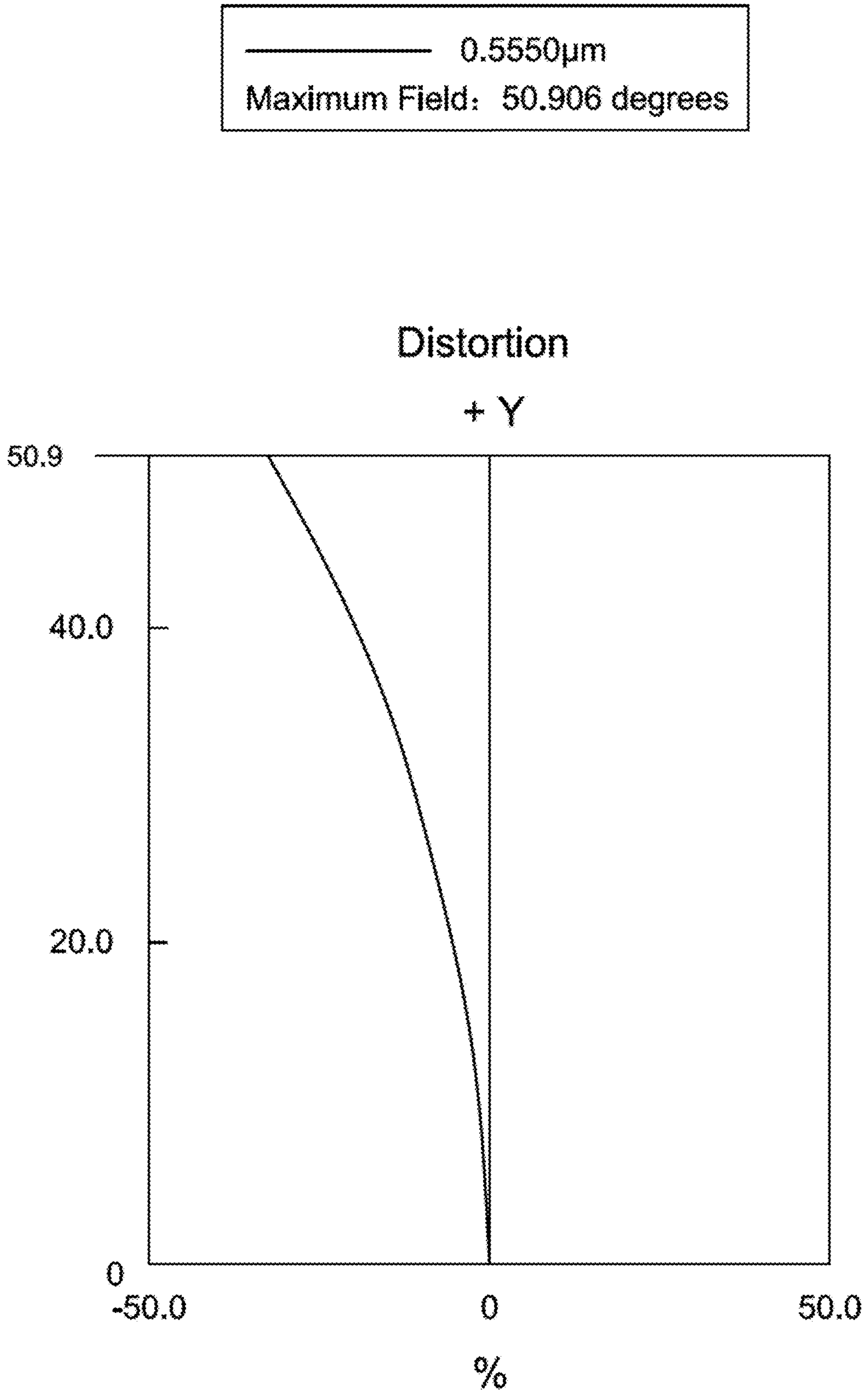

In addition, the wide-angle lens assembly 6 of the sixth embodiment can meet the requirements of optical performance as seen in FIGS. 20-22. It can be seen from FIG. 20 that the longitudinal aberration in the wide-angle lens assembly 6 of the sixth embodiment ranges from −0.01 mm to 0.03 mm. It can be seen from FIG. 21 that the field curvature of tangential direction and sagittal direction in the wide-angle lens assembly 6 of the sixth embodiment ranges from −0.05 mm to 0.03 mm. It can be seen from FIG. 22 that the distortion in the wide-angle lens assembly 6 of the sixth embodiment ranges from −35% to 0%. It is obvious that the longitudinal aberration, the field curvature, and the distortion of the wide-angle lens assembly 6 of the sixth embodiment can be corrected effectively. Therefore, the wide-angle lens assembly 6 of the sixth embodiment is capable of good optical performance.

A detailed description of a wide-angle lens assembly in accordance with a seventh embodiment of the invention is as follows. Referring to FIG. 23, the wide-angle lens assembly 7 includes a first lens L71, a second lens L72, a stop ST7, a third lens L73, a fourth lens L74, a fifth lens L75, a sixth lens L76, a seventh lens L77, an eighth lens L78, and an optical filter OF7, all of which are arranged in order from an object side to an image side along an optical axis OA7. In operation, the light from the object side is imaged on an image plane IMA7.

According to the foregoing, wherein: the fourth lens L74 is a plano-convex lens, wherein the object side surface S78 is a plane surface; both of the object side surface S717 and image side surface S718 of the optical filter OF7 are plane surfaces; with the above design of the lenses, stop ST7, and at least one of the conditions (1)-(2), (4), and (6)-(11) satisfied, the wide-angle lens assembly 7 can have an effective decreased F-number, an effective increased field of view, an effective increased resolution, and an effective corrected aberration.

Table 19 shows the optical specification of the wide-angle lens assembly 7 in FIG. 23.

TABLE 19

Effective Focal Length = 6.23 mm F-number = 1.64
Total Lens Length = 29.89 mm Field of View = 101.80 degrees

| Surface Number | Radius of Curvature (mm) | Thickness (mm) | Nd | Vd | Effective Focal Length (mm) | Remark |
|---|---|---|---|---|---|---|
| S71 | −376.96 | 0.70 | 1.58913 | 61.2536 | −7.512 | L71 |
| S72 | 4.50 | 1.78 | | | | |
| S73 | 29.17 | 2.48 | 1.98613 | 16.4839 | 45.054 | L72 |
| S74 | 79.68 | 0.71 | | | | |
| S75 | ∞ | 2.36 | | | | ST7 |
| S76 | 17.09 | 3.75 | 1.61921 | 63.85 | 9.833 | L73 |
| S77 | −8.64 | 0.06 | | | | |
| S78 | ∞ | 2.81 | 1.497 | 81.6128 | 18.108 | L74 |
| S79 | −9.02 | 0.06 | | | | |
| S710 | −10.62 | 0.46 | 1.76183 | 26.6047 | −9.085 | L75 |
| S711 | 20.64 | 0.95 | | | | |
| S712 | 22.39 | 3.26 | 1.88386 | 37.2043 | 10.438 | L76 |
| S713 | −14.61 | 0.06 | | | | |
| S714 | 13.89 | 3.85 | 1.691 | 54.8153 | 16.393 | L77 |
| S715 | −55.37 | 0.97 | 1.80518 | 25.4579 | −11.63 | L78 |
| S716 | 11.46 | 3.50 | | | | |
| S717 | ∞ | 0.90 | 1.5233 | 54.5172 | | OF7 |
| S718 | ∞ | 1.25 | | | | |

In the seventh embodiment, the conic constant k and the aspheric coefficients A, B, C, D, E, F, G, H, and I of each aspheric lens are shown in Table 20.

TABLE 20

| Surface Number | k<br>E | A<br>F | B<br>G | C<br>H | D<br>I |
|---|---|---|---|---|---|
| S76 | 1.8509<br>0 | −0.0003<br>0 | 6.62E−06<br>0 | 8.07E−08<br>0 | −9.05E−10<br>0 |
| S77 | −0.2273<br>0 | −4.95E−05<br>0 | 5.62E−06<br>0 | 3.85E−08<br>0 | 5.11E−09<br>0 |
| S712 | −11.9290<br>0 | −1.17E−05<br>0 | −7.74E−07<br>0 | 6.90E−08<br>0 | −6.12E−10<br>0 |
| S713 | −0.1482<br>0 | 7.12E−05<br>0 | −1.07E−06<br>0 | 5.02E−08<br>0 | −9.30E−11<br>0 |

Table 21 shows the parameters and condition values for conditions (1)-(2), (4), (6)-(11) in accordance with the seventh embodiment of the invention. It can be seen from Table 21 that the wide-angle lens assembly 7 of the seventh embodiment satisfies the conditions (1)-(2), (4), (6)-(11).

TABLE 21

| | | | | | |
|---|---|---|---|---|---|
| D22 | 6.09 mm | β | 6.59 degrees | T1131 | 8.04 mm |
| T3152 | 7.13 mm | T6182 | 8.13 mm | T11ST | 5.68 mm |
| f12 | −9.28 mm | | | | |
| f/D22 | 1.02 | R51/R72 | 0.19 | 1/β | 0.15 degrees$^{-1}$ |
| T1131/T3152 | 1.13 | T1131/T6182 | 0.99 | T3152/T6182 | 0.88 |
| T11ST/TTL | 0.19 | f1/f | −1.21 | f12/f | −1.49 |

Figure 24:
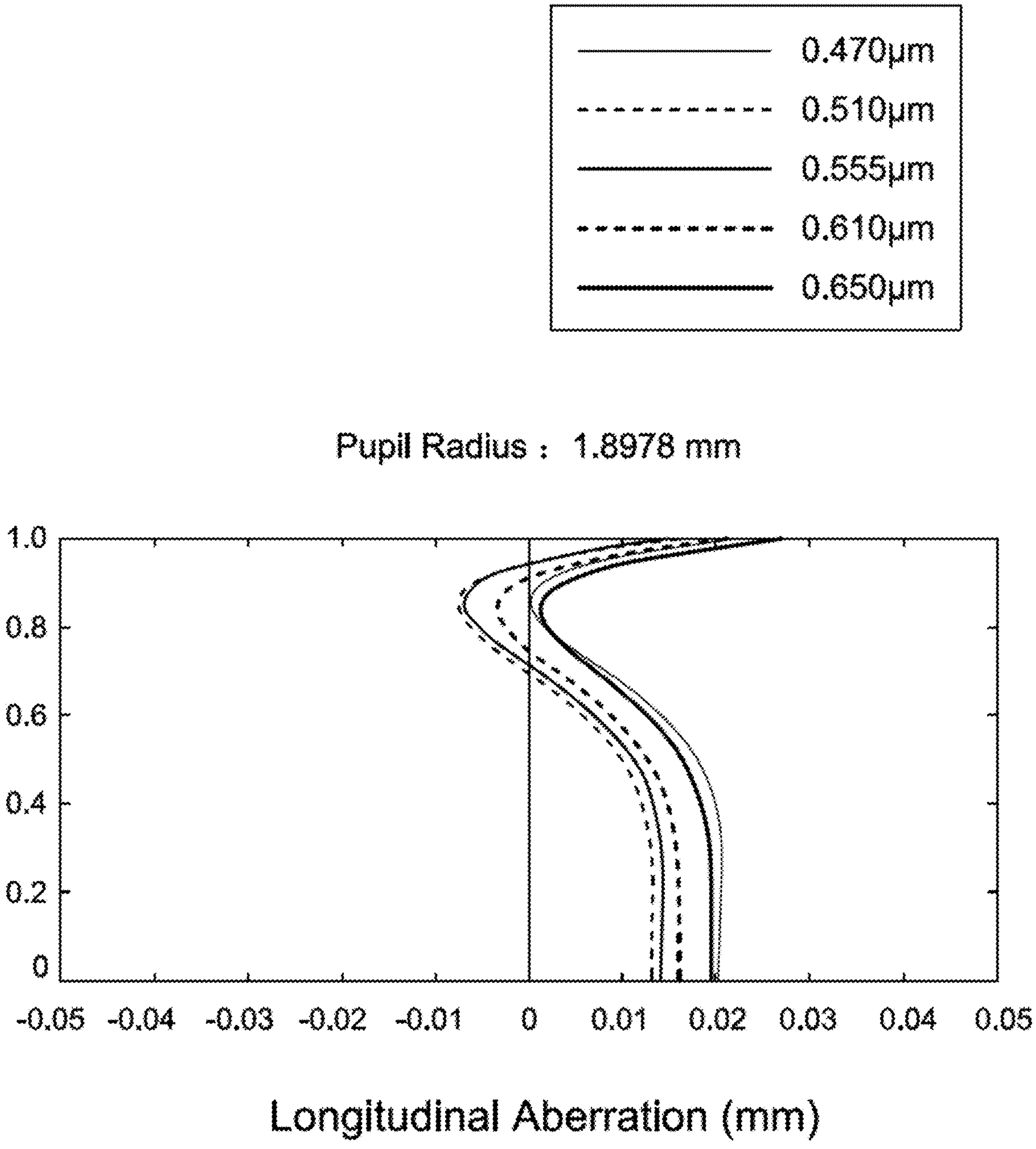
FIGS. 24, 25, 26 depict a longitudinal aberration diagram, a field curvature diagram, and a distortion diagram of the wide-angle lens assembly in accordance with the seventh embodiment of the invention, respectively.
Figure 25:
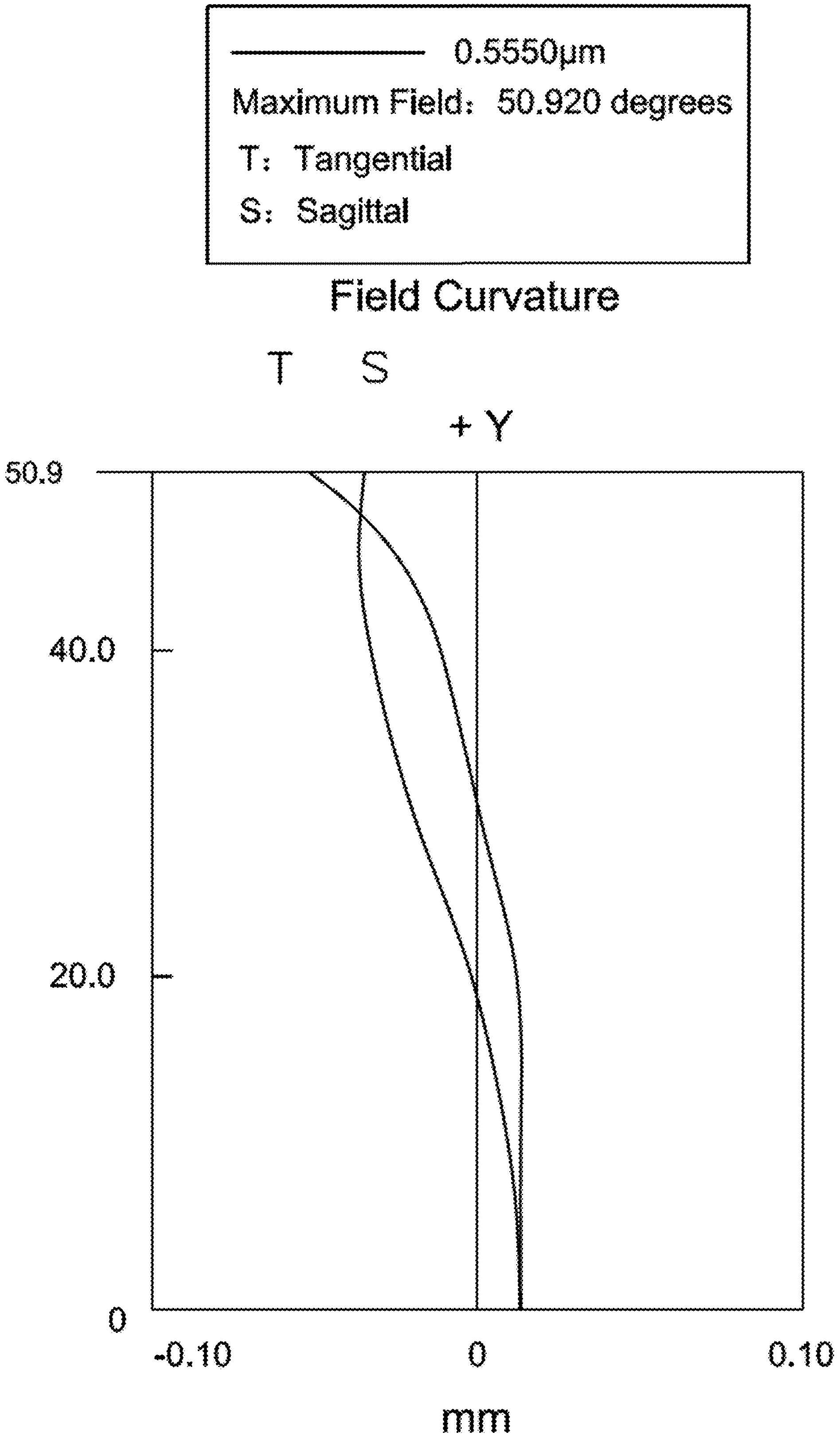
Figure 26:
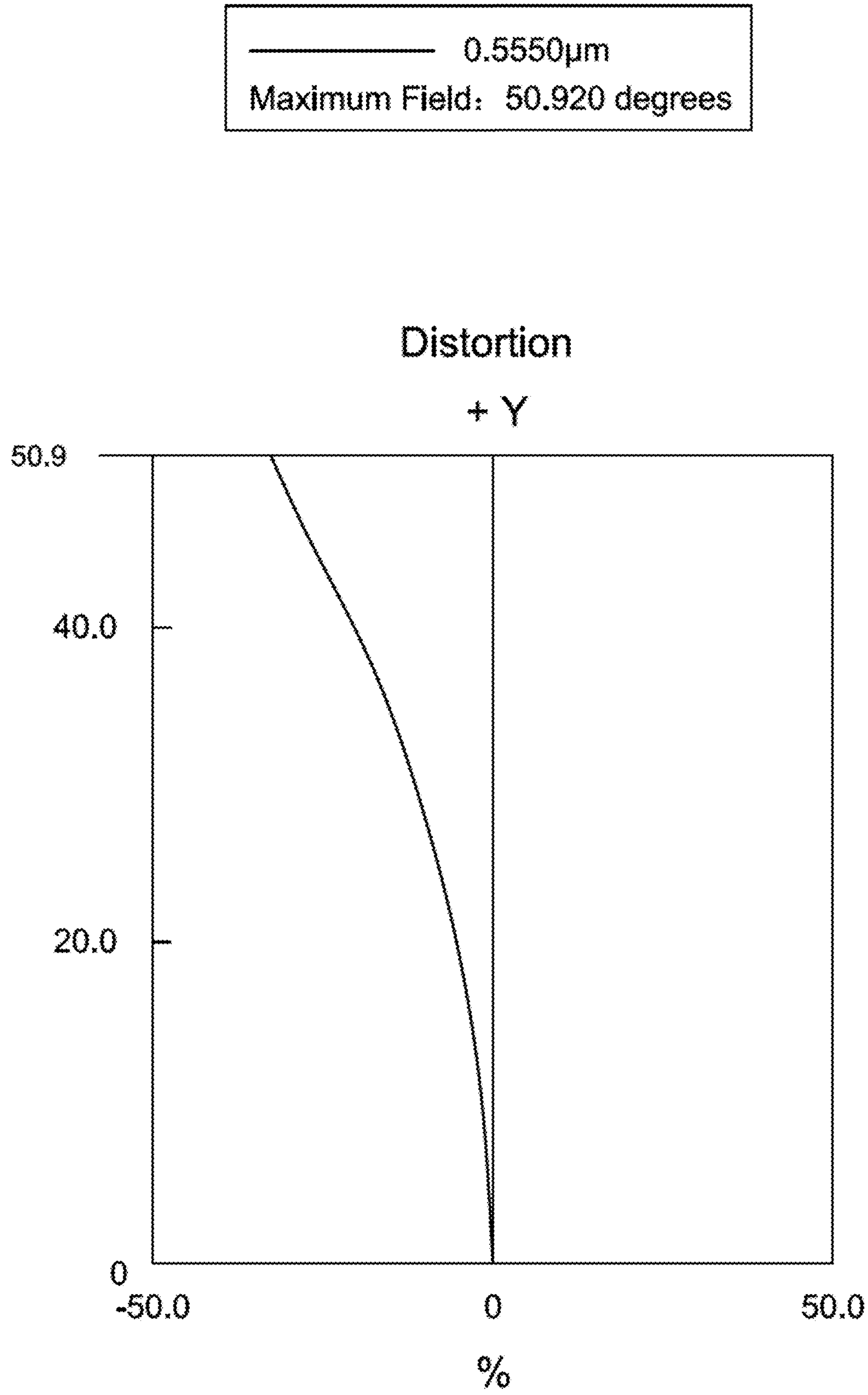

In addition, the wide-angle lens assembly 7 of the seventh embodiment can meet the requirements of optical performance as seen in FIGS. 24-26. It can be seen from FIG. 24 that the longitudinal aberration in the wide-angle lens assembly 7 of the seventh embodiment ranges from −0.01 mm to 0.03 mm. It can be seen from FIG. 25 that the field curvature of tangential direction and sagittal direction in the wide-angle lens assembly 7 of the seventh embodiment ranges from −0.06 mm to 0.02 mm. It can be seen from FIG. 26 that the distortion in the wide-angle lens assembly 7 of the seventh embodiment ranges from −35% to 0%. It is obvious that the longitudinal aberration, the field curvature and the distortion of the wide-angle lens assembly 7 of the seventh embodiment can be corrected effectively. Therefore, the wide-angle lens assembly 7 of the seventh embodiment is capable of good optical performance.

The present invention provides yet another wide-angle lens assembly including a first lens, a second lens, a third lens, a fourth lens, a fifth lens, a sixth lens, a seventh lens, and an eighth lens. The first lens is with refractive power and includes an object side surface facing an object side and an image side surface facing an image side. The second lens is with positive refractive power and includes an object side surface facing the object side and a concave surface facing the image side. The third lens is with refractive power and includes an object side surface facing the object side and an image side surface facing the image side. The fourth lens is with refractive power and includes an object side surface facing the object side and an image side surface facing the image side. The fifth lens is with negative refractive power and includes a concave surface facing the object side and an image side surface facing the image side. The sixth lens is with positive refractive power and includes a convex surface facing the object side and an image side surface facing the image side. The seventh lens is with refractive power and includes an object side surface facing the object side and an image side surface facing the image side. The eighth lens is with negative refractive power and includes an object side surface facing the object side and a concave surface facing the image side. The first lens, the second lens, the third lens, the fourth lens, the fifth lens, the sixth lens, the seventh lens, and the eighth lens are arranged in order from the object side to the image side along an optical axis. The wide-angle lens assembly satisfies at least one of the following conditions: $0 \le T4251/T1131 \le 0.5$; $0 \le T4251/T6182 \le 0.5$; $-10 \le R12/R72 \le 0.5$; $0.15 \le Vd2/Vd4 \le 3$; $0.3 \le Vd6/Vd5 \le 3$; wherein T4251 is an interval from the image side surface of the fourth lens to the object side surface of the fifth lens along the optical axis, T1131 is an interval from the object side surface of the first lens to the object side surface of the third lens along the optical axis, T6182 is an interval from the object side surface of the sixth lens to the image side surface of the eighth lens along the optical axis, R12 is a radius of curvature of the image side surface of the second lens, R72 is a radius of curvature of the image side surface of the seventh lens, Vd2 is an Abbe number of the second lens, Vd4 is an Abbe number of the fourth lens, Vd5 is an Abbe number of the fifth lens, and Vd6 is an Abbe number of the sixth lens. A wide-angle lens assembly of the present invention is a preferred embodiment of the present invention when the wide-angle lens assembly satisfies the above features and at least one of the above conditions.

Referring to Table 22, Table 23, Table 25, and Table 26, wherein Table 22 and Table 25 show optical specification in accordance with an eighth and a ninth embodiments of the invention, respectively, and Table 23 and Table 26 show aspheric coefficients of each aspheric lens in Table 22 and Table 25, respectively. The aspheric surface sag z of each aspheric lens in the following embodiments can be calculated by the following formula: $Z=ch^2/\{1+[1-(k+1)c^2h^2]^{1/2}\}+Ah^4+Bh^6+Ch^8+Dh^{10}+Eh^{12}+Fh^{14}+Gh^{16}+Hh^{18}+Ih^{20}$, where c is curvature, h is the vertical distance from the lens surface to the optical axis, k is conic constant, A, B, C, D, E, F, G, H, and I are aspheric coefficients, and the value of the aspheric coefficient A, B, C, D, E, F, G, H, and I are presented in scientific notation, such as 2E-03 for $2\times10^{-3}$.

Figure 28:
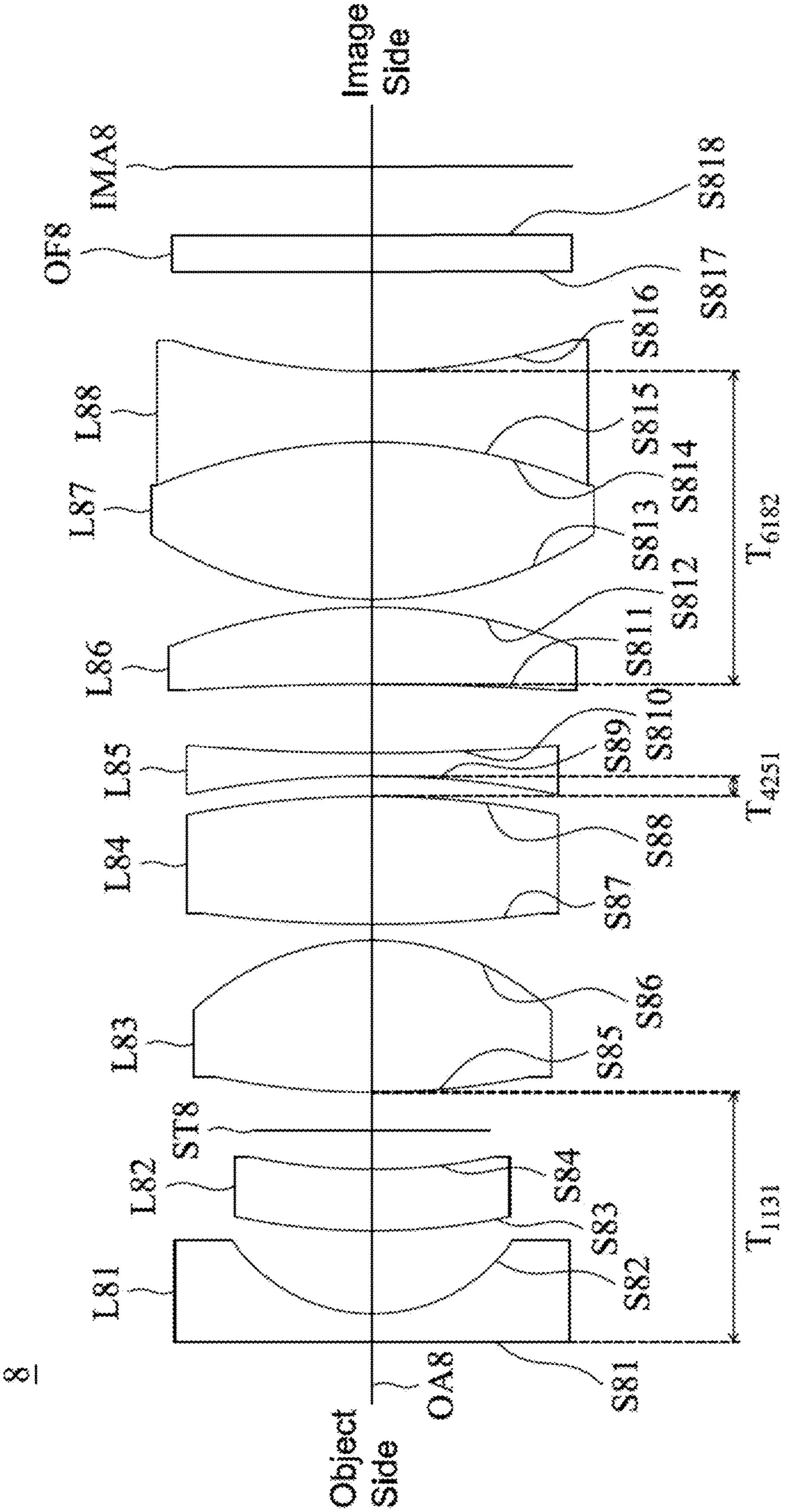
FIG. 28 is a lens layout diagram of a wide-angle lens assembly in accordance with an eighth embodiment of the invention.
Figure 32:
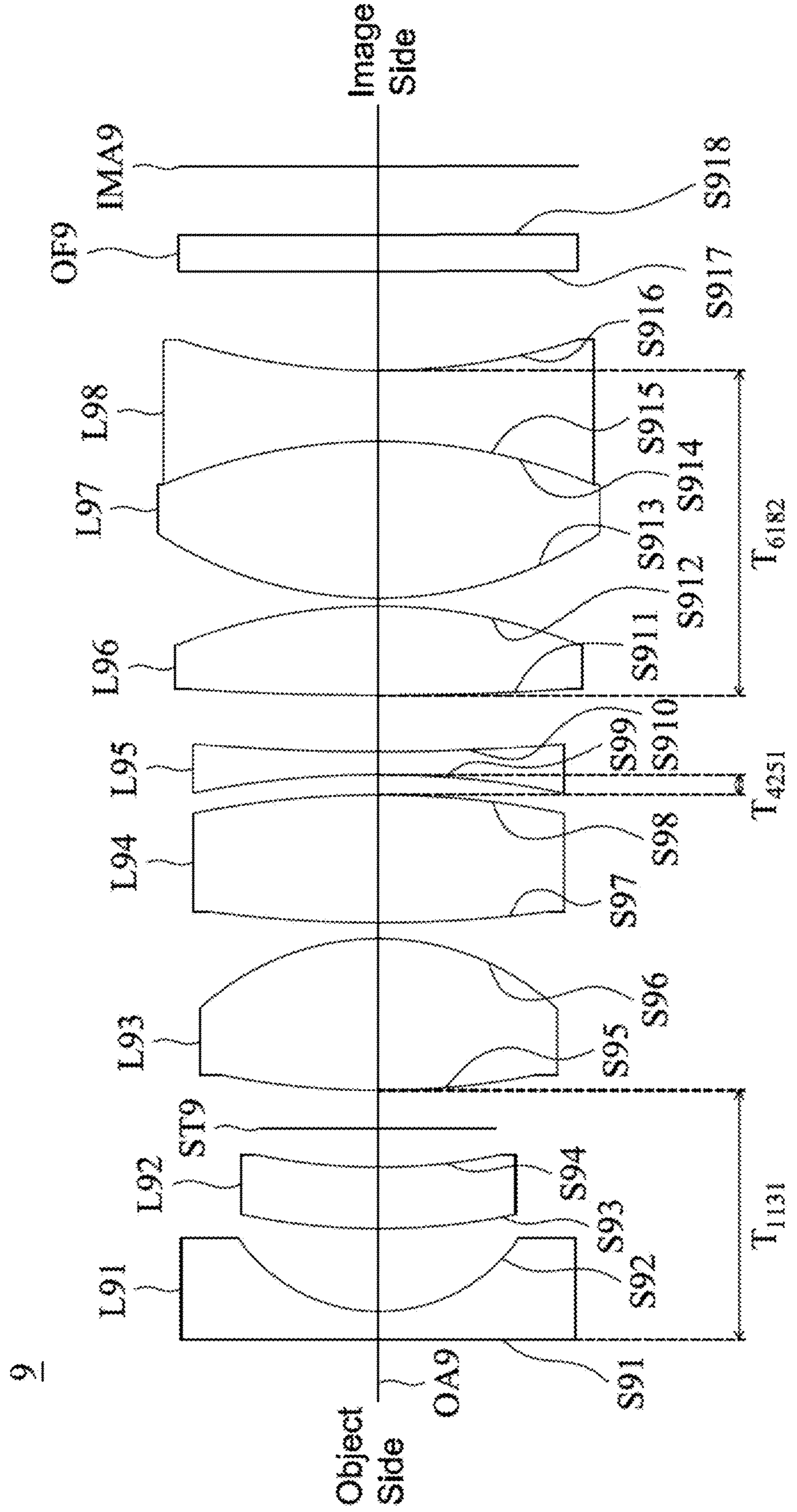
FIG. 32 is a lens layout diagram of a wide-angle lens assembly in accordance with a ninth embodiment of the invention.

FIGS. 28 and 32 are lens layout diagrams of the lens assemblies in accordance with the eighth and ninth embodiments of the invention, respectively.

The first lenses L81, L91 are biconcave lenses with negative refractive power, wherein the object side surfaces S81, S91 are concave surfaces and the image side surfaces S82, S92 are concave surfaces.

The second lenses L82, L92 are meniscus lenses with positive refractive power, wherein the object side surfaces S83, S93 are convex surfaces and the image side surfaces S84, S94 are concave surfaces.

The third lenses L83, L93 are biconvex lenses with positive refractive power, wherein the object side surfaces S85, S95 are convex surfaces and the image side surfaces S86, S96 are convex surfaces.

The fourth lenses L84, L94 are biconvex lens with positive refractive power, wherein the object side surfaces S87, S97 are convex surfaces and the image side surfaces S88, S98 are convex surfaces.

The fifth lenses L85, L95 are biconcave lenses with negative refractive power, wherein the object side surfaces S89, S99 are concave surfaces and the image side surfaces S810, S910 are concave surfaces.

The sixth lenses L86, L96 are biconvex lenses with positive refractive power, wherein the object side surfaces S811, S911 are convex surfaces and the image side surfaces S812, S912 are convex surfaces.

The seventh lenses L87, L97 are biconvex lenses with positive refractive power, wherein the object side surfaces S813, S913 are convex surfaces and the image side surfaces S814, S914 are convex surfaces.

The eighth lenses L88, L98 are biconcave lenses with negative refractive power, wherein the object side surfaces S815, S915 are concave surfaces and the image side surfaces S816, S916 are concave surfaces.

The image side surfaces S814, S914 of the seventh lenses L87, L97 and the object side surfaces S815, S915 of the eighth lenses L88, L98 are cemented on the cemented surfaces. The cemented surfaces are the image side surfaces S814, S914 of the seventh lenses L87, L97, or the object side surfaces S815, S915 of the eighth lenses L88, L98.

In addition, the wide-angle lens assemblies 8 and 9 satisfy at least one of the following conditions (12)-(16):

$$0 \le T4251/T1131 \le 0.5; \quad (12)$$

$$0 \le T4251/T6182 \le 0.5; \quad (13)$$

$$-10 \le R12/R72 \le 0.5; \quad (14)$$

$$0.15 \le Vd2/Vd4 \le 3; \quad (15)$$

$$0.3 \le Vd6/Vd5 \le 3; \quad (16)$$

wherein: T4251 is an interval from the image side surfaces S88, S98 of the fourth lenses L84, L94 to the object side surfaces S89, S99 of the fifth lenses L85, L95 along the optical axes OA8, OA9 in the eighth embodiment and the ninth embodiment; T1131 is an interval from the object side surfaces S81, S91 of the first lenses L81, L91 to the object side surfaces S85, S95 of the third lenses L83, L93 along the optical axes OA8, OA9 in the eighth embodiment and the ninth embodiment; T6182 is an interval from the object side surfaces S811, S911 of the sixth lenses L86, L96 to the image side surfaces S816, S916 of the eighth lenses L88, L98 along the optical axes OA8, OA9 in the eighth embodiment and the ninth embodiment; R12 is a radius of curvature of the image side surfaces S82, S92 of the first lenses L81, L91 in the eighth embodiment and the ninth embodiment; R72 is a radius of curvature of the image side surfaces S814, S914 of the seventh lenses L87, L97 in the eighth embodiment and the ninth embodiment; Vd2 is an Abbe number of the second lenses L82, L92 in the eighth embodiment and the ninth embodiment; Vd4 is an Abbe number of the fourth lenses L84, L94 in the eighth embodiment and the ninth embodiment; Vd5 is an Abbe number of the fifth lenses L85, L95 in the eighth embodiment and the ninth embodiment; and Vd6 is an Abbe number of the sixth lenses L86, L96 in the eighth embodiment and the ninth embodiment.

In one embodiment, the manufacturing cost can be decreased when the second lens L82, the fourth lens L84, the fifth lens L85, and the sixth lens L86 are aspherical plastic lenses, and the first lens L81, the third lens L83, the seventh lens L87, and the eighth lens L88 are glass lenses.

When the condition (12): $0 \le T4251/T1131 \le 0.5$ is satisfied, the lens processing quality and image quality can be effectively improved. When the condition (13): $0 \le T4251/T6182 \le 0.5$ is satisfied, the lens processing quality and image quality can be effectively improved. When the condition (14): $-10 \le R12/R72 \le 0.5$ is satisfied, the lens tilt and eccentric error can be effectively decreased. When the condition (15): $0.15 \le Vd2/Vd4 \le 3$ is satisfied, the chromatic aberration can be effectively decreased and image quality can be effectively increased. When the condition (16): $0.3 \le Vd6/Vd5 \le 3$ is satisfied, the chromatic aberration can be effectively decreased and image quality can be effectively increased.

It should be noted that each of the conditions (12)-(16) can provide specific functions and effects. Therefore, only a single condition needs to be satisfied in order to have a specific function. The conditions (12)-(16) can also be satisfied by multiple conditions at the same time. The above disclosure does not limit the present invention.

A detailed description of a wide-angle lens assembly in accordance with an eighth embodiment of the invention is as follows. Referring to FIG. 28, the wide-angle lens assembly 8 includes a first lens L81, a second lens L82, a stop ST8, a third lens L83, a fourth lens L84, a fifth lens L85, a sixth lens L86, a seventh lens L87, an eighth lens L88, and an optical filter OF8, all of which are arranged in order from an object side to an image side along an optical axis OA8. In operation, the light from the object side is imaged on an image plane IMA8. The wide-angle lens assembly of the present invention can meet the basic operation requirements when it only satisfies condition (12) and the refractive surface shape characteristics of the independent claim, or only satisfies condition (13) and the refractive surface shape characteristics of the independent claim, or only satisfies condition (14) and the refractive surface shape characteristics of the independent claim.

Table 22 shows the optical specification of the wide-angle lens assembly 8 in FIG. 28.

TABLE 22

Effective Focal Length = 6.23 mm F-number = 1.64
Total Lens Length = 29.99 mm Field of View = 101.7 degrees

| Surface Number | Radius of Curvature (mm) | Thickness (mm) | Nd | Vd | Effective Focal Length (mm) | Remark |
|---|---|---|---|---|---|---|
| S81 | −483.92 | 0.70 | 1.59 | 61.25 | −7.27 | L81 |
| S82 | 4.33 | 2.14 | | | | |

TABLE 22-continued

| Effective Focal Length = 6.23 mm F-number = 1.64<br>Total Lens Length = 29.99 mm Field of View = 101.7 degrees | | | | | | |
|---|---|---|---|---|---|---|
| Surface Number | Radius of Curvature (mm) | Thickness (mm) | Nd | Vd | Effective Focal Length (mm) | Remark |
| S83 | 27.77 | 1.58 | 1.66 | 21.21 | 933.28 | L82 |
| S84 | 28.42 | 0.98 | | | | |
| | ∞ | 0.97 | | | | ST8 |
| S85 | 20.73 | 3.88 | 1.54 | 59.72 | 9.87 | L83 |
| S86 | −6.73 | 0.43 | | | | |
| S87 | 30.68 | 3.23 | 1.54 | 56.00 | 37.53 | L84 |
| S88 | −59.49 | 0.50 | | | | |
| S89 | −22.62 | 0.64 | 1.66 | 21.21 | −22.32 | L85 |
| S810 | 43.10 | 1.72 | | | | |
| S811 | 64.76 | 1.99 | 1.54 | 56.00 | 20.30 | L86 |
| S812 | −13.24 | 0.20 | | | | |
| S813 | 10.41 | 4.01 | 1.69 | 54.82 | 9.30 | L87 |
| S814 | −14.25 | 0 | | | | |
| S815 | −14.25 | 1.79 | 1.81 | 25.46 | −9.18 | L88 |
| S816 | 16.46 | 2.57 | | | | |
| S817 | ∞ | 0.90 | 1.52 | 54.52 | | OF8 |
| S818 | ∞ | 1.76 | | | | |

In the eighth embodiment, the conic constant k and the aspheric coefficients A, B, C, D, E, F, G, H, and I of each aspheric lens are shown in Table 23.

TABLE 23

| Surface Number | k<br>E | A<br>F | B<br>G | C<br>H | D<br>I |
|---|---|---|---|---|---|
| S83 | 0 | 4.42E−04 | −2.98E−05 | 5.05E−06 | −4.43E−07 |
| | 5.01E−09 | −2.18E−09 | 1.33E−10 | 2.28E−11 | −1.81E−12 |
| S84 | 0 | 1.24E−03 | 2.14E−05 | 3.47E−06 | −6.90E−07 |
| | 5.38E−10 | 9.78E−09 | −3.41E−10 | −7.21E−11 | 4.30E−12 |
| S87 | 0 | 5.37E−04 | −4.10E−05 | 1.18E−06 | 2.17E−08 |
| | −1.55E−09 | −6.28E−11 | 2.90E−12 | 1.22E−13 | −5.41E−15 |
| S88 | 0 | −2.70E−04 | −1.02E−05 | −7.27E−07 | 1.19E−08 |
| | 1.92E−09 | 5.09E−11 | −2.59E−13 | −1.33E−13 | 9.93E−17 |
| S89 | 0 | 7.34E−05 | −1.09E−05 | −3.81E−07 | 4.20E−09 |
| | 5.92E−10 | 1.36E−11 | 7.89E−13 | 3.50E−14 | −4.26E−15 |
| S810 | 0 | −2.65E−04 | 3.82E−06 | 8.17E−07 | −1.10E−08 |
| | −1.26E−09 | −1.81E−11 | 9.16E−13 | 1.48E−14 | 5.95E−16 |
| S811 | 0 | −2.70E−04 | −3.72E−05 | 1.44E−06 | 2.20E−08 |
| | −2.16E−10 | −3.16E−11 | −1.94E−12 | 9.35E−15 | 2.23E−15 |
| S812 | 0 | −6.82E−04 | 8.80E−06 | 9.98E−08 | −7.18E−09 |
| | 5.67E−10 | 1.99E−11 | −4.07E−13 | −8.96E−14 | 2.39E−15 |

Table 24 shows the parameters and condition values for conditions (12)-(16) in accordance with the eighth embodiment of the invention. It can be seen from Table 24 that the wide-angle lens assembly 8 of the eighth embodiment satisfies the conditions (12)-(16).

TABLE 24

| | | | | | |
|---|---|---|---|---|---|
| T1131 | 6.37 mm | T4251 | 0.5 mm | T6182 | 7.99 mm |
| T4251/T1131 | 0.08 | T4251/T6182 | 0.06 | R12/R72 | −0.3 |
| Vd2/Vd4 | 0.38 | Vd6/Vd5 | 2.64 | | |

Figure 29:
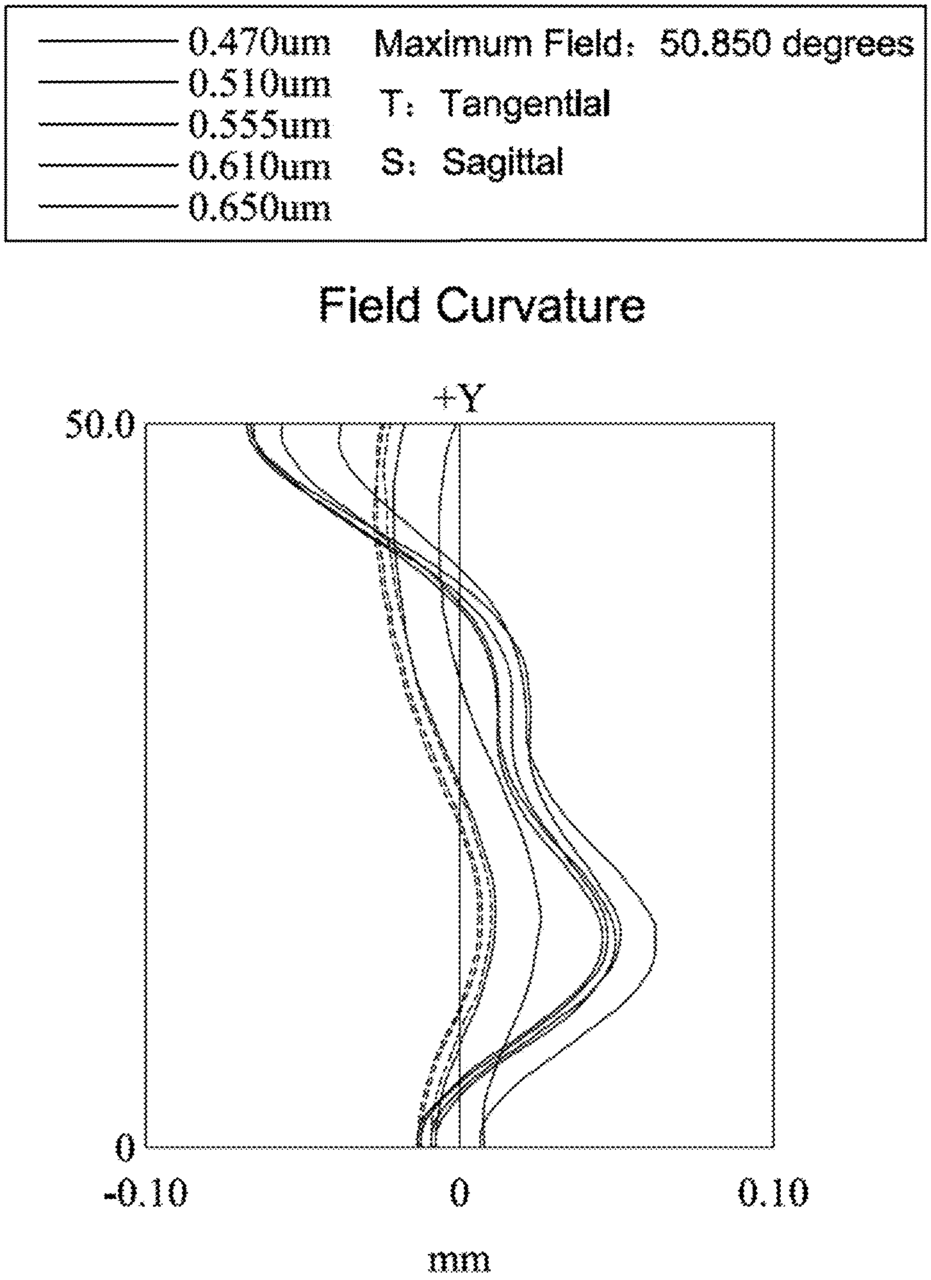
FIGS. 29, 30, 31 depict a field curvature diagram, a distortion diagram, and a modulation transfer function diagram of the wide-angle lens assembly in accordance with the eighth embodiment of the invention, respectively.
Figure 30:
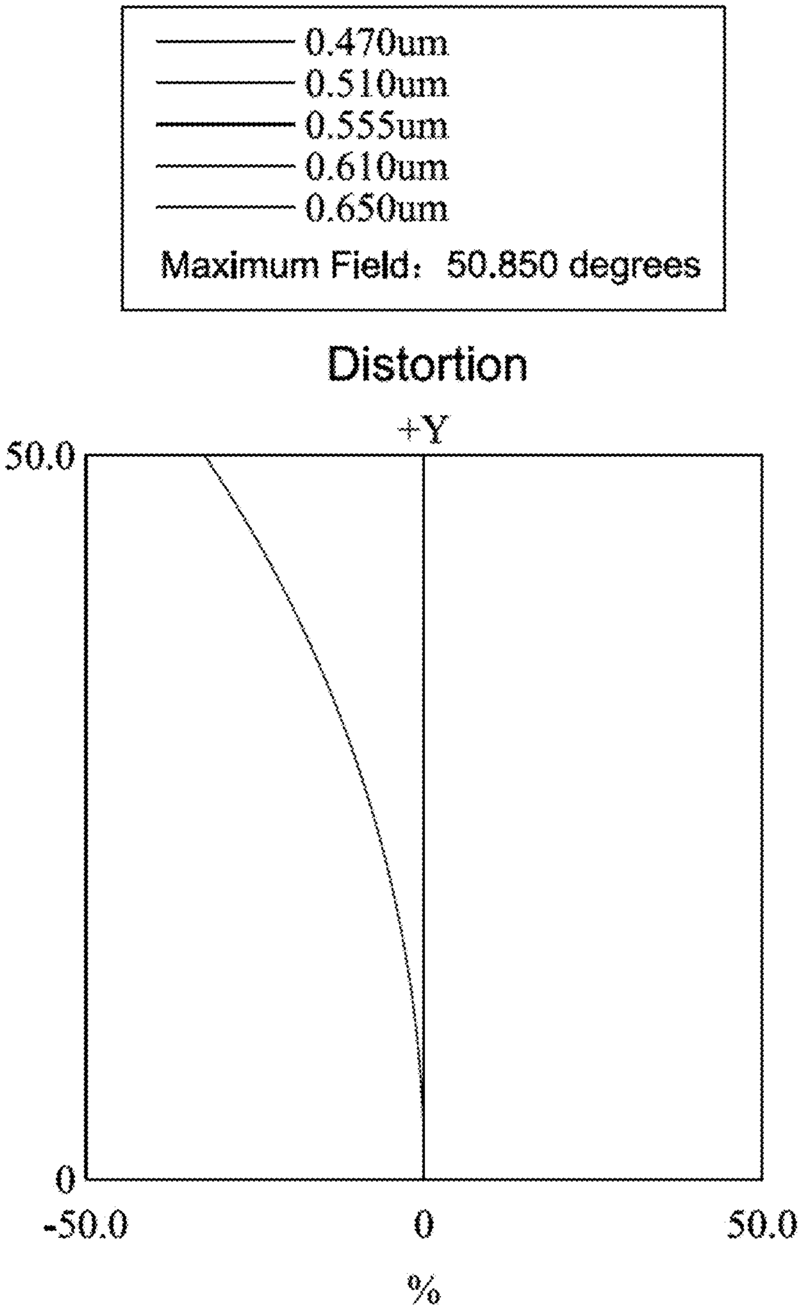
Figure 31:
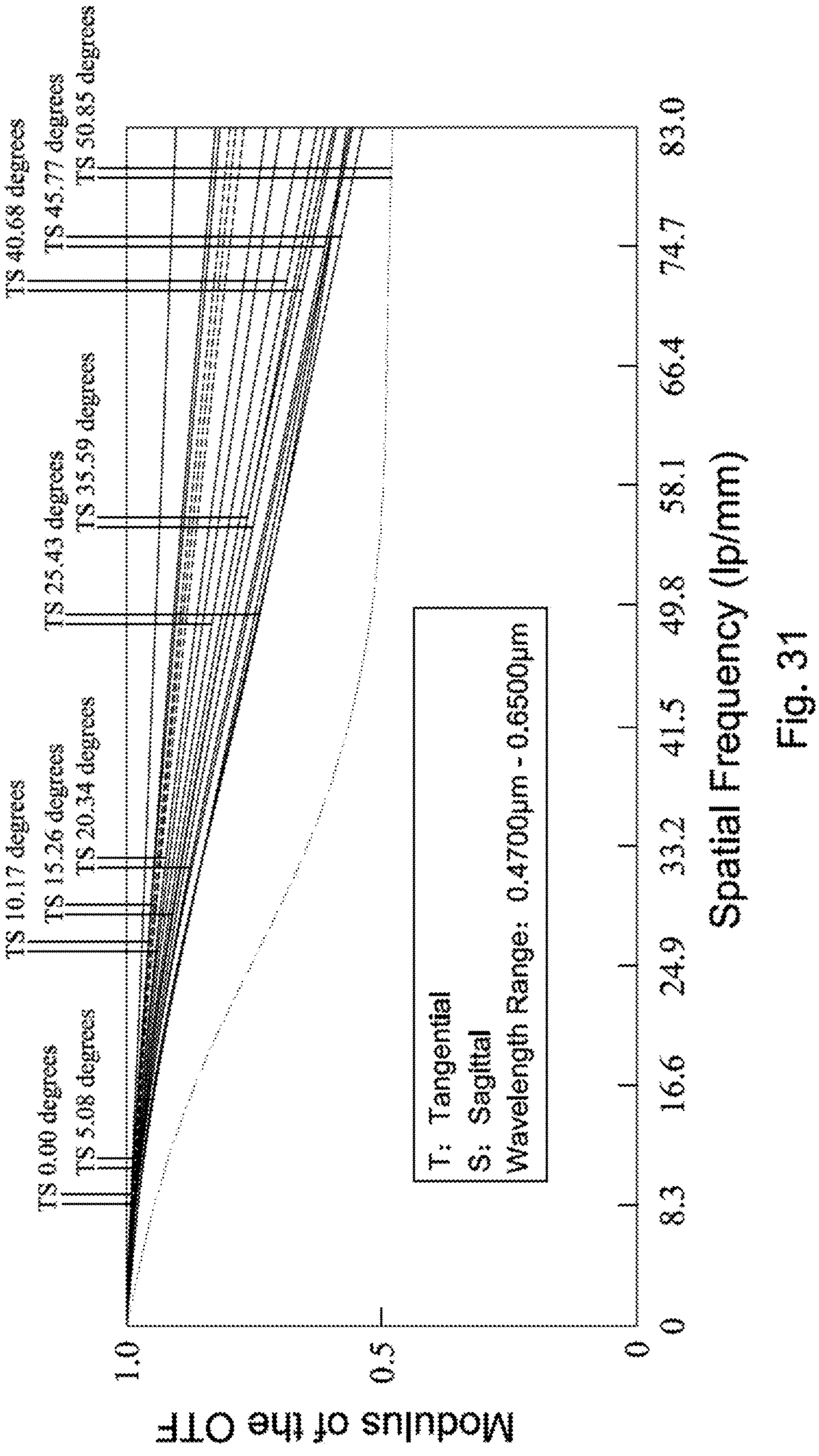

In addition, the wide-angle lens assembly 8 of the eighth embodiment can meet the requirements of optical performance as seen in FIGS. 29-31. It can be seen from FIG. 29 that the field curvature of tangential direction and sagittal direction in the wide-angle lens assembly 8 of the eighth embodiment ranges from −0.08 mm to 0.08 mm. It can be seen from FIG. 30 that the distortion in the wide-angle lens assembly 8 of the eighth embodiment ranges from −40% to 0%. It can be seen from FIG. 31 that the modulation transfer function of tangential direction and sagittal direction in the wide-angle lens assembly 8 of the eighth embodiment ranges from 0.48 to 1.0. It is obvious that the field curvature and the distortion of the wide-angle lens assembly 8 of the eighth embodiment can be corrected effectively, and the resolution of the wide-angle lens assembly 8 of the eighth embodiment can meet the requirement. Therefore, the wide-angle lens assembly 8 of the eighth embodiment is capable of good optical performance.

A detailed description of a wide-angle lens assembly in accordance with a ninth embodiment of the invention is as follows. Referring to FIG. 32, the wide-angle lens assembly 9 includes a first lens L91, a second lens L92, a stop ST9, a third lens L93, a fourth lens L94, a fifth lens L95, a sixth lens L96, a seventh lens L97, an eighth lens L98, and an optical filter OF9, all of which are arranged in order from an object side to an image side along an optical axis OA9. In operation, the light from the object side is imaged on an image plane IMA9. The wide-angle lens assembly of the present invention can meet the basic operation requirements when it only satisfies condition (15) and the refractive surface shape characteristics of the independent claim, or only satisfies condition (16) and the refractive surface shape characteristics of the independent claim.

Table 25 shows the optical specification of the wide-angle lens assembly 9 in FIG. 32.

TABLE 25

Effective Focal Length = 4.98 mm F-number = 1.64
Total Lens Length = 24.09 mm Field of View = 101.7 degrees

| Surface Number | Radius of Curvature (mm) | Thickness (mm) | Nd | Vd | Effective Focal Length (mm) | Remark |
|---|---|---|---|---|---|---|
| S91 | −86.84 | 0.55 | 1.59 | 61.25 | −5.86 | L91 |
| S92 | 3.61 | 1.71 | | | | |
| S93 | 30.55 | 1.26 | 1.66 | 21.21 | 78.58 | L92 |
| S94 | 72.78 | 0.75 | | | | |
| | ∞ | | | | | ST9 |
| S95 | 13.75 | 2.91 | 1.54 | 59.72 | 8.24 | L93 |
| S96 | −6.12 | 0.26 | | | | |
| S97 | 21.49 | 2.40 | 1.54 | 56.00 | 21.66 | L94 |
| S98 | −25.30 | 0.30 | | | | |
| S99 | −13.13 | 0.51 | 1.66 | 21.21 | −14.50 | L95 |
| S910 | 36.23 | 1.12 | | | | |
| S911 | 42.34 | 1.99 | 1.54 | 56.00 | 19.70 | L96 |
| S912 | −14.19 | 0.12 | | | | |
| S913 | 7.97 | 3.23 | 1.69 | 54.82 | 7.89 | L97 |
| S914 | −14.55 | 0 | | | | |
| S915 | −14.55 | 1.56 | 1.81 | 25.46 | −8.00 | L98 |
| S916 | 12.28 | 1.68 | | | | |
| S917 | ∞ | 0.72 | 1.52 | 54.52 | | OF9 |
| S918 | ∞ | 1.50 | | | | |

In the ninth embodiment, the conic constant k and the aspheric coefficients A, B, C, D, E, F, G, H, and I of each aspheric lens are shown in Table 26.

TABLE 26

| Surface Number | k<br>E | A<br>F | B<br>G | C<br>H | D<br>I |
|---|---|---|---|---|---|
| S93 | 0 | 8.43E−04 | −3.65E−06 | 1.94E−06 | 9.83E−08 |
| | −2.01E−08 | −2.31E−09 | 1.60E−10 | 2.12E−11 | −1.51E−12 |
| S94 | 0 | 1.25E−03 | 2.37E−05 | 2.05E−06 | −1.55E−07 |
| | −1.26E−08 | 2.80E−09 | 1.11E−10 | −4.15E−11 | 1.79E−12 |
| S97 | 0 | 1.39E−04 | 4.83E−08 | −3.20E−07 | 8.91E−09 |
| | 4.47E−10 | −2.71E−11 | −5.35E−13 | 1.88E−14 | 2.48E−16 |
| S98 | 0 | −2.34E−04 | −3.21E−06 | 2.30E−07 | 7.45E−09 |
| | 2.14E−10 | 5.13E−13 | −7.79E−13 | −3.82E−14 | 2.83E−15 |
| S99 | 0 | 2.24E−04 | −2.08E−06 | −1.32E−07 | 1.90E−10 |
| | −2.99E−10 | −1.09E−11 | 7.74E−13 | 4.54E−14 | −1.23E−15 |
| S910 | 0 | 8.47E−05 | 1.54E−05 | −1.78E−07 | −9.37E−09 |
| | −4.88E−11 | −1.14E−11 | −7.05E−14 | 6.29E−15 | 2.50E−16 |
| S911 | 0 | −4.00E−05 | −7.04E−06 | 6.19E−07 | 1.84E−08 |
| | −6.17E−10 | −2.13E−11 | −5.25E−13 | 2.23E−14 | 6.58E−17 |
| S912 | 0 | −7.78E−05 | 6.09E−06 | 1.34E−07 | −7.65E−10 |
| | 1.20E−10 | 8.03E−12 | −3.09E−13 | −3.16E−14 | 8.76E−16 |

Table 27 shows the parameters and condition values for conditions (12)-(16) in accordance with the ninth embodiment of the invention. It can be seen from Table 27 that the wide-angle lens assembly 9 of the ninth embodiment satisfies the conditions (12)-(16).

TABLE 27

| | | | | | |
|---|---|---|---|---|---|
| T1131 | 5.8 mm | T4251 | 0.3 mm | T6182 | 6.89 mm |
| T4251/ T1131 | 0.05 | T4251/ T6182 | 0.04 | R12/R72 | −0.25 |
| Vd2/Vd4 | 0.38 | Vd6/Vd5 | 2.64 | | |

Figure 33:
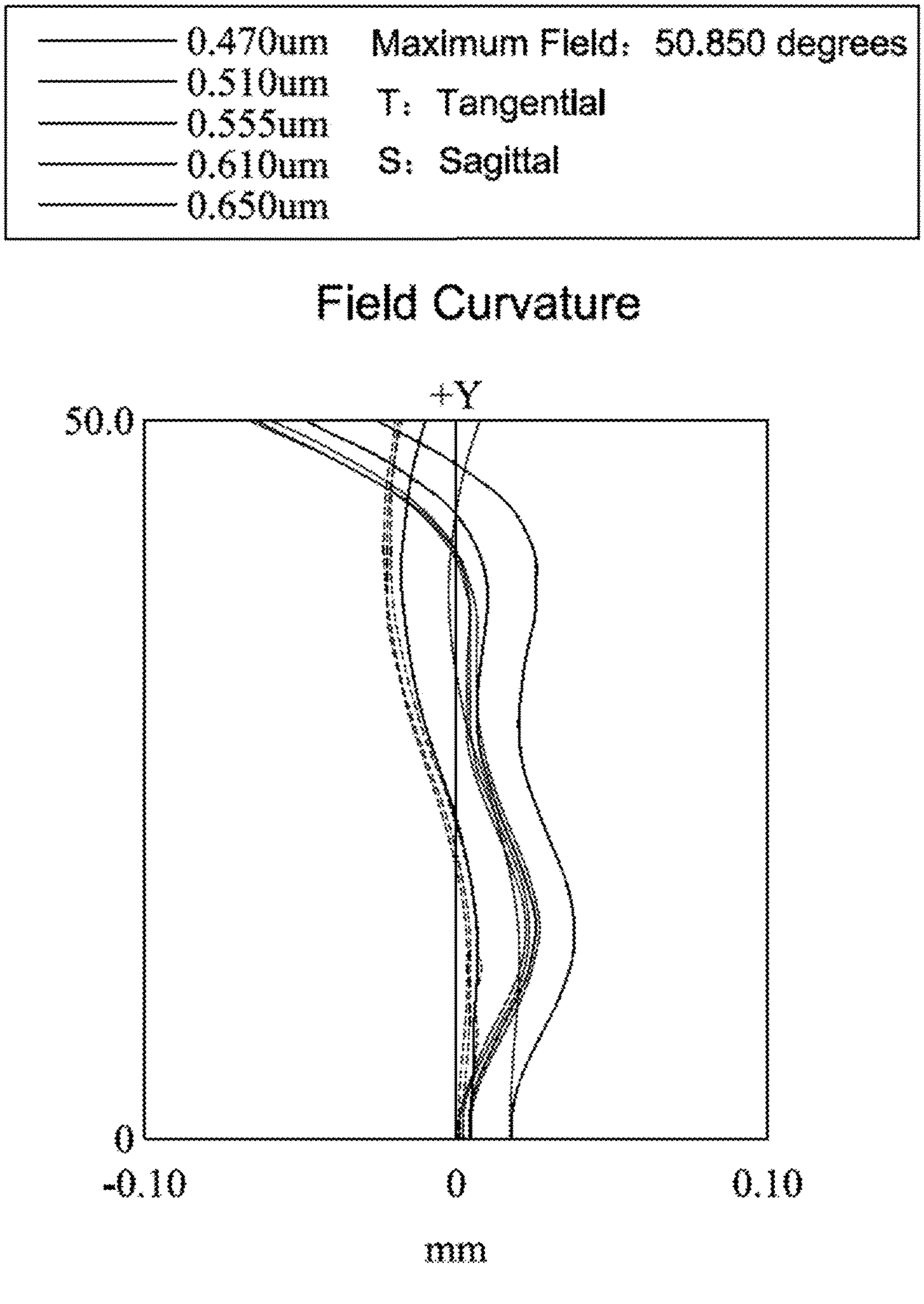
FIGS. 33, 34, 35 depict a field curvature diagram, a distortion diagram, and a modulation transfer function diagram of the wide-angle lens assembly in accordance with the ninth embodiment of the invention, respectively.
Figure 34:
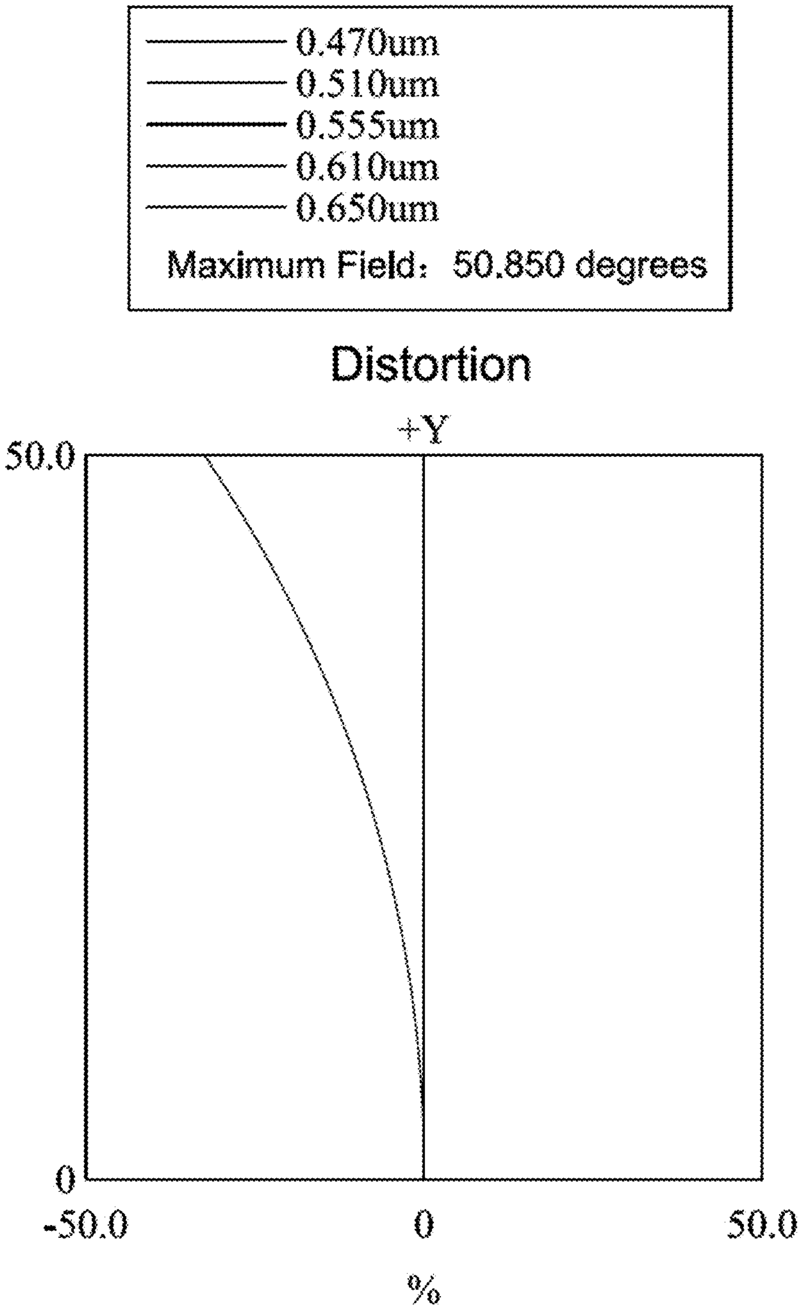
Figure 35:
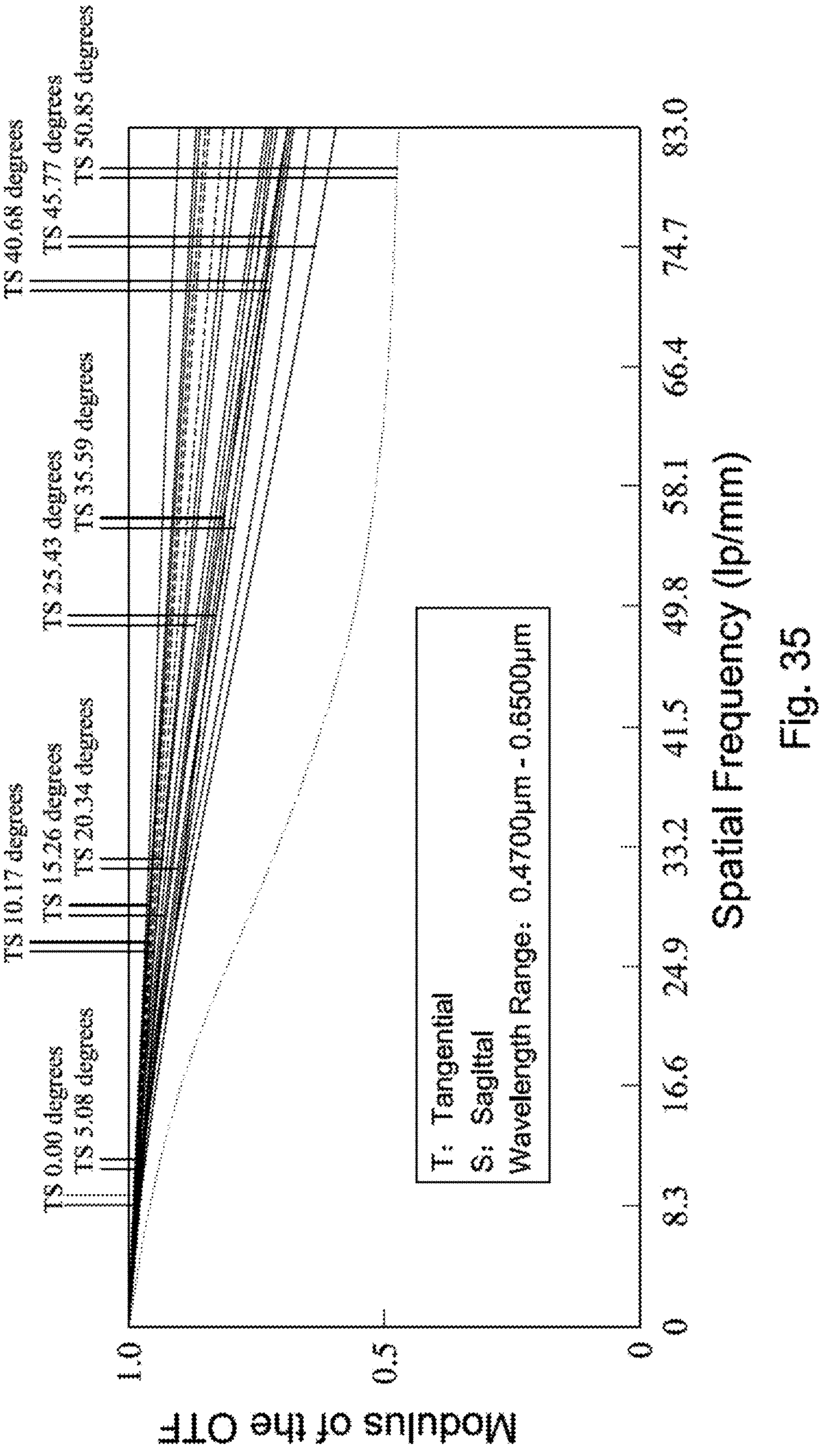

In addition, the wide-angle lens assembly 9 of the ninth embodiment can meet the requirements of optical performance as seen in FIGS. 33-35. It can be seen from FIG. 33 that the field curvature of tangential direction and sagittal direction in the wide-angle lens assembly 9 of the ninth embodiment ranges from −0.08 mm to 0.04 mm. It can be seen from FIG. 34 that the distortion in the wide-angle lens assembly 9 of the ninth embodiment ranges from −40% to 0%. It can be seen from FIG. 35 that the modulation transfer function of tangential direction and sagittal direction in the wide-angle lens assembly 9 of the ninth embodiment ranges from 0.48 to 1.0. It is obvious that the field curvature and the distortion of the wide-angle lens assembly 9 of the ninth embodiment can be corrected effectively, and the resolution of the wide-angle lens assembly 9 of the ninth embodiment can meet the requirement. Therefore, the wide-angle lens assembly 9 of the ninth embodiment is capable of good optical performance.

The present invention provides another wide-angle lens assembly including a first lens, a second lens, a third lens, a fourth lens, a fifth lens, a sixth lens, a seventh lens, and an eighth lens. The first lens is with negative refractive power and includes an object side surface facing an object side and an image side surface facing an image side. The second lens is with positive refractive power and includes an object side surface facing the object side and an image side surface facing the image side. The third lens is with positive refractive power and includes an object side surface facing the object side and an image side surface facing the image side. The fourth lens is with negative refractive power and includes an object side surface facing the object side and an image side surface facing the image side. The fifth lens is with refractive power and includes an object side surface facing the object side and an image side surface facing the image side. The sixth lens is with positive refractive power and includes an object side surface facing the object side and an image side surface facing the image side. The seventh lens is with positive refractive power and includes an object side surface facing the object side and an image side surface facing the image side. The eighth lens is with negative refractive power and includes an object side surface facing the object side and an image side surface facing the image side. The first lens, the second lens, the third lens, the fourth lens, the fifth lens, the sixth lens, the seventh lens, and the eighth lens are arranged in order from the object side to the image side along an optical axis. The wide-angle lens assembly satisfies at least one of the following conditions: $0.8 \le f/D22 \le 3$; 0.025 degrees$^{-1} \le 1/\alpha \le 0.3$ degrees$^{-1}$; 0.03 degrees$^{-1} \le 1/\beta \le 0.35$ degrees$^{-1}$; $0.5 \le \alpha/\beta \le 30$; wherein f is an effective focal length of the wide-angle lens assembly, D22 is an effective optical diameter of the image side surface of the second lens, α is an angle between the first cemented surface of the first cemented lens and a vertical line perpendicular to the optical axis, and β is an angle between the second cemented surface of the second cemented lens and a vertical line perpendicular to the optical axis. A wide-angle lens assembly of the present invention is a preferred embodiment of the present invention when the wide-angle lens assembly satisfies the above features and at least one of the above conditions.

Referring to Table 28, Table 29, Table 31, Table 32, Table 34, Table 35, Table 37, Table 38, Table 40, Table 41, Table 43, and Table 44, wherein Table 28, Table 31, Table 34, Table 37, Table 40, and Table 43 show optical specification in accordance with a tenth, an eleventh, a twelfth, a thirteenth, a fourteenth, and a fifteenth embodiments of the invention, respectively, and Table 29, Table 32, Table 35, Table 38, Table 41, and Table 44 show aspheric coefficients of each aspheric lens in Table 28, Table 31, Table 34, Table 37, Table 40, and Table 43, respectively. The aspheric surface sag z of each aspheric lens in the following embodiments can be calculated by the following=formula: $Z\ ch^2/\{1+[1-(k+1)c^2h^2]^{1/2}\}+Ah^4+Bh^6+Ch^8+Dh^{10}+Eh^{12}+Fh^{14}+Gh^{16}+Hh^{18}+Ih^{20}$, where c is curvature, h is the vertical distance from the lens surface to the optical axis, k is conic constant, A, B, C, D, E, F, G, H, and I are aspheric coefficients, and the value of the aspheric coefficient A, B, C, D, E, F, G, H, and I are presented in scientific notation, such as 2E-03 for $2\times10^{-3}$.

FIGS. 36, 37, 38, 42, and 46 are lens layout diagrams of the lens assemblies in accordance with the tenth, twelfth, thirteenth, fourteenth, and fifteenth embodiments of the invention, respectively. In addition, the lens layout diagram of the eleventh embodiment of the invention is not shown and is only described in words.

The first lenses L101, L111, L121, L131, L141, L151 are biconcave lenses with negative refractive power, wherein the object side surfaces S101, S111, S121, S131, S141, S151 are concave surfaces and the image side surfaces S102, S112, S122, S132, S142, S152 are concave surfaces.

The second lenses L102, L112, L132, L142, L152 are meniscus lenses with positive refractive power.

The third lenses L103, L113, L123, L133, 1143, L153 are biconvex lenses with positive refractive power, wherein the object side surfaces S106, S116, S126, S136, S146, S156 are convex surfaces and the image side surfaces S107, S117, S127, S137, S147, S157 are convex surfaces.

The fourth lenses L104, L114, L124, L134, L144, L154 are with negative refractive power, wherein the object side surfaces S108, S118, S128, S138, S148, S158 are concave surfaces.

The fifth lenses L105, L115, L125, L135, L145, L155 are with refractive power, wherein the image side surfaces S1011, S1111, S1211, S1311, S1411, S1511 are convex surfaces.

The sixth lenses L106, L116, L126, L136, L146, L156 are with positive refractive power, wherein the image side surfaces S1013, S1113, S1213, S1313, S1413, S1513 are convex surfaces.

The seventh lenses L107, L117, L127, L137, L147, L157 are biconvex lenses with positive refractive power, wherein the object side surfaces S1014, $1114, S1214, S1314, S1414, S1514 are convex surfaces and the image side surfaces S1015, S1115, S1215, S1315, S1415, S1515 are convex surfaces.

The eighth lenses L108, L118, L128, L138, L148, L158 are with negative refractive power, wherein the object side surfaces S1016, S1116, S1216, S1316, S1416, S1516 are concave surfaces.

In addition, the wide-angle lens assemblies 10, 11, 12, 13, 14, and 15 satisfy at least one of the following conditions (1), (6)-(9), and (12)-(16):

$$0.8 \leq f/D22 \leq 3; \quad (1)$$

$$0 \leq T1131/T3152 \leq 3; \quad (6)$$

$$0 \leq T1131/T6182 \leq 3; \quad (7)$$

$$0 \leq T3152/T6182 \leq 3; \quad (8)$$

$$0.17 \leq T11ST/TTL \leq 0.2; \quad (9)$$

$$0 \leq T4251/T1131 \leq 0.5; \quad (12)$$

$$0 \leq T4251/T6182 \leq 0.5; \quad (13)$$

$$-10 \leq R12/R72 \leq 0.5; \quad (14)$$

$$0.15 \leq Vd2/Vd4 \leq 3; \quad (15)$$

$$0.3 \leq Vd6/Vd5 \leq 3; \quad (16)$$

where f is an effective focal length of the wide-angle lens assemblies 10, 11, 12, 13, 14, 15 in the tenth embodiment through the fifteenth embodiment; D22 is an effective optical diameter of the image side surfaces S104, S114, S124, S134, S144, S154 of the second lenses L102, L112, L122, L132, L142, L152 in the tenth embodiment through the fifteenth embodiment; T1131 is an interval from the object side surfaces S101, S111, S121, S131, S141, S151 of the first lenses L101, L111, L121, L131, L141, L151 to the object side surfaces S106, S116, S126, S136, S146, S156 of the third lenses L103, L113, L123, L133, L143, L153 along the optical axes OA10, OA11, OA12, OA13, OA14, OA15 in the tenth embodiment through the fifteenth embodiment; T3152 is an interval from the object side surfaces S106, S116, S126, S136, S146, S156 of the third lenses L103, L113, L123, L133, L143, L153 to the image side surfaces S1011, S1111, S1211, S1311, S1411, S1511 of the fifth lenses L105, L115, L125, L135, L145, L155 along the optical axes OA10, OA11, OA12, OA13, OA14, OA15 in the tenth embodiment through the fifteenth embodiment; T6182 is an interval from the object side surfaces S1012, S1112, S1212, S1312, S1412, S1512 of the sixth lenses L106, L116, L126, L136, L146, L156 to the image side surfaces S1017, S1117, S1217, S1317, S1417, S1517 of the eighth lenses L108, L118, L128, L138, L148, L158 along the optical axes OA10, OA11, OA12, OA13, OA14, OA15 in the tenth embodiment through the fifteenth embodiment; T11ST is an interval from the object side surfaces S101, S111, S121, S131, S141, S151 of the first lenses L101, L111, L121, L131, L141, L151 to the stop surfaces S105, S115, S125, S135, S145, S155 of the stop ST10, ST11, ST12, ST13, ST14, ST15 along the optical axes OA10, OA11, OA12, OA13, OA14, OA15 in the tenth embodiment through the fifteenth embodiment; TTL is an interval from the object side surfaces S101, S111, S121, S131, S141, S151 of the first lenses L101, L111, L121, L131, L141, L151 to the image plane IMA10, IMA11, IMA12, IMA13, IMA14, IMA15 along the optical axes OA10, OA11, OA12, OA13, OA14, OA15 in the tenth embodiment through the fifteenth embodiment; T4251 is an interval from the image side surfaces S109, S119, S129, S139, S149, S159 of the fourth lenses L104, L114, L124, L134, L144, L154 to the object side surfaces S1010, S1110, S1210, S1310, S1410, S1510 of the fifth lenses L105, L115, L125, L135, L145, L155 along the optical axes OA10, OA11, OA12, OA13, OA14, OA15 in the tenth embodiment through the fifteenth embodiment; R12 is a radius of curvature of the image side surfaces S102, S112, S122, S132, S142, S152 of the first lenses L101, L111, L121, L131, L141, L151 in the tenth embodiment through the fifteenth embodiment; R72 is a radius of curvature of the image side surfaces S1015, S1115, S1215, S1315, S1415, S1515 of the seventh lenses L107, L117, L127, L137, L147, L157 in the tenth embodiment through the fifteenth embodiment; Vd2 is an Abbe number of the second lenses L102, L112, L122, L132, L142, L152 in the tenth embodiment through the fifteenth embodiment; Vd4 is an Abbe number of the fourth lenses L104, L114, L124, L134, L144, L154 in the tenth embodiment through the fifteenth embodiment; Vd5 is an Abbe number of the fifth lenses L105, L115, L125, L135, L145, L155 in the tenth embodiment through the fifteenth embodiment; and Vd6 is an Abbe number of the sixth lenses L106, L116, L126, L136, L146, L156 in the tenth embodiment through the fifteenth embodiment.

It should be noted that in each embodiment of the present application, the condition satisfied by a certain embodiment may not be explicitly stated, but this embodiment may also satisfy the condition of the other embodiments. For the sake of brevity, it will not be described in detail here again. Instead, the relevant parameter values and the calculated values of the corresponding conditions in this embodiment are explained in the form of data. The definitions of the relevant parameters are the same as those of the other embodiments in the entire text, and will not described here again.

Figure 36:
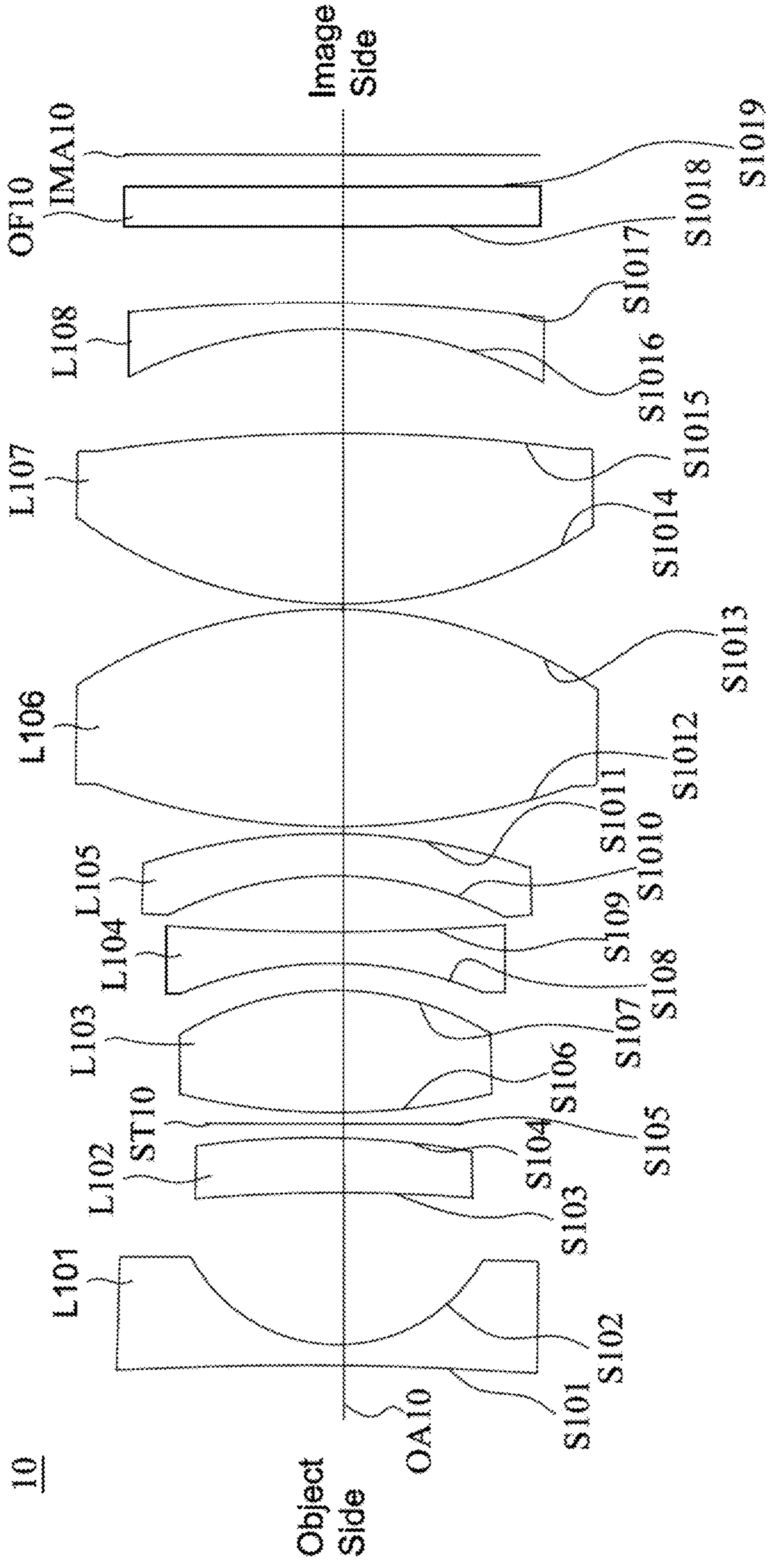
FIG. 36 is a lens layout diagram of a wide-angle lens assembly in accordance with a tenth embodiment of the invention.

A detailed description of a wide-angle lens assembly in accordance with a tenth embodiment of the invention is as follows. Referring to FIG. 36, the wide-angle lens assembly 10 includes a first lens L101, a second lens L102, a stop ST10, a third lens L103, a fourth lens L104, a fifth lens L105, a sixth lens L106, a seventh lens L107, an eighth lens L108, and an optical filter OF10, all of which are arranged in order from an object side to an image side along an optical axis OA10. In operation, the light from the object side is imaged on an image plane IMA10.

According to the foregoing, wherein: the object side surface S103 is a concave surface and image side surface S104 is a convex surface for the second lens L102; the fourth lens L104 is a biconcave lens, wherein the image side surface S109 is a concave surface; the fifth lens L105 is a meniscus lens with negative refractive power, wherein the object side surface S1010 is a concave surface; the sixth lens L106 is a biconvex lens, wherein the object side surface S1012 is a convex surface; the eighth lens L108 is a meniscus lens, wherein the image side surface S1017 is a convex surface; both of the object side surface S1018 and image side surface S1019 of the optical filter OF10 are plane surfaces; the first lens L101, second lens L102, third lens L103, seventh lens L107, and eighth lens L108 are spherical glass lenses; the fourth lens L104, fifth lens L105, and sixth lens L106 are aspheric plastic lenses; with the above design of the lenses, stop ST10, and at least one of the conditions (1), (6)-(9), and (12)-(16) satisfied, the wide-angle lens assembly 10 can have an effective decreased F-number, an effective increased field of view, an effective increased resolution, and an effective corrected aberration.

Table 28 shows the optical specification of the wide-angle lens assembly 10 in FIG. 36.

TABLE 28

Effective Focal Length = 6.23 mm F-number = 1.65
Total Lens Length = 29.93 mm Field of View = 101.70 degrees

| Surface Number | Radius of Curvature (mm) | Thick-ness (mm) | Nd | Vd | Effective Focal Length (mm) | Remark |
|---|---|---|---|---|---|---|
| S101 | −110.84 | 0.72 | 1.59 | 61.25 | −7.42 | L101 |
| S102 | 4.58 | 3.44 | | | | |
| S103 | −82.96 | 1.49 | 1.99 | 16.48 | 28.30 | L102 |
| S104 | −21.24 | 0.27 | | | | |
| S105 | ∞ | 0.20 | | | | ST10 |
| S106 | 13.91 | 3.09 | 1.55 | 75.50 | 9.59 | L103 |
| S107 | −7.86 | 0.71 | | | | |
| S108 | −9.26 | 0.70 | 1.66 | 21.21 | −11.97 | L104 |
| S109 | 56.61 | 1.34 | | | | |
| S1010 | −10.47 | 1.10 | 1.66 | 21.21 | −87.25 | L105 |

TABLE 28-continued

Effective Focal Length = 6.23 mm F-number = 1.65
Total Lens Length = 29.93 mm Field of View = 101.70 degrees

| Surface Number | Radius of Curvature (mm) | Thick-ness (mm) | Nd | Vd | Effective Focal Length (mm) | Remark |
|---|---|---|---|---|---|---|
| S1011 | −13.32 | 0.10 | | | | |
| S1012 | 13.73 | 5.54 | 1.54 | 56.00 | 11.74 | L106 |
| S1013 | −10.32 | 0.05 | | | | |
| S1014 | 11.07 | 4.21 | 1.55 | 75.50 | 16.31 | L107 |
| S1015 | −41.61 | 2.53 | | | | |
| S1016 | −11.76 | 0.70 | 1.99 | 16.48 | −14.38 | L108 |
| S1017 | −67.43 | 1.97 | | | | |
| S1018 | ∞ | 0.90 | 1.52 | 54.52 | | OF10 |
| S1019 | ∞ | 0.85 | | | | |

In the tenth embodiment, the conic constant k and the aspheric coefficients A, B, C, D, E, F, G, H, and I of each aspheric lens are shown in Table 29.

TABLE 29

| Surface Number | k<br>E | A<br>F | B<br>G | C<br>H | D<br>I |
|---|---|---|---|---|---|
| S108 | 0 | 7.6066E−04 | −2.690E−05 | 1.0112E−06 | 2.5401E−08 |
| | −3.0245E−09 | 0 | 0 | 0 | 0 |
| S109 | 0 | 3.9179E−04 | −2.3917E−05 | −1.5902E−06 | 2.2704E−07 |
| | −6.7852E−09 | 0 | 0 | 0 | 0 |
| S1010 | 0 | 1.0642E−04 | −3.0808E−05 | −1.6066E−06 | 1.5507E−07 |
| | −1.7626E−09 | 0 | 0 | 0 | 0 |
| S1011 | 0 | 2.4620E−04 | −6.8691E−06 | 1.2289E−08 | −5.3915E−09 |
| | 3.6949E−10 | 0 | 0 | 0 | 0 |
| S1012 | 0 | 3.9426E−04 | 2.6398E−06 | −3.6486E−07 | 8.3032E−09 |
| | −8.0480E−11 | 0 | 0 | 0 | 0 |
| S1013 | 0 | 9.7463E−05 | −1.0975E−06 | 1.7298E−07 | −2.5328E−09 |
| | −7.8272E−12 | 0 | 0 | 0 | 0 |

Table 30 shows the parameters and condition values for conditions (1), (6)-(9), and (12)-(16) in accordance with the tenth embodiment of the invention. It can be seen from Table 30 that the wide-angle lens assembly 10 of the tenth embodiment satisfies the conditions (1), (6)-(9), and (12)-(16).

TABLE 30

| | | | | | |
|---|---|---|---|---|---|
| D22 | 6.66 mm | T1131 | 6.13 mm | T3152 | 6.95 mm |
| T6182 | 13.04 mm | T11ST | 5.92 mm | T4251 | 1.34 mm |
| f1 | −7.42 mm | | | | |
| f/D22 | 0.94 | R51/R72 | 0.25 | T1131/T3152 | 0.88 |
| T1131/T6182 | 0.47 | T3152/T6182 | 0.53 | T11ST/TTL | 0.20 |
| f1/f | −1.19 | T4251/T1131 | 0.22 | T4251/T6182 | 0.10 |
| R12/R72 | −0.11 | Vd2/Vd4 | 0.78 | Vd6/Vd5 | 2.64 |

A detailed description of a wide-angle lens assembly in accordance with an eleventh embodiment of the invention is as follows. The wide-angle lens assembly 11 includes a first lens L111, a second lens L112, a stop ST11, a third lens L113, a fourth lens L114, a fifth lens L115, a sixth lens L116, a seventh lens L117, an eighth lens L118, and an optical filter OF11, all of which are arranged in order from an object side to an image side along an optical axis OA11. In operation, the light from the object side is imaged on an image plane IMA11.

According to the foregoing, wherein: the object side surface S113 is a concave surface and image side surface S114 is a convex surface for the second lens L112; the fourth lens L114 is a biconcave lens, wherein the image side surface S119 is a concave surface; the fifth lens L115 is a meniscus lens with negative refractive power, wherein the object side surface S1110 is a concave surface; the sixth lens L116 is a biconvex lens, wherein the object side surface S1112 is a convex surface; the eighth lens L118 is a meniscus lens, wherein the image side surface S1117 is a convex surface; both of the object side surface S1118 and image side surface S1119 of the optical filter OF11 are plane surfaces; the first lens L111, second lens L112, third lens L113, seventh lens L117, and eighth lens L118 are spherical glass lenses; the fourth lens L114, fifth lens L115, and sixth lens L116 are aspheric plastic lenses; with the above design of the lenses, stop ST11, and at least one of the conditions (1), (6)-(9), and (12)-(16) satisfied, the wide-angle lens assembly 11 can have an effective decreased F-number, an effective increased field of view, an effective increased resolution, and an effective corrected aberration.

Table 31 shows the optical specification of the wide-angle lens assembly 11.

TABLE 31

Effective Focal Length = 6.23 mm F-number = 1.65
Total Lens Length = 29.92 mm Field of View = 101.70 degrees

| Surface Number | Radius of Curvature (mm) | Thick-ness (mm) | Nd | Vd | Effective Focal Length (mm) | Remark |
|---|---|---|---|---|---|---|
| S111 | −71.23 | 0.62 | 1.59 | 61.25 | −7.13 | L111 |
| S112 | 4.49 | 3.19 | | | | |
| S113 | −58.63 | 1.38 | 1.99 | 16.48 | 35.81 | L112 |
| S114 | −22.45 | 0.33 | | | | |
| S115 | ∞ | 0.40 | | | | ST11 |
| S116 | 15.17 | 3.22 | 1.55 | 75.50 | 9.60 | L113 |
| S117 | −7.52 | 0.89 | | | | |
| S118 | −15.20 | 0.75 | 1.66 | 21.21 | −20.13 | L114 |
| S119 | 110.93 | 1.04 | | | | |
| S1110 | −11.83 | 1.97 | 1.66 | 21.21 | −36.24 | L115 |
| S1111 | −24.87 | 0.08 | | | | |
| S1112 | 44.03 | 3.44 | 1.54 | 56.00 | 14.04 | L116 |
| S1113 | −9.03 | 0.06 | | | | |
| S1114 | 10.95 | 5.52 | 1.55 | 75.50 | 15.06 | L117 |
| S1115 | −28.22 | 2.45 | | | | |
| S1116 | −9.55 | 0.75 | 1.99 | 16.48 | −17.06 | L118 |
| S1117 | −22.65 | 1.94 | | | | |
| S1118 | ∞ | 0.90 | 1.52 | 54.52 | | OF11 |
| S1119 | ∞ | 1.00 | | | | |

In the eleventh embodiment, the conic constant k and the aspheric coefficients A, B, C, D, E, F, G, H, and I of each aspheric lens are shown in Table 32.

TABLE 32

| Surface Number | k<br>E | A<br>F | B<br>G | C<br>H | D<br>I |
|---|---|---|---|---|---|
| S118 | 0<br>0 | −2.2771E−04<br>0 | 2.8068E−05<br>0 | −6.1454E−07<br>0 | 1.1083E−08<br>0 |
| S119 | 0<br>0 | 2.2863E−04<br>0 | 9.7079E−07<br>0 | −1.0155E−07<br>0 | −4.7176E−10<br>0 |
| S1110 | 0<br>0 | 1.2659E−04<br>0 | −2.2936E−05<br>0 | −1.1239E−06<br>0 | 8.4150E−08<br>0 |
| S1111 | 0<br>0 | 1.4173E−04<br>0 | −9.8797E−06<br>0 | −3.2664E−07<br>0 | 1.8787E−08<br>0 |
| S1112 | 0<br>0 | 1.8766E−06<br>0 | 8.5956E−06<br>0 | −8.9413E−08<br>0 | −5.3408E−10<br>0 |
| S1113 | 0<br>0 | 2.8460E−05<br>0 | −2.4871E−06<br>0 | 3.3207E−07<br>0 | −5.9759E−09<br>0 |

Table 33 shows the parameters and condition values for conditions (1), (6)-(9), and (12)-(16) in accordance with the eleventh embodiment of the invention. It can be seen from Table 33 that the wide-angle lens assembly 11 of the eleventh embodiment satisfies the conditions (1), (6)-(9), and (12)-(16).

TABLE 33

| | | | | | |
|---|---|---|---|---|---|
| D22 | 6.62 mm | T1131 | 5.92 mm | T3152 | 7.87 mm |
| T6182 | 12.21 mm | T11ST | 5.52 mm | T4251 | 1.04 mm |
| f/D22 | 0.94 | R51/R72 | 0.42 | T1131/T3152 | 0.75 |
| T1131/T6182 | 0.49 | T3152/T6182 | 0.64 | T11ST/TTL | 0.18 |
| T4251/T1131 | 0.18 | T4251/T6182 | 0.09 | R12/R72 | −0.16 |
| Vd2/Vd4 | 0.78 | Vd6/Vd5 | 2.64 | | |

Figure 37:
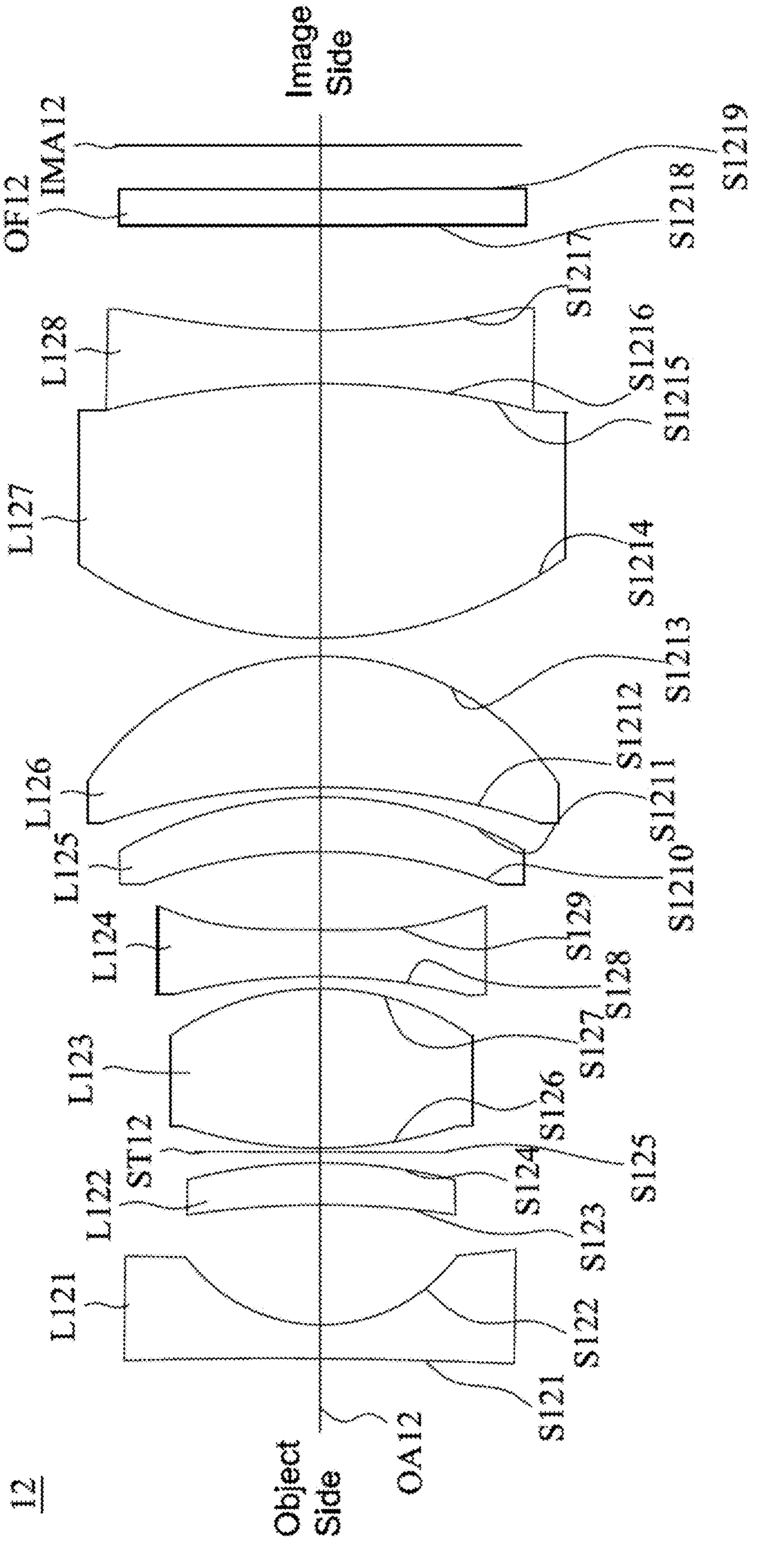
FIG. 37 is a lens layout diagram of a wide-angle lens assembly in accordance with a twelfth embodiment of the invention.

A detailed description of a wide-angle lens assembly in accordance with a twelfth embodiment of the invention is as follows. Referring to FIG. 37, the wide-angle lens assembly 12 includes a first lens L121, a second lens L122, a stop ST12, a third lens L123, a fourth lens L124, a fifth lens L125, a sixth lens L126, a seventh lens L127, an eighth lens L128, and an optical filter OF12, all of which are arranged in order from an object side to an image side along an optical axis OA12. In operation, the light from the object side is imaged on an image plane IMA12.

According to the foregoing, wherein: the object side surface S123 is a concave surface and image side surface S124 is a convex surface for the second lens L122; the fourth lens L124 is a biconcave lens, wherein the image side surface S129 is a concave surface; the fifth lens L125 is a meniscus lens with negative refractive power, wherein the object side surface S1210 is a concave surface; the sixth lens L126 is a meniscus lens, wherein the object side surface S1212 is a concave surface; the eighth lens L128 is a biconcave lens, wherein the image side surface S1217 is a concave surface; both of the object side surface S1218 and image side surface S1219 of the optical filter OF12 are plane surfaces; the first lens L121, second lens L122, third lens L123, seventh lens L127, and eighth lens L128 are spherical glass lenses; the fourth lens L124, fifth lens L125, and sixth lens L126 are aspheric plastic lenses; with the above design of the lenses, stop ST12, and at least one of the conditions (1), (6)-(9), and (12)-(16) satisfied, the wide-angle lens assembly 12 can have an effective decreased F-number, an effective increased field of view, an effective increased resolution, and an effective corrected aberration.

Table 34 shows the optical specification of the wide-angle lens assembly 12 in FIG. 37.

TABLE 34

Effective Focal Length = 6.22 mm F-number = 1.65
Total Lens Length = 29.98 mm Field of View = 101.70 degrees

| Surface Number | Radius of Curvature (mm) | Thick-ness (mm) | Nd | Vd | Effective Focal Length (mm) | Remark |
|---|---|---|---|---|---|---|
| S121 | −93.08 | 0.76 | 1.59 | 61.25 | −6.64 | L121 |
| S122 | 4.11 | 3.06 | | | | |
| S123 | −21.27 | 1.00 | 1.99 | 16.48 | 43.35 | L122 |
| S124 | −14.59 | 0.31 | | | | |
| S125 | ∞ | 0.08 | | | | ST12 |
| S126 | 10.65 | 3.92 | 1.55 | 75.50 | 8.28 | L123 |
| S127 | −6.96 | 0.33 | | | | |
| S128 | −14.41 | 1.22 | 1.66 | 21.21 | −17.68 | L124 |
| S129 | 64.69 | 1.91 | | | | |
| S1210 | −9.31 | 1.38 | 1.66 | 21.21 | 132.15 | L125 |
| S1211 | −8.91 | 0.07 | | | | |
| S1212 | −37.94 | 3.36 | 1.54 | 56.00 | 16.14 | L126 |
| S1213 | −7.38 | 0.46 | | | | |
| S1214 | 11.32 | 6.22 | 1.55 | 75.50 | 14.69 | L127 |
| S1215 | −22.96 | 0 | | | | |
| S1216 | −22.96 | 1.36 | 1.99 | 16.48 | −11.66 | L128 |
| S1217 | 24.24 | 2.59 | | | | |
| S1218 | ∞ | 0.90 | 1.52 | 54.52 | | OF12 |
| S1219 | ∞ | 1.05 | | | | |

In the twelfth embodiment, the conic constant k and the aspheric coefficients A. B. C. D. E. F. G. H. and I of each aspheric lens are shown in Table 35.

TABLE 35

| Surface Number | k<br>E | A<br>F | B<br>G | C<br>H | D<br>I |
|---|---|---|---|---|---|
| S128 | 0 | 1.2593E−03 | 2.0449E−06 | −1.9705E−06 | 2.2032E−08 |
| | 0 | 0 | 0 | 0 | 0 |
| S129 | 0 | 1.5343E−03 | 2.5808E−05 | −1.6421E−07 | −8.8905E−08 |
| | 0 | 0 | 0 | 0 | 0 |
| S1210 | 0 | 1.3778E−04 | 3.7846E−05 | 3.3610E−07 | −6.3806E−08 |
| | 0 | 0 | 0 | 0 | 0 |
| S1211 | 0 | 1.3777E−04 | 1.2124E−05 | −4.4766E−08 | −2.1233E−08 |
| | 0 | 0 | 0 | 0 | 0 |
| S1212 | 0 | −2.4728E−04 | −5.3323E−06 | −2.2731E−07 | 9.6146E−09 |
| | 0 | 0 | 0 | 0 | 0 |
| S1213 | 0 | 2.9756E−05 | −4.2531E−06 | 7.2483E−08 | −1.4582E−09 |
| | 0 | 0 | 0 | 0 | 0 |

Table 36 shows the parameters and condition values for conditions (1), (6)-(9), and (12)-(16) in accordance with the twelfth embodiment of the invention. It can be seen from Table 36 that the wide-angle lens assembly 12 of the twelfth embodiment satisfies the conditions (1), (6)-(9), and (12)-(16).

TABLE 36

| | | | | | |
|---|---|---|---|---|---|
| D22 | 6.66 mm | T1131 | 5.20 mm | T3152 | 8.76 mm |
| T6182 | 11.41 mm | T11ST | 5.12 mm | T4251 | 1.91 mm |
| B | 13.25 degrees | f1 | −6.64 mm | f12 | −8.95 mm |
| f/D22 | 0.93 | R51/R72 | 0.41 | T1131/T3152 | 0.59 |
| T1131/T6182 | 0.46 | T3152/T6182 | 0.77 | T11ST/TTL | 0.17 |
| f1/f | −1.07 | T4251/T1131 | 0.37 | T4251/T6182 | 0.17 |
| R12/R72 | −0.18 | Vd2/Vd4 | 0.78 | Vd6/Vd5 | 2.64 |
| 1/β | 0.08 $degrees^{-1}$ | f12/f | −1.44 | | |

Figure 38:
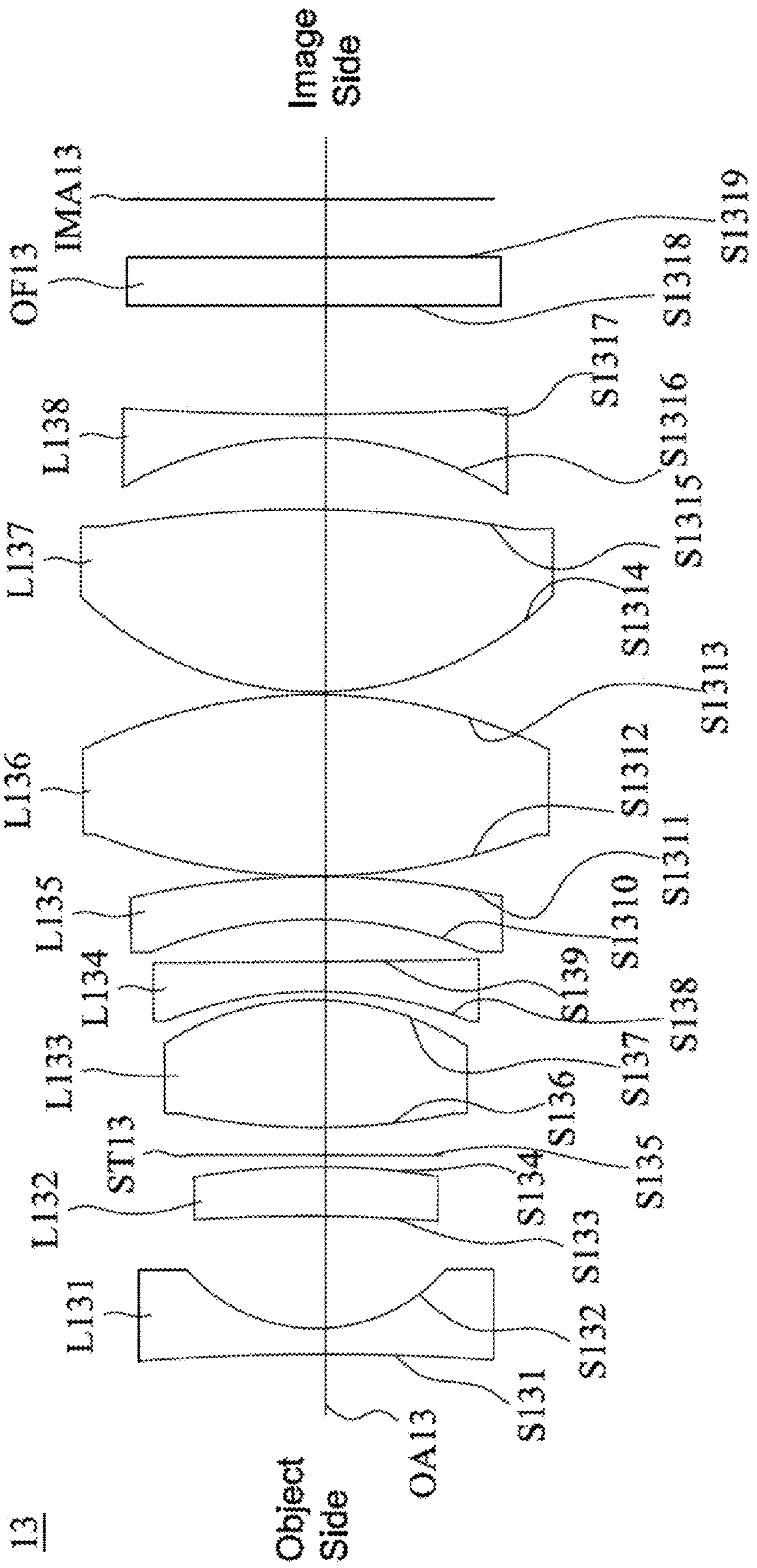
FIG. 38 is a lens layout diagram of a wide-angle lens assembly in accordance with a thirteenth embodiment of the invention.

A detailed description of a wide-angle lens assembly in accordance with a thirteenth embodiment of the invention is as follows. Referring to FIG. 38, the wide-angle lens assembly 13 includes a first lens L131, a second lens L132, a stop ST13, a third lens L133, a fourth lens L134, a fifth lens L135, a sixth lens L136, a seventh lens L137, an eighth lens L138, and an optical filter OF13, all of which are arranged in order from an object side to an image side along an optical axis OA13. In operation, the light from the object side is imaged on an image plane IMA13.

According to the foregoing, wherein: the object side surface S133 is a concave surface and image side surface S134 is a convex surface for the second lens L132; the fourth lens L134 is a meniscus lens, wherein the image side surface S139 is a convex surface; the fifth lens L135 is a meniscus lens with negative refractive power, wherein the object side surface S1310 is a concave surface; the sixth lens L136 is a biconvex lens, wherein the object side surface S1312 is a convex surface; the eighth lens L138 is a biconcave lens, wherein the image side surface S1317 is a concave surface; both of the object side surface S1318 and image side surface S1319 of the optical filter OF13 are plane surfaces; the first lens L131, second lens L132, third lens L133, and seventh lens L137 are spherical glass lenses; the fourth lens L134, fifth lens L135, sixth lens L136, and eighth lens L138 are aspheric plastic lenses; with the above design of the lenses, stop ST13, and at least one of the conditions (1), (6)-(9), and (12)-(16) satisfied, the wide-angle lens assembly 13 can have an effective decreased F-number, an effective increased field of view, an effective increased resolution, and an effective corrected aberration.

Table 37 shows the optical specification of the wide-angle lens assembly 13 in FIG. 38.

TABLE 37

Effective Focal Length = 6.19 mm F-number = 1.65
Total Lens Length = 29.67 mm Field of View = 101.70 degrees

| Surface Number | Radius of Curvature (mm) | Thickness (mm) | Nd | Vd | Effective Focal Length (mm) | Remark |
|---|---|---|---|---|---|---|
| S131 | −56.06 | 0.68 | 1.59 | 61.25 | −7.35 | L131 |
| S132 | 4.73 | 3.00 | | | | |
| S133 | −177.69 | 1.35 | 1.99 | 16.48 | 25.59 | L132 |
| S134 | −22.39 | 0.30 | | | | |
| S135 | ∞ | 0.78 | | | | ST13 |
| S136 | 17.88 | 3.43 | 1.55 | 75.50 | 9.94 | L133 |
| S137 | −7.37 | 0.22 | | | | |
| S138 | −10.61 | 0.85 | 1.66 | 21.21 | −18.07 | L134 |
| S139 | −96.42 | 1.12 | | | | |
| S1310 | −10.40 | 1.07 | 1.66 | 21.21 | −35.49 | L135 |
| S1311 | −19.43 | 0.08 | | | | |
| S1312 | 19.40 | 4.88 | 1.54 | 56.00 | 14.22 | L136 |
| S1313 | −11.80 | 0.05 | | | | |
| S1314 | 9.13 | 4.90 | 1.55 | 75.50 | 13.79 | L137 |
| S1315 | −37.03 | 2.01 | | | | |
| S1316 | −10.47 | 0.66 | 1.66 | 21.21 | −17.10 | L138 |
| S1317 | −143.10 | 2.83 | | | | |
| S1318 | ∞ | 1.40 | 1.523 | 54.517 | | OF13 |
| S1319 | ∞ | 0.06 | | | | |

In the thirteenth embodiment, the conic constant k and the aspheric coefficients A, B, C, D, E, F, G, H, and I of each aspheric lens are shown in Table 38.

TABLE 38

| Surface Number | k<br>E | A<br>F | B<br>G | C<br>H | D<br>I |
|---|---|---|---|---|---|
| S138 | 0 | 1.9041E−04 | 1.8616E−05 | 4.8608E−07 | −5.2236E−08 |
| | 7.4306E−09 | −5.1619E−10 | 1.0756E−11 | 0 | 0 |
| S139 | 0 | 4.0170E−05 | −6.0683E−06 | 8.1225E−07 | 1.1013E−08 |
| | 6.6852E−10 | −2.9402E−11 | −1.7406E−12 | 0 | 0 |
| S1310 | 0 | 8.2390E−06 | −4.8963E−05 | 4.6739E−07 | 1.2776E−07 |
| | −6.7202E−09 | 2.2429E−10 | −4.6517E−12 | 0 | 0 |
| S1311 | 0 | 2.7797E−04 | −1.3422E−05 | −3.4950E−08 | 1.8823E−08 |
| | 8.6510E−10 | −9.0808E−11 | 1.6249E−12 | 0 | 0 |
| S1312 | 0 | 3.8140E−04 | 8.7005E−06 | −2.9507E−07 | 3.3996E−09 |
| | 4.4028E−11 | −1.6032E−12 | 4.9288E−15 | 0 | 0 |
| S1313 | 0 | 7.5190E−05 | −1.0871E−06 | 2.3804E−07 | −6.7141E−09 |
| | 7.4325E−11 | 2.7863E−12 | −6.1864E−14 | 0 | 0 |
| S1316 | 0 | −1.0365E−03 | −7.3323E−06 | 8.6229E−07 | −1.4323E−08 |
| | 0 | 0 | 0 | 0 | 0 |
| S1317 | 0 | 8.4821E−04 | −5.0952E−05 | 1.7870E−06 | −2.7473E−08 |
| | 0 | 0 | 0 | 0 | 0 |

Table 39 shows the parameters and condition values for conditions (1), (6)-(9), and (12)-(16) in accordance with the thirteenth embodiment of the invention.

It can be seen from Table 39 that the wide-angle lens assembly 13 of the thirteenth embodiment satisfies the conditions (1), (6)-(9), and (12)-(16).

TABLE 39

| | | | | | |
|---|---|---|---|---|---|
| D22 | 6.33 mm | T1131 | 6.11 mm | T3152 | 6.69 mm |
| T6182 | 12.50 mm | T11ST | 5.33 mm | T4251 | 1.12 mm |
| f1 | −7.35 mm | | | | |
| f/D22 | 0.98 | R51/R72 | 0.28 | T1131/T3152 | 0.91 |
| T1131/T6182 | 0.49 | T3152/T6182 | 0.54 | T11ST/TTL | 0.18 |
| f1/f | −1.19 | T4251/T1131 | 0.18 | T4251/T6182 | 0.09 |
| R12/R72 | −0.13 | Vd2/Vd4 | 0.78 | Vd6/Vd5 | 2.64 |

Figure 39:
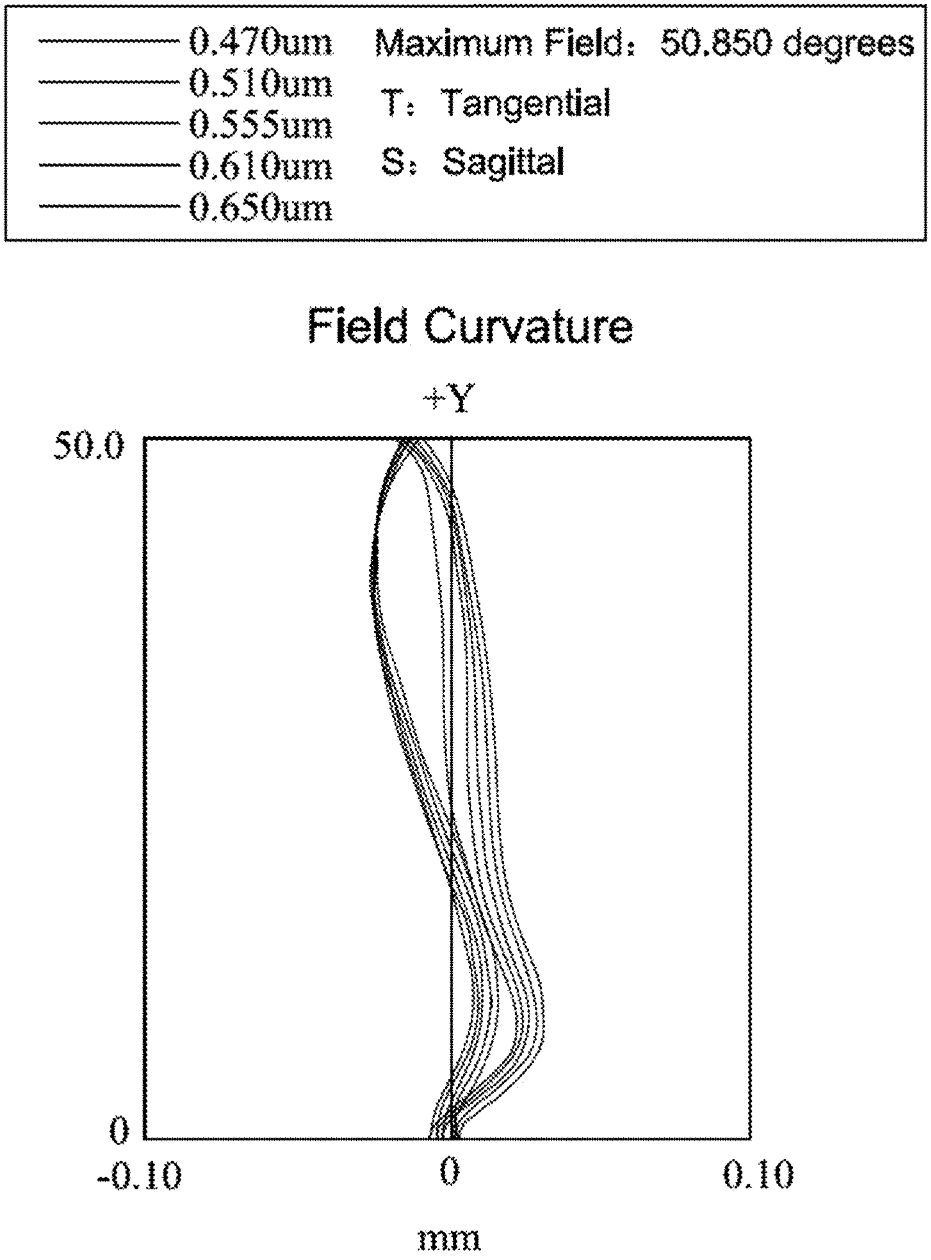
FIGS. 39, 40, 41 depict a longitudinal aberration diagram, a field curvature diagram, and a distortion diagram of the wide-angle lens assembly in accordance with the thirteenth embodiment of the invention, respectively.
Figure 40:
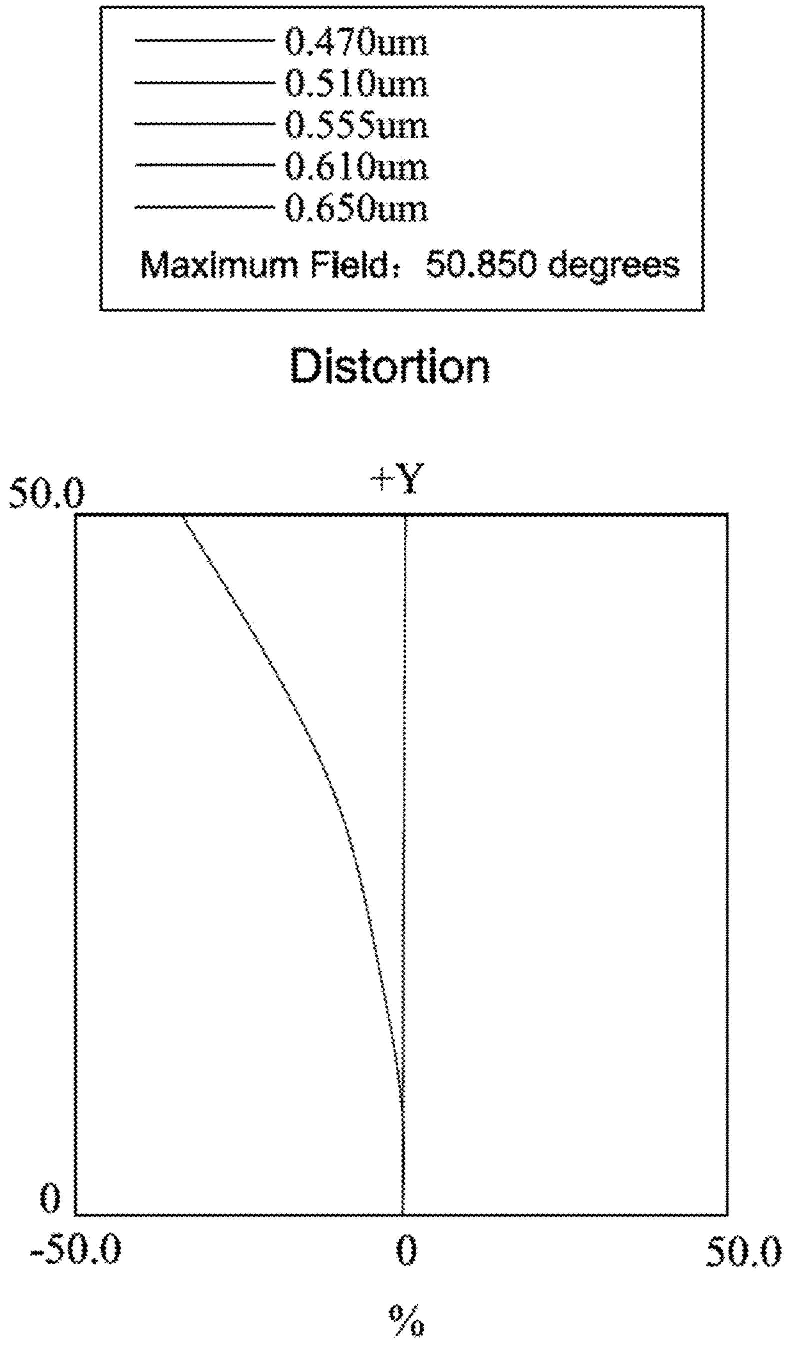
Figure 41:
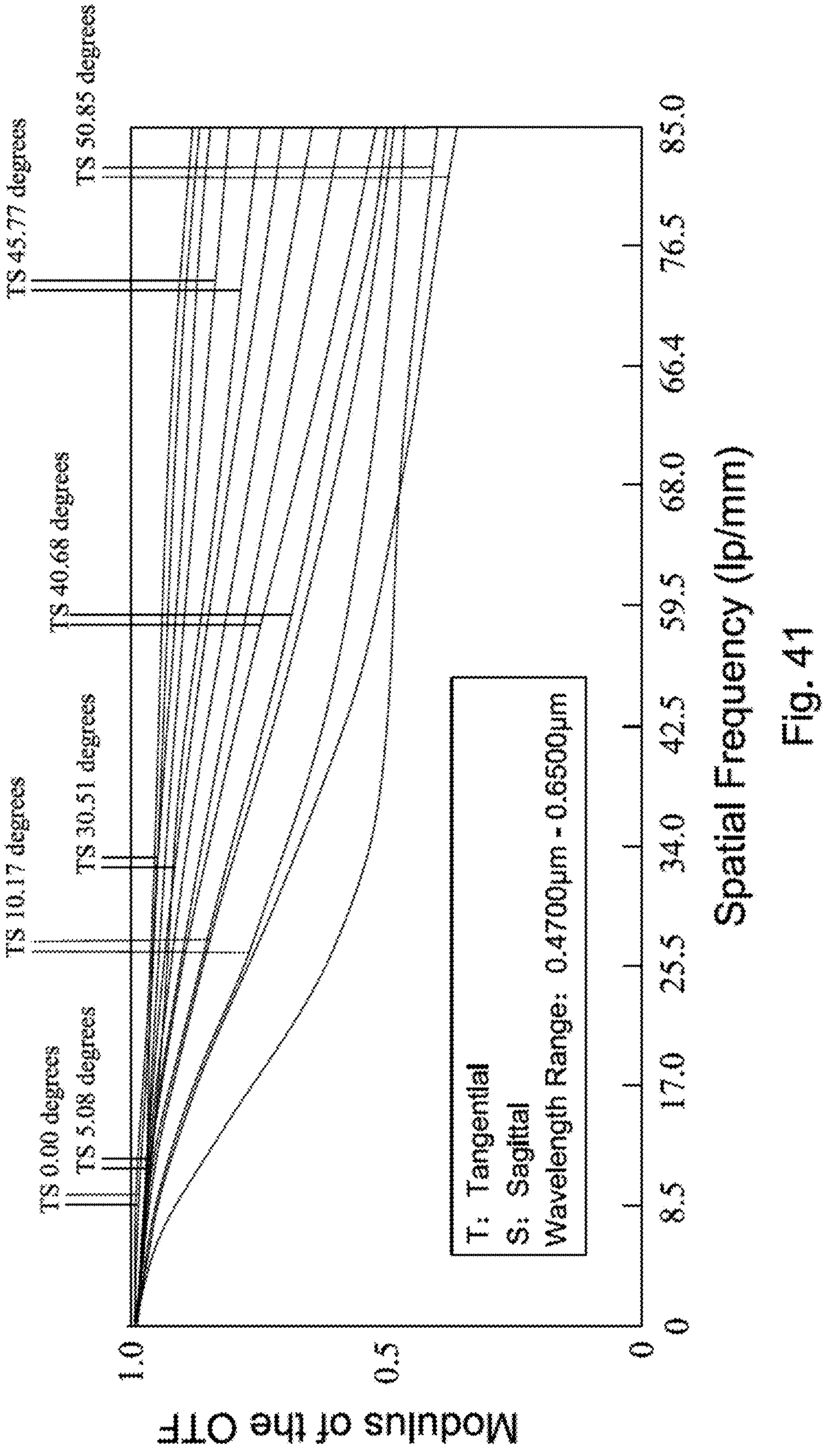

In addition, the wide-angle lens assembly 13 of the thirteenth embodiment can meet the requirements of optical performance as seen in FIGS. 39-41. It can be seen from FIG. 39 that the field curvature of tangential direction and sagittal direction in the wide-angle lens assembly 13 of the thirteenth embodiment ranges from −0.08 mm to 0.04 mm. It can be seen from FIG. 40 that the distortion in the wide-angle lens assembly 13 of the thirteenth embodiment ranges from −40% to 0%. It can be seen from FIG. 41 that the modulation transfer function of tangential direction and sagittal direction in the wide-angle lens assembly 13 of the thirteenth embodiment ranges from 0.48 to 1.0. It is obvious that the field curvature and the distortion of the wide-angle lens assembly 13 of the thirteenth embodiment can be corrected effectively, and the resolution of the wide-angle lens assembly 13 of the thirteenth embodiment can meet the requirement. Therefore, the wide-angle lens assembly 13 of the thirteenth embodiment is capable of good optical performance.

Figure 42:
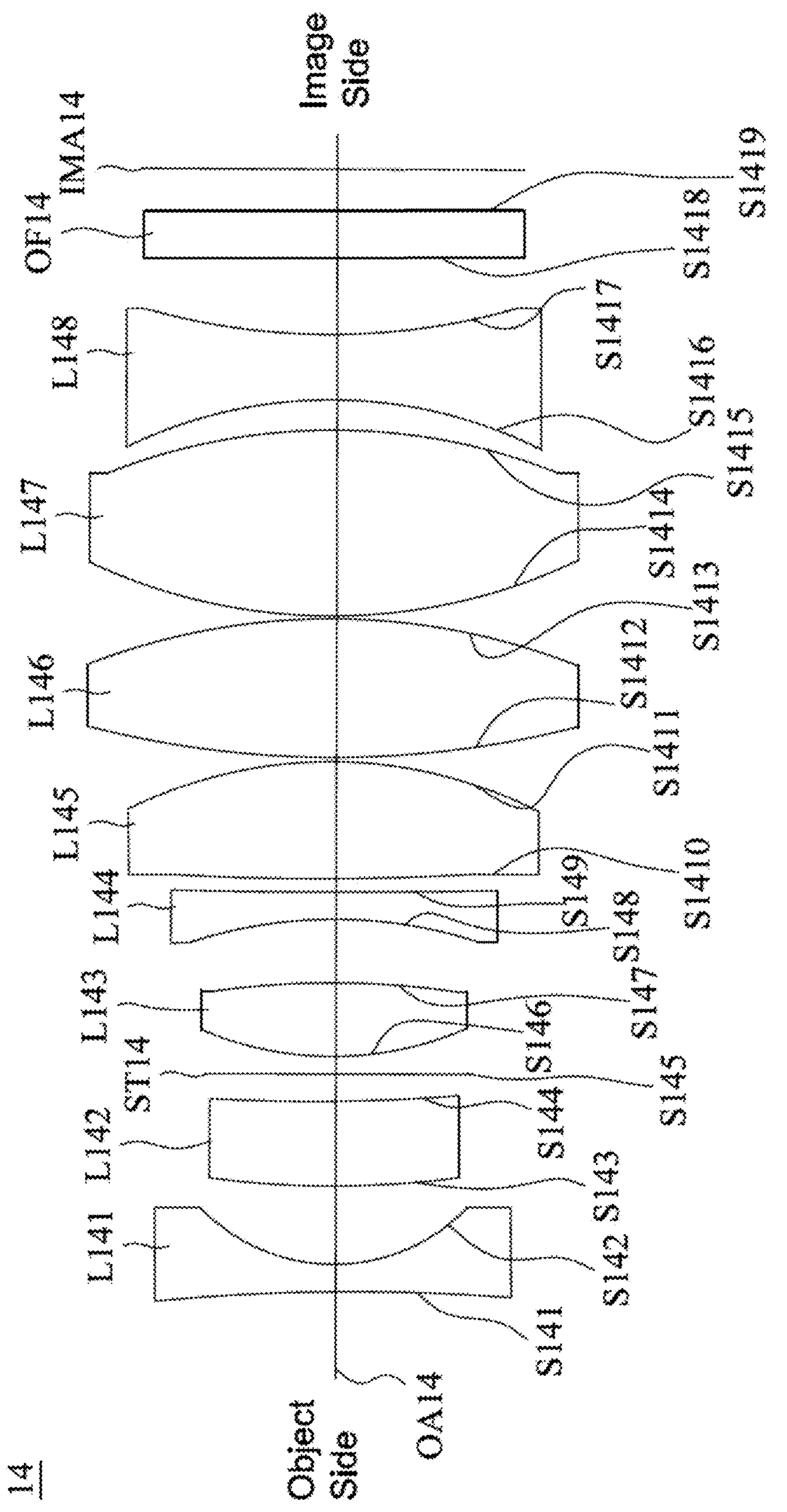
FIG. 42 is a lens layout diagram of a wide-angle lens assembly in accordance with a fourteenth embodiment of the invention.

A detailed description of a wide-angle lens assembly in accordance with a fourteenth embodiment of the invention is as follows. Referring to FIG. 42, the wide-angle lens assembly 14 includes a first lens L141, a second lens L142, a stop ST14, a third lens L143, a fourth lens L144, a fifth lens L145, a sixth lens L146, a seventh lens L147, an eighth lens L148, and an optical filter OF14, all of which are arranged in order from an object side to an image side along an optical axis OA14. In operation, the light from the object side is imaged on an image plane IMA14.

According to the foregoing, wherein: the object side surface S143 is a convex surface and image side surface S144 is a concave surface for the second lens L142; the fourth lens L144 is a biconcave lens, wherein the image side surface S149 is a concave surface; the fifth lens L145 is a biconvex lens with positive refractive power, wherein the object side surface S1410 is a convex surface; the sixth lens L146 is a biconvex lens, wherein the object side surface S1412 is a convex surface; the eighth lens L148 is a biconcave lens, wherein the image side surface S1417 is a concave surface; both of the object side surface S1418 and image side surface S1419 of the optical filter OF14 are plane surfaces; the first lens L141, second lens L142, fifth lens L145, sixth lens L146, and seventh lens L147 are spherical glass lenses; the third lens L143, fourth lens L144, and eighth lens L148 are aspheric plastic lenses; with the above design of the lenses, stop ST14, and at least one of the conditions (1), (6)-(9), and (12)-(16) satisfied, the wide-angle lens assembly 14 can have an effective decreased F-number, an effective increased field of view, an effective increased resolution, and an effective corrected aberration.

Table 40 shows the optical specification of the wide-angle lens assembly 14 in FIG. 42.

TABLE 40

Effective Focal Length = 6.19 mm F-number = 1.65
Total Lens Length = 29.67 mm Field of View = 101.70 degrees

| Surface Number | Radius of Curvature (mm) | Thick-ness (mm) | Nd | Vd | Effective Focal Length (mm) | Remark |
|---|---|---|---|---|---|---|
| S141 | −56.51 | 0.73 | 1.59 | 61.25 | −7.50 | L141 |
| S142 | 4.84 | 2.06 | | | | |
| S143 | 28.25 | 2.28 | 1.99 | 16.48 | 68.38 | L142 |
| S144 | 46.30 | 0.57 | | | | |
| S145 | ∞ | 0.63 | | | | ST14 |
| S146 | 11.51 | 1.96 | 1.54 | 56.00 | 13.34 | L143 |
| S147 | −18.67 | 1.64 | | | | |
| S148 | −16.07 | 0.77 | 1.66 | 21.21 | −24.25 | L144 |
| S149 | 23891.58 | 0.37 | | | | |
| S1410 | 112.59 | 3.13 | 1.55 | 63.37 | 19.98 | L145 |
| S1411 | −12.16 | 0.09 | | | | |
| S1412 | 26.19 | 3.67 | 1.59 | 67.29 | 18.94 | L146 |
| S1414 | −18.75 | 0.04 | | | | |
| S1414 | 14.84 | 4.97 | 1.70 | 56.18 | 12.30 | L147 |
| S1415 | −17.64 | 0.84 | | | | |
| S1416 | −13.06 | 1.73 | 1.66 | 21.21 | −11.26 | L148 |
| S1417 | 18.29 | 2.09 | | | | |
| S1418 | ∞ | 1.40 | 1.52 | 54.52 | | OF14 |
| S1419 | ∞ | 1.00 | | | | |

In the fourteenth embodiment, the conic constant k and the aspheric coefficients A, B, C, D, E, F, G, H, and I of each aspheric lens are shown in Table 41.

TABLE 41

| Surface Number | k<br>E | A<br>F | B<br>G | C<br>H | D<br>I |
|---|---|---|---|---|---|
| S146 | 0 | 7.8878E−04 | 1.6094E−05 | 9.7545E−07 | 1.7193E−08 |
| | −4.1971E−09 | 1.0965E−09 | −3.6130E−11 | 0 | 0 |
| S147 | 0 | −8.2667E−04 | 8.2837E−05 | −5.4290E−06 | 2.7526E−07 |
| | 1.0683E−08 | −1.4913E−09 | 8.1297E−11 | 0 | 0 |
| S148 | 0 | 5.8216E−05 | −3.7939E−05 | 1.8640E−07 | 6.1239E−10 |
| | 1.4330E−09 | −2.7493E−10 | 1.2209E−11 | 0 | 0 |
| S149 | 0 | 2.2670E−04 | −1.9246E−05 | 4.0992E−07 | 2.4177E−08 |
| | −2.9192E−10 | −8.0284E−11 | 3.1949E−12 | 0 | 0 |
| S1416 | 0 | −1.3757E−04 | 2.0075E−05 | −9.7848E−07 | 4.9033E−08 |
| | −4.2496E−10 | −3.6431E−11 | 9.7044E−13 | 0 | 0 |
| S1417 | 0 | −8.5661E−05 | −2.0391E−05 | 1.5598E−06 | −1.2452E−07 |
| | 4.7914E−09 | −7.9431E−11 | −5.7325E−13 | 0 | 0 |

Table 42 shows the parameters and condition values for conditions (1), (6)-(9), and (12)-(16) in accordance with the fourteenth embodiment of the invention. It can be seen from Table 42 that the wide-angle lens assembly 14 of the fourteenth embodiment satisfies the conditions (1), (6)-(9), and (12)-(16).

TABLE 42

| | | | | | |
|---|---|---|---|---|---|
| D22 | 5.84 mm | T1131 | 6.28 mm | T3152 | 7.86 mm |
| T6182 | 11.25 mm | T11ST | 5.65 mm | T4251 | 0.37 mm |
| f1 | −7.50 mm | | | | |
| f/D22 | 1.05 | T1131/T3152 | 0.80 | T1131/T6182 | 0.56 |
| T3152/T6182 | 0.70 | T11ST/TTL | 0.19 | f1/f | −1.22 |
| T4251/T1131 | 0.06 | T4251/T6182 | 0.03 | R12/R72 | −0.27 |
| Vd2/Vd4 | 0.78 | Vd6/Vd5 | 1.06 | | |

Figure 43:
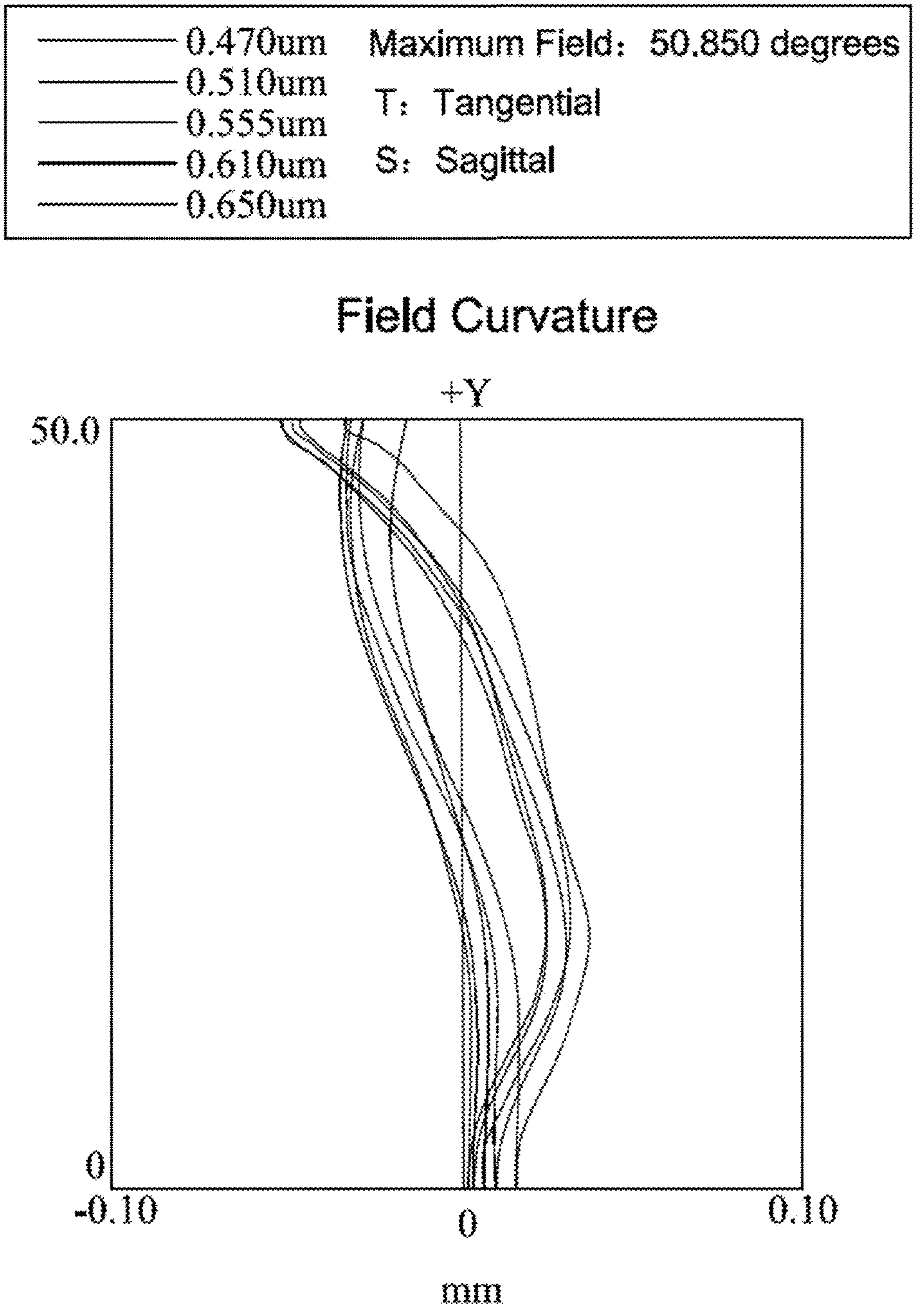
FIGS. 43, 44, 45 depict a longitudinal aberration diagram, a field curvature diagram, and a distortion diagram of the wide-angle lens assembly in accordance with the fourteenth embodiment of the invention, respectively.
Figure 44:
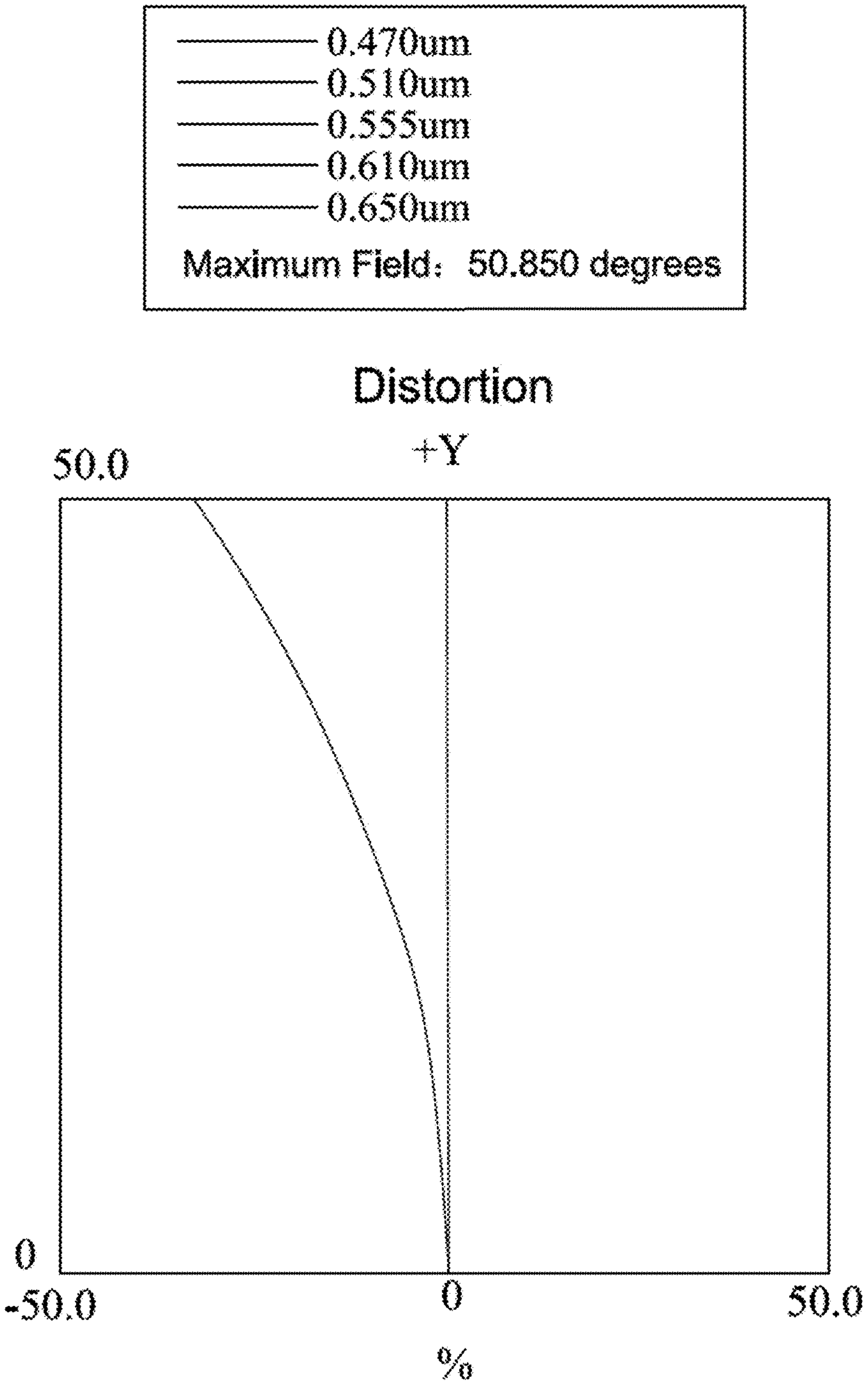
Figure 45:
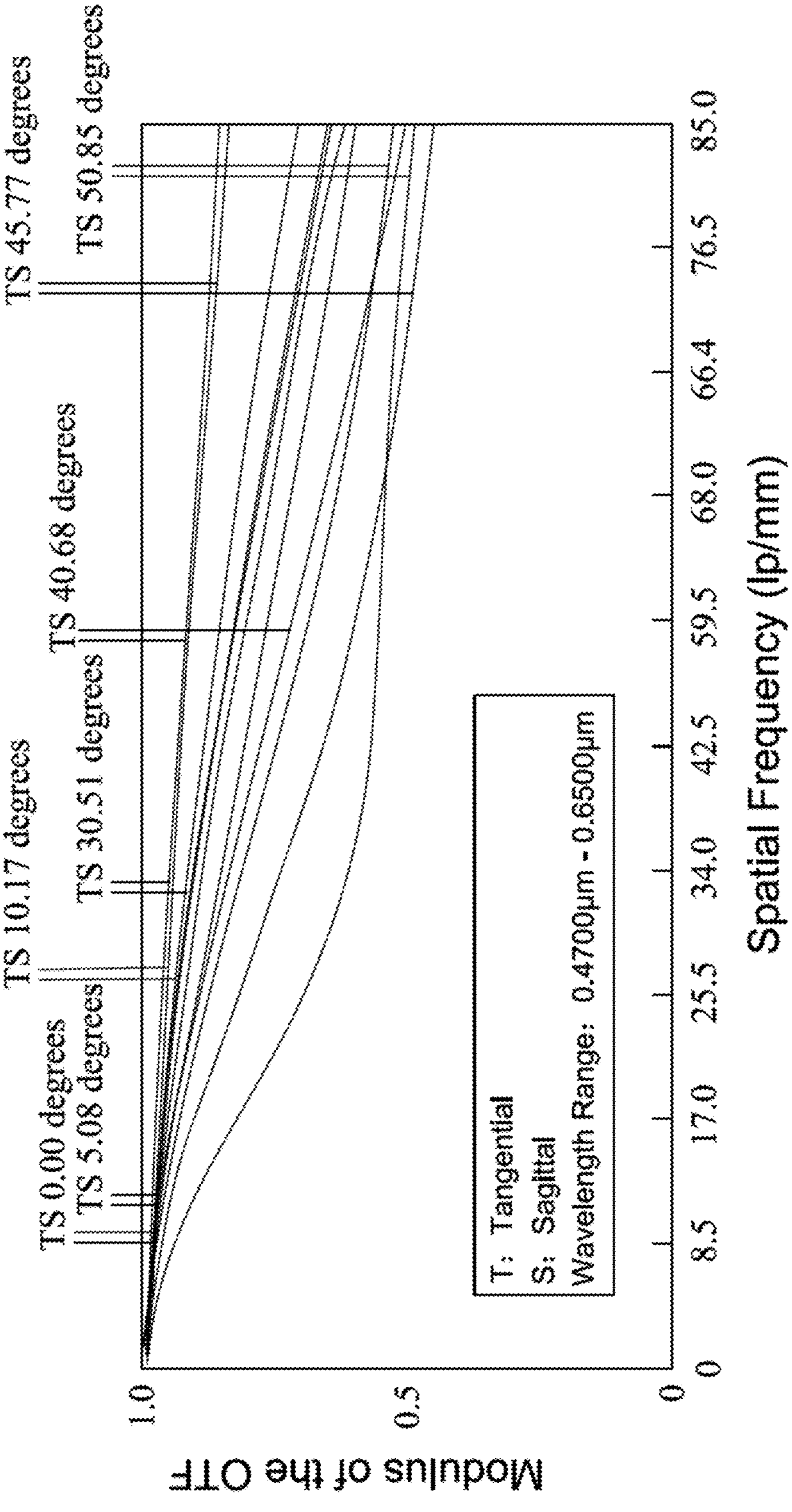

In addition, the wide-angle lens assembly 14 of the fourteenth embodiment can meet the requirements of optical performance as seen in FIGS. 43-45. It can be seen from FIG. 43 that the field curvature of tangential direction and sagittal direction in the wide-angle lens assembly 14 of the fourteenth embodiment ranges from −0.08 mm to 0.04 mm. It can be seen from FIG. 44 that the distortion in the wide-angle lens assembly 14 of the fourteenth embodiment ranges from −40% to 0%. It can be seen from FIG. 45 that the modulation transfer function of tangential direction and sagittal direction in the wide-angle lens assembly 14 of the fourteenth embodiment ranges from 0.48 to 1.0. It is obvious that the field curvature and the distortion of the wide-angle lens assembly 14 of the fourteenth embodiment can be corrected effectively, and the resolution of the wide-angle lens assembly 14 of the fourteenth embodiment can meet the requirement. Therefore, the wide-angle lens assembly 14 of the fourteenth embodiment is capable of good optical performance.

Figure 46:
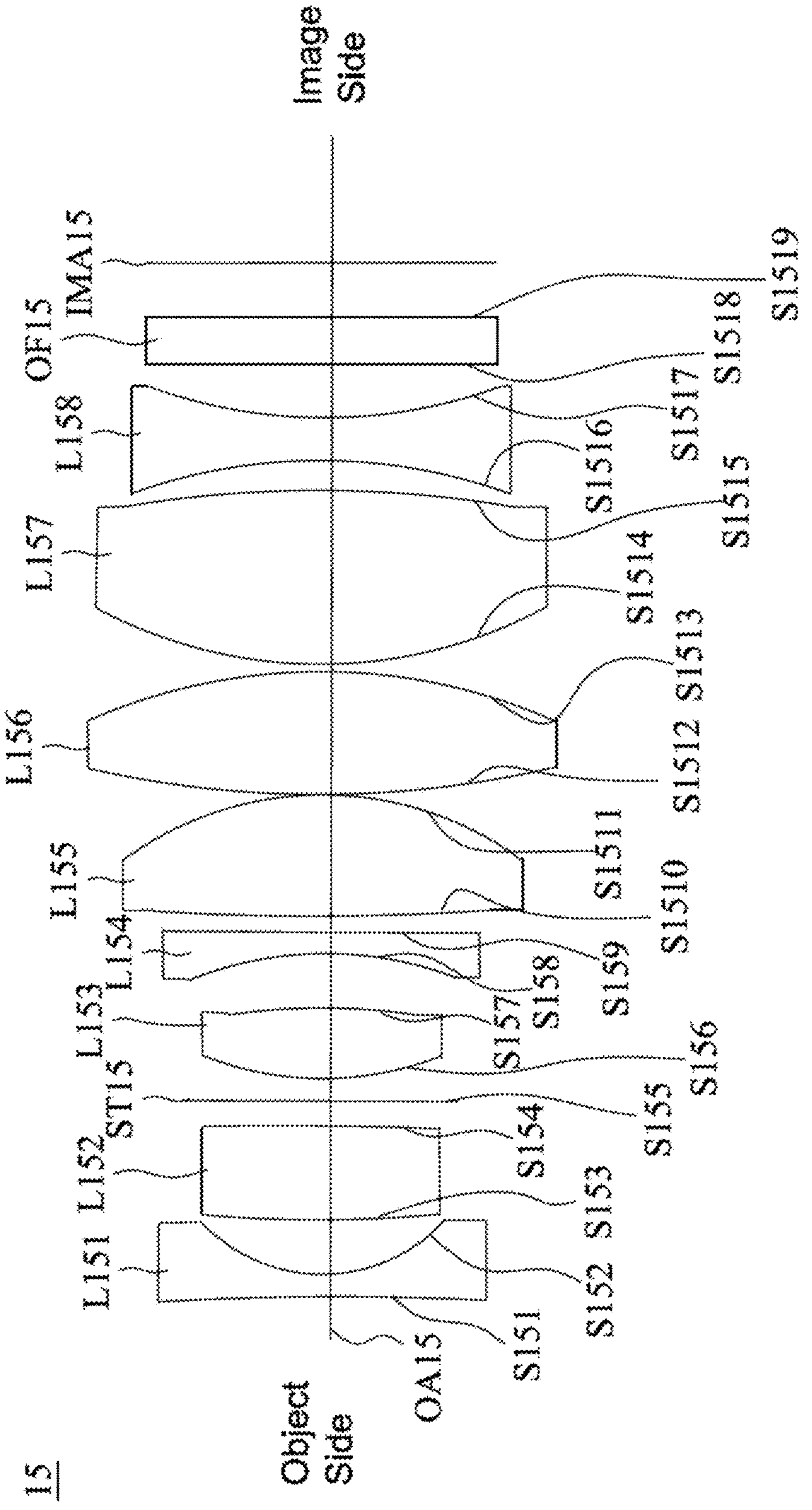
FIG. 46 is a lens layout diagram of a wide-angle lens assembly in accordance with a fifteenth embodiment of the invention.

A detailed description of a wide-angle lens assembly in accordance with a fifteenth embodiment of the invention is as follows. Referring to FIG. 46, the wide-angle lens assembly 15 includes a first lens L151, a second lens L152, a stop ST15, a third lens L153, a fourth lens L154, a fifth lens L155, a sixth lens L156, a seventh lens L157, an eighth lens L158, and an optical filter OF15, all of which are arranged in order from an object side to an image side along an optical axis OA15. In operation, the light from the object side is imaged on an image plane IMA15.

According to the foregoing, wherein: the object side surface S153 is a convex surface and image side surface S154 is a concave surface for the second lens L152; the fourth lens L154 is a biconcave lens, wherein the image side surface S159 is a concave surface; the fifth lens L155 is a biconvex lens with positive refractive power, wherein the object side surface S1510 is a convex surface; the sixth lens L156 is a biconvex lens, wherein the object side surface S1512 is a convex surface; the eighth lens L158 is a biconcave lens, wherein the image side surface S1517 is a concave surface; both of the object side surface S1518 and image side surface S1519 of the optical filter OF15 are plane surfaces; the first lens L151, second lens L152, fifth lens L155, sixth lens L156, and seventh lens L157 are spherical glass lenses; the third lens L153, fourth lens L154, and eighth lens L158 are aspheric plastic lenses; with the above design of the lenses, stop ST15, and at least one of the conditions (1), (6)-(9), and (12)-(16) satisfied, the wide-angle lens assembly 15 can have an effective decreased F-number, an effective increased field of view, an effective increased resolution, and an effective corrected aberration.

Table 43 shows the optical specification of the wide-angle lens assembly 15 in FIG. 46.

TABLE 43

Effective Focal Length = 6.13 mm F-number = 1.64
Total Lens Length = 29.98 mm Field of View = 101.70 degrees

| Surface Number | Radius of Curvature (mm) | Thick-ness (mm) | Nd | Vd | Effective Focal Length (mm) | Remark |
|---|---|---|---|---|---|---|
| S151 | −118.31 | 0.70 | 1.59 | 61.25 | −7.69 | L151 |
| S152 | 4.73 | 1.56 | | | | |
| S153 | 31.74 | 2.69 | 1.99 | 16.48 | 45.52 | L152 |
| S154 | 101.21 | 0.70 | | | | |
| S155 | ∞ | 0.72 | | | | ST15 |
| S156 | 13.16 | 2.04 | 1.54 | 56.00 | 14.54 | L153 |
| S157 | −18.92 | 1.58 | | | | |
| S158 | −13.15 | 0.63 | 1.66 | 21.21 | −18.84 | L154 |
| S159 | 248.28 | 0.45 | | | | |
| S1510 | 56.04 | 3.51 | 1.55 | 63.37 | 15.90 | L155 |
| S1511 | −10.22 | 0.01 | | | | |
| S1512 | 27.86 | 3.56 | 1.59 | 68.34 | 18.62 | L156 |
| S1513 | −17.48 | 0.25 | | | | |
| S1514 | 13.95 | 4.96 | 1.70 | 56.18 | 15.49 | L157 |
| S1515 | −41.30 | 0.91 | | | | |
| S1516 | −17.56 | 1.25 | 1.66 | 21.21 | −12.75 | L158 |
| S1517 | 16.72 | 1.56 | | | | |
| S1518 | ∞ | 1.40 | 1.52 | 54.52 | | OF15 |
| S1519 | ∞ | 1.54 | | | | |

In the fifteenth embodiment, the conic constant k and the aspheric coefficients A, B, C, D, E, F, G, H, and I of each aspheric lens are shown in Table 44.

TABLE 44

| Surface Number | k<br>E | A<br>F | B<br>G | C<br>H | D<br>I |
|---|---|---|---|---|---|
| S156 | 0 | 9.7415E−04 | 3.3706E−05 | −1.9571E−08 | 1.1507E−07 |
| | 3.3634E−09 | 5.8501E−10 | −4.4082E−11 | 0 | 0 |
| S157 | 0 | −1.0583E−03 | 1.3509E−04 | −5.7090E−06 | 2.3855E−07 |
| | 7.9413E−09 | 3.2959E−10 | 1.1597E−11 | 0 | 0 |

TABLE 44-continued

| Surface Number | k E | A F | B G | C H | D I |
|---|---|---|---|---|---|
| S158 | 0 | −4.4663E−06 | −2.7976E−05 | 1.2538E−06 | −6.1957E−08 |
| | 2.6048E−09 | 3.0790E−10 | −1.4945E−11 | 0 | 0 |
| S159 | 0 | 8.2142E−05 | −9.1543E−06 | 1.3564E−07 | 2.6163E−08 |
| | 5.6387E−10 | −1.0000E−10 | 1.9441E−12 | 0 | 0 |
| S1516 | 0 | −2.0183E−04 | 9.9530E−06 | −8.4508E−07 | 2.4499E−08 |
| | 3.1944E−10 | −2.8154E−11 | 3.8157E−13 | 0 | 0 |
| S1517 | 0 | 2.5466E−04 | −1.5568E−06 | −7.7051E−08 | −1.9206E−08 |
| | 1.8208E−09 | −5.9288E−11 | 6.9732E−13 | 0 | 0 |

Table 45 shows the parameters and condition values for conditions (1), (6)-(9), and (12)-(16) in accordance with the fifteenth embodiment of the invention. It can be seen from Table 45 that the wide-angle lens assembly 15 of the fifteenth embodiment satisfies the conditions (1), (6)-(9), and (12)-(16).

TABLE 45

| | | | | | |
|---|---|---|---|---|---|
| D22 | 5.91 mm | T1131 | 6.37 mm | T3152 | 8.21 mm |
| T6182 | 10.94 mm | T11ST | 5.65 mm | T4251 | 0.45 mm |
| f1 | −7.69 mm | f12 | −9.49 mm | | |
| f/D22 | 1.05 | R51/R72 | −1.36 | T1131/T3152 | 0.78 |
| T1131/T6182 | 0.58 | T3152/T6182 | 0.75 | T11ST/TTL | 0.19 |
| f1/f | −1.24 | T4251/T1131 | 0.07 | T4251/T6182 | 0.04 |
| R12/R72 | −0.11 | Vd2/Vd4 | 0.78 | Vd6/Vd5 | 1.08 |
| f12/f | −1.53 | | | | |

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A wide-angle lens assembly comprising:

a first lens which is a biconcave lens with negative refractive power and comprises a concave surface facing an object side and another concave surface facing an image side;

a second lens which is with positive refractive power;

a third lens which is a biconvex lens with positive refractive power and comprises a convex surface facing the object side and another convex surface facing the image side;

a fourth lens which is with refractive power;

a fifth lens which is with refractive power;

a sixth lens which is with positive refractive power and comprises a convex surface facing the image side;

a seventh lens which is with positive refractive power and comprises a convex surface in a paraxial region facing the object side; and an eighth lens which is with negative refractive power;

wherein the first lens, the second lens, the third lens, the fourth lens, the fifth lens, the sixth lens, the seventh lens, and the eighth lens are arranged in order from the object side to the image side along an optical axis;

wherein the wide-angle lens assembly satisfies at least one of following conditions:

$$0.8 \le f/D22 \le 3;$$

$$0.025\ \text{degrees}^{-1} \le 1/\alpha \le 0.3\ \text{degrees}^{-1};$$

$$0.03\ \text{degrees}^{-1} \le 1/\beta \le 0.35\ \text{degrees}^{-1};$$

$$0.5 \le \alpha/\beta \le 30;$$

wherein f is an effective focal length of the wide-angle lens assembly, D22 is an effective optical diameter of an image side surface of the second lens, a is a maximum tangent angle of a first cemented surface, and α is a maximum tangent angle of a second cemented surface.

2. The wide-angle lens assembly as claimed in claim 1, wherein:

the seventh lens is a biconvex lens and further comprises another convex surface facing the image side; and the eighth lens is a biconcave surface and comprises a concave surface facing the object side and another concave surface facing the image side.

3. The wide-angle lens assembly as claimed in claim 2, wherein:

the second lens is a meniscus lens and comprises a convex surface facing the object side and a concave surface facing the image side;

the fourth lens is a biconvex lens with positive refractive power and comprises a convex surface facing the object side and another convex surface facing the image side;

the fifth lens is a biconcave lens with negative refractive power and comprises a concave surface facing the object side and another concave surface facing the image side; and the sixth lens is a biconvex lens and further comprises another convex surface facing the object side.

4. The wide-angle lens assembly as claimed in claim 3, further comprising a stop disposed between the second lens and the third lens and satisfying at least one of following conditions:

$$-3 \le R51/R72 \le 3;$$

$$0 \le T1131/T3152 \le 3;$$

$$0 \le T1131/T6182 \le 3;$$

$$0 \le T3152/T6182 \le 3;$$

$$0.17 \le T11ST/TTL \le 0.2;$$

$$-1.25 \le f1/f \le -1.15;$$

$$-1.6 \le f12/f \le -1.4;$$

$$0 \le T4251/T1131 \le 0.5;$$

$$0 \le T4251/T6182 \le 0.5;$$

$$-10 \le R12/R72 \le 0.5;$$

$$0.15 \le Vd2/Vd4 \le 3;$$

$$0.3 \le Vd6/Vd5 \le 3;$$

wherein R51 is a radius of curvature of an object side surface of the fifth lens, R72 is a radius of curvature of an image side surface of the seventh lens, T1131 is an interval from an object side surface of the first lens to an object side surface of the third lens along the optical axis, T3152 is an interval from the object side surface of the third lens to an image side surface of the fifth lens along the optical axis, T6182 is an interval from an object side surface of the sixth lens to an image side surface of the eighth lens along the optical axis, T11ST is an interval from the object side surface of the first lens to the stop along the optical axis, TTL is an interval from the object side surface of the first lens to an image plane along the optical axis, f1 is an effective focal length of the first lens, fis the effective focal length of the wide-angle lens assembly, f12 is an effective focal length of a combination of the first lens and the second lens, T4251 is an interval from an image side surface of the fourth lens to the object side surface of the fifth lens along the optical axis, R12 is a radius of curvature of an image side surface of the second lens, Vd2 is an Abbe number of the second lens, Vd4 is an Abbe number of the fourth lens, Vd5 is an Abbe number of the fifth lens, and Vd6 is an Abbe number of the sixth lens.

5. The wide-angle lens assembly as claimed in claim 2, wherein:

the second lens is a meniscus lens and comprises a convex surface facing the object side and a concave surface facing the image side;

the fourth lens is a plano-convex lens with positive refractive power and comprises a plane surface facing the object side and a convex surface facing the image side;

the fifth lens is a biconcave lens with negative refractive power and comprises a concave surface facing the object side and another concave surface facing the image side; and the sixth lens is a biconvex lens and further comprises another convex surface facing the object side.

6. The wide-angle lens assembly as claimed in claim 5, further comprising a stop disposed between the second lens and the third lens and satisfying at least one of following conditions:

$$-3 \le R51/R72 \le 3;$$

$$0 \le T1131/T3152 \le 3;$$

$$0 \le T1131/T6182 \le 3;$$

$$0 \le T3152/T6182 \le 3;$$

$$0.17 \le T11ST/TTL \le 0.2;$$

$$-1.25 \le f1/f \le -1.15;$$

$$-1.6 \le f12/f \le -1.4;$$

$$0 \le T4251/T1131 \le 0.5;$$

$$0 \le T4251/T6182 \le 0.5;$$

$$-10 \le R12/R72 \le 0.5;$$

$$0.15 \le Vd2/Vd4 \le 3;$$

$$0.3 \le Vd6/Vd5 \le 3;$$

wherein R51 is a radius of curvature of an object side surface of the fifth lens, R72 is a radius of curvature of an image side surface of the seventh lens, T1131 is an interval from an object side surface of the first lens to an object side surface of the third lens along the optical axis, T3152 is an interval from the object side surface of the third lens to an image side surface of the fifth lens along the optical axis, T6182 is an interval from an object side surface of the sixth lens to an image side surface of the eighth lens along the optical axis, T11ST is an interval from the object side surface of the first lens to the stop along the optical axis, TTL is an interval from the object side surface of the first lens to an image plane along the optical axis, f1 is an effective focal length of the first lens, f is the effective focal length of the wide-angle lens assembly, f12 is an effective focal length of a combination of the first lens and the second lens, T4251 is an interval from an image side surface of the fourth lens to the object side surface of the fifth lens along the optical axis, R12 is a radius of curvature of an image side surface of the second lens, Vd2 is an Abbe number of the second lens, Vd4 is an Abbe number of the fourth lens, Vd5 is an Abbe number of the fifth lens, and Vd6 is an Abbe number of the sixth lens.

7. The wide-angle lens assembly as claimed in claim 2, wherein:

the second lens is a meniscus lens and comprises a concave surface facing the object side and a convex surface facing the image side;

the fourth lens is a biconcave lens with negative refractive power and comprises a concave surface facing the object side and another concave surface facing the image side;

the fifth lens is a meniscus lens with negative refractive power and comprises a concave surface facing the object side and a convex surface facing the image side; and the sixth lens is a meniscus lens and further comprises a concave surface facing the object side.

8. The wide-angle lens assembly as claimed in claim 7, further comprising a stop disposed between the second lens and the third lens and satisfying at least one of following conditions:

$$-3 \le R51/R72 \le 3;$$

$$0 \le T1131/T3152 \le 3;$$

$$0 \le T1131/T6182 \le 3;$$

$$0 \le T3152/T6182 \le 3;$$

$$0.17 \le T11ST/TTL \le 0.2;$$

$$-1.25 \le f1/f \le -1.15;$$

$$-1.6 \le f12/f \le -1.4;$$

$$0 \le T4251/T1131 \le 0.5;$$

$$0 \le T4251/T6182 \le 0.5;$$

$$-10 \le R12/R72 \le 0.5;$$

$$0.15 \le Vd2/Vd4 \le 3;$$

$$0.3 \le Vd6/Vd5 \le 3;$$

wherein R51 is a radius of curvature of an object side surface of the fifth lens, R72 is a radius of curvature of an image side surface of the seventh lens, T1131 is an interval from an object side surface of the first lens to an object side surface of the third lens along the optical axis, T3152 is an interval from the object side surface of the third lens to an image side surface of the fifth lens along the optical axis, T6182 is an interval from an object side surface of the sixth lens to an image side surface of the eighth lens along the optical axis, T11ST is an interval from the object side surface of the first lens to the stop along the optical axis, TTL is an interval from the object side surface of the first lens to an image plane along the optical axis, f1 is an effective focal length of the first lens, f is the effective focal length of the wide-angle lens assembly, f12 is an effective focal length of a combination of the first lens and the second lens, T4251 is an interval from an image side surface of the fourth lens to the object side surface of the fifth lens along the optical axis, R12 is a radius of curvature of an image side surface of the second lens, Vd2 is an Abbe number of the second lens, Vd4 is an Abbe number of the fourth lens, Vd5 is an Abbe number of the fifth lens, and Vd6 is an Abbe number of the sixth lens.

9. The wide-angle lens assembly as claimed in claim 2, wherein:

the second lens is a meniscus lens and comprises a convex surface facing the object side and a concave surface facing the image side;

the fourth lens is a biconcave lens with negative refractive power and comprises a concave surface facing the object side and another concave surface facing the image side;

the fifth lens is a biconvex lens with positive refractive power and comprises a convex surface facing the object side and another convex surface facing the image side; and the sixth lens is a biconvex lens and further comprises another convex surface facing the object side.

10. The wide-angle lens assembly as claimed in claim 9, further comprising a stop disposed between the second lens and the third lens and satisfying at least one of following conditions:

$$-3 \le R51/R72 \le 3;$$

$$0 \le T1131/T3152 \le 3;$$

$$0 \le T1131/T6182 \le 3;$$

$$0 \le T3152/T6182 \le 3;$$

$$0.17 \le T11ST/TTL \le 0.2;$$

$$-1.25 \le f1/f \le -1.15;$$

$$-1.6 \le f12/f \le -1.4;$$

$$0 \le T4251/T1131 \le 0.5;$$

$$0 \le T4251/T6182 \le 0.5;$$

$$-10 \le R12/R72 \le 0.5;$$

$$0.15 \le Vd2/Vd4 \le 3;$$

$$0.3 \le Vd6/Vd5 \le 3;$$

wherein R51 is a radius of curvature of an object side surface of the fifth lens, R72 is a radius of curvature of an image side surface of the seventh lens, T1131 is an interval from an object side surface of the first lens to an object side surface of the third lens along the optical axis, T3152 is an interval from the object side surface of the third lens to an image side surface of the fifth lens along the optical axis, T6182 is an interval from an object side surface of the sixth lens to an image side surface of the eighth lens along the optical axis, T11ST is an interval from the object side surface of the first lens to the stop along the optical axis, TTL is an interval from the object side surface of the first lens to an image plane along the optical axis, f1 is an effective focal length of the first lens, fis the effective focal length of the wide-angle lens assembly, f12 is an effective focal length of a combination of the first lens and the second lens, T4251 is an interval from an image side surface of the fourth lens to the object side surface of the fifth lens along the optical axis, R12 is a radius of curvature of an image side surface of the second lens, Vd2 is an Abbe number of the second lens, Vd4 is an Abbe number of the fourth lens, Vd5 is an Abbe number of the fifth lens, and Vd6 is an Abbe number of the sixth lens.

11. The wide-angle lens assembly as claimed in claim 1, wherein:

the seventh lens is a biconvex lens and further comprises another convex surface facing the image side; and the eighth lens is a meniscus surface and comprises a concave surface facing the object side and a convex surface facing the image side.

12. The wide-angle lens assembly as claimed in claim 11, wherein:

the second lens is a meniscus lens and comprises a concave surface facing the object side and a convex surface facing the image side;

the fourth lens is a biconcave lens with negative refractive power and comprises a concave surface facing the object side and another concave surface facing the image side;

the fifth lens is a meniscus lens with negative refractive power and comprises a concave surface facing the object side and a convex surface facing the image side; and the sixth lens is a biconvex lens and further comprises another convex surface facing the object side.

13. The wide-angle lens assembly as claimed in claim 12, further comprising a stop disposed between the second lens and the third lens and satisfying at least one of following conditions:

$$-3 \le R51/R72 \le 3;$$

$$0 \le T1131/T3152 \le 3;$$

$$0 \le T1131/T6182 \le 3;$$

$$0 \le T3152/T6182 \le 3;$$

$$0.17 \le T11ST/TTL \le 0.2;$$

$$-1.25 \le f1/f \le -1.15;$$

$$-1.6 \le f12/f \le -1.4;$$

$$0 \le T4251/T1131 \le 0.5;$$

$$0 \le T4251/T6182 \le 0.5;$$

$$-10 \le R12/R72 \le 0.5;$$

$$0.15 \le Vd2/Vd4 \le 3;$$

$$0.3 \le Vd6/Vd5 \le 3;$$

wherein R51 is a radius of curvature of an object side surface of the fifth lens, R72 is a radius of curvature of an image side surface of the seventh lens, T1131 is an interval from an object side surface of the first lens to an object side surface of the third lens along the optical axis, T3152 is an interval from the object side surface of the third lens to an image side surface of the fifth lens along the optical axis, T6182 is an interval from an object side surface of the sixth lens to an image side surface of the eighth lens along the optical axis, T11ST is an interval from the object side surface of the first lens to the stop along the optical axis, TTL is an interval from the object side surface of the first lens to an image plane along the optical axis, f1 is an effective focal length of the first lens, f is the effective focal length of the wide-angle lens assembly, f12 is an effective focal length of a combination of the first lens and the second lens, T4251 is an interval from an image side surface of the fourth lens to the object side surface of the fifth lens along the optical axis, R12 is a radius of curvature of an image side surface of the second lens, Vd2 is an Abbe number of the second lens, Vd4 is an Abbe number of the fourth lens, Vd5 is an Abbe number of the fifth lens, and Vd6 is an Abbe number of the sixth lens.

14. The wide-angle lens assembly as claimed in claim 11, wherein:

the second lens is a meniscus lens and comprises a concave surface facing the object side and a convex surface facing the image side;

the fourth lens is a meniscus lens with negative refractive power and comprises a concave surface facing the object side and a convex surface facing the image side;

the fifth lens is a meniscus lens with negative refractive power and comprises a concave surface facing the object side and a convex surface facing the image side; and the sixth lens is a biconvex lens and further comprises another convex surface facing the object side.

15. The wide-angle lens assembly as claimed in claim 14, further comprising a stop disposed between the second lens and the third lens and satisfying at least one of following conditions:

$$-3 \le R51/R72 \le 3;$$

$$0 \le T1131/T3152 \le 3;$$

$$0 \le T1131/T6182 \le 3;$$

$$0 \le T3152/T6182 \le 3;$$

$$0.17 \le T11ST/TTL \le 0.2;$$

$$-1.25 \le f1/f \le -1.15;$$

$$-1.6 \le f12/f \le -1.4;$$

$$0 \le T4251/T1131 \le 0.5;$$

$$0 \le T4251/T6182 \le 0.5;$$

$$-10 \le R12/R72 \le 0.5;$$

$$0.15 \le Vd2/Vd4 \le 3;$$

$$0.3 \le Vd6/Vd5 \le 3;$$

wherein R51 is a radius of curvature of an object side surface of the fifth lens, R72 is a radius of curvature of an image side surface of the seventh lens, T1131 is an interval from an object side surface of the first lens to an object side surface of the third lens along the optical axis, T3152 is an interval from the object side surface of the third lens to an image side surface of the fifth lens along the optical axis, T6182 is an interval from an object side surface of the sixth lens to an image side surface of the eighth lens along the optical axis, T11ST is an interval from the object side surface of the first lens to the stop along the optical axis, TTL is an interval from the object side surface of the first lens to an image plane along the optical axis, f1 is an effective focal length of the first lens, f is the effective focal length of the wide-angle lens assembly, f12 is an effective focal length of a combination of the first lens and the second lens, T4251 is an interval from an image side surface of the fourth lens to the object side surface of the fifth lens along the optical axis, R12 is a radius of curvature of an image side surface of the second lens, Vd2 is an Abbe number of the second lens, Vd4 is an Abbe number of the fourth lens, Vd5 is an Abbe number of the fifth lens, and Vd6 is an Abbe number of the sixth lens.

16. The wide-angle lens assembly as claimed in claim 1, wherein:

the second lens is a meniscus lens and comprises a convex surface facing the object side and a concave surface facing the image side;

the fourth lens is a biconvex lens with positive refractive power and comprises a convex surface facing the object side and another convex surface facing the image side;

the fifth lens is a biconcave lens with negative refractive power and comprises a concave surface facing the object side and another concave surface facing the image side;

the sixth lens is a biconvex lens and further comprises another convex surface facing the object side;

the seventh lens is a meniscus lens and further comprises a concave surface facing the image side; and the eighth lens is a meniscus lens and comprises a convex surface facing the object side and a concave surface facing the image side.

17. The wide-angle lens assembly as claimed in claim 16, further comprising a stop disposed between the second lens and the third lens and satisfying at least one of following conditions:

$$-3 \leq R51/R72 \leq 3;$$

$$0 \leq T1131/T3152 \leq 3;$$

$$0 \leq T1131/T6182 \leq 3;$$

$$0 \leq T3152/T6182 \leq 3;$$

$$0.17 \leq T11ST/TTL \leq 0.2;$$

$$-1.25 \leq f1/f \leq -1.15;$$

$$-1.6 \leq f12/f \leq -1.4;$$

$$0 \leq T4251/T1131 \leq 0.5;$$

$$0 \leq T4251/T6182 \leq 0.5;$$

$$-10 \leq R12/R72 \leq 0.5;$$

$$0.15 \leq Vd2/Vd4 \leq 3;$$

$$0.3 \leq Vd6/Vd5 \leq 3;$$

wherein R51 is a radius of curvature of an object side surface of the fifth lens, R72 is a radius of curvature of an image side surface of the seventh lens, T1131 is an interval from an object side surface of the first lens to an object side surface of the third lens along the optical axis, T3152 is an interval from the object side surface of the third lens to an image side surface of the fifth lens along the optical axis, T6182 is an interval from an object side surface of the sixth lens to an image side surface of the eighth lens along the optical axis, T11ST is an interval from the object side surface of the first lens to the stop along the optical axis, TTL is an interval from the object side surface of the first lens to an image plane along the optical axis, f1 is an effective focal length of the first lens, f is the effective focal length of the wide-angle lens assembly, f12 is an effective focal length of a combination of the first lens and the second lens, T4251 is an interval from an image side surface of the fourth lens to the object side surface of the fifth lens along the optical axis, R12 is a radius of curvature of an image side surface of the second lens, Vd2 is an Abbe number of the second lens, Vd4 is an Abbe number of the fourth lens, Vd5 is an Abbe number of the fifth lens, and Vd6 is an Abbe number of the sixth lens.

18. The wide-angle lens assembly as claimed in claim 1, wherein:

the fourth lens and the fifth lens are cemented on the first cemented surface; and the seventh lens and the eighth lens are cemented on the second cemented surface.

19. A wide-angle lens assembly comprising:

a first lens which is with negative refractive power;

a second lens which is with positive refractive power;

a third lens which is with positive refractive power;

a fourth lens which is with refractive power;

a fifth lens which is with refractive power;

a sixth lens which is with positive refractive power;

a seventh lens which is with positive refractive power and comprises a convex surface facing an image side; and an eighth lens which is a biconcave surface with negative refractive power and comprises a concave surface facing an object side and another concave surface facing the image side;

wherein the first lens, the second lens, the third lens, the fourth lens, the fifth lens, the sixth lens, the seventh lens, and the eighth lens are arranged in order from the object side to the image side along an optical axis;

wherein the wide-angle lens assembly satisfies at least one of following conditions:

$$0.8 \leq f/D22 \leq 3;$$

$$0.025 \text{ degrees}^{-1} \leq 1/\alpha \leq 0.3 \text{ degrees}^{-1};$$

$$0.03 \text{ degrees}^{-1} \leq 1/\beta \leq 0.35 \text{ degrees}^{-1};$$

$$0.5 \leq \alpha/\beta \leq 30;$$

wherein fis an effective focal length of the wide-angle lens assembly, D22 is an effective optical diameter of an image side surface of the second lens, a is a maximum tangent angle of a first cemented surface, and B is a maximum tangent angle of a second cemented surface.

20. A wide-angle lens assembly comprising:

a first lens which is a biconcave lens with negative refractive power and comprises a concave surface facing an object side and another concave surface facing an image side;

a second lens which is with positive refractive power;

a third lens which is a biconvex lens with positive refractive power and comprises a convex surface facing the object side and another convex surface facing the image side;

a fourth lens which is with refractive power;

a fifth lens which is with refractive power;

a sixth lens which is with positive refractive power and comprises a convex surface facing the image side;

a seventh lens which is a biconvex lens with positive refractive power and comprises a convex surface facing the object side and another convex surface facing the image side; and an eighth lens which is a meniscus surface with refractive power and comprises a concave surface facing the object side and a convex surface facing the image side;

wherein the first lens, the second lens, the third lens, the fourth lens, the fifth lens, the sixth lens, the seventh lens, and the eighth lens are arranged in order from the object side to the image side along an optical axis;

wherein the wide-angle lens assembly satisfies at least one of following conditions:

$$0.8 \leq f/D22 \leq 3;$$

$$0.025 \text{ degrees}^{-1} \leq 1/\alpha \leq 0.3 \text{ degrees}^{-1};$$

$$0.03 \text{ degrees}^{-1} \leq 1/\beta \leq 0.35 \text{ degrees}^{-1};$$

$$0.5 \leq \alpha/\beta \leq 30;$$

wherein fis an effective focal length of the wide-angle lens assembly, D22 is an effective optical diameter of an image side surface of the second lens, a is a maximum tangent angle of a first cemented surface, and B is a maximum tangent angle of a second cemented surface.

* * * * *